US008613649B2

(12) United States Patent
Low et al.

(10) Patent No.: US 8,613,649 B2
(45) **Date of Patent: *Dec. 24, 2013**

(54) GAMING SYSTEM HAVING AWARDS PROVIDED BASED ON RATE OF PLAY

(71) Applicant: IGT, Reno, NV (US)

(72) Inventors: Michael N. Low, Henderson, NV (US); Michael M. Oberberger, Reno, NV (US); Dwayne A. Davis, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/725,313

(22) Filed: Dec. 21, 2012

(65) Prior Publication Data

US 2013/0137506 A1 May 30, 2013

Related U.S. Application Data

(63) Continuation of application No. 13/197,501, filed on Aug. 3, 2011, now Pat. No. 8,348,753, which is a continuation of application No. 11/466,315, filed on Aug. 22, 2006, now Pat. No. 8,012,014.

(51) Int. Cl.
*A63F 9/24* (2006.01)
*G06F 17/00* (2006.01)

(52) U.S. Cl.
USPC .............................................. 463/16; 463/25

(58) Field of Classification Search
USPC ...................................................... 463/16, 25
See application file for complete search history.

(56) References Cited

U.S. PATENT DOCUMENTS 4,072,930 A 2/1978 Lucero et al.
4,679,143 A 7/1987 Hagiwara
4,805,907 A 2/1989 Hagiwara
4,837,728 A 6/1989 Barrie et al.
4,838,552 A 6/1989 Hagiwara (Continued)

FOREIGN PATENT DOCUMENTS

AU 524709 9/1982
AU 555905 10/1986

(Continued)

OTHER PUBLICATIONS

Aristrocrat Brochure, written by Aristocrat Gaming, published in 2004.

(Continued)

*Primary Examiner* — Dmitry Suhol
*Assistant Examiner* — Carl V Larsen
(74) *Attorney, Agent, or Firm* — Neal, Gerber & Eisenberg LLP

(57) ABSTRACT

Gaming systems and methods for operating a gaming system are provided. The gaming system includes a controller operable with a plurality of gaming devices. Based at least in part on wagering activity, the controller determines a ranking for a plurality of gaming devices in the gaming system. The controller determines a plurality of the ranked gaming devices that are eligible for a designated award and, for each of the plurality of eligible gaming devices, determines a probability of being selected to win the designated award. The controller selects at least one of the eligible gaming devices based part on the determined probability for said at least one eligible gaming device, and causes the at least one selected gaming device to provide the designated award.

24 Claims, 22 Drawing Sheets

| GAMING MACHINE | PLAYER | NUMBER OF GAMES | TOTAL WAGERED MONETARY UNITS | RANKING | PROBABILITY OF BEING SELECTED |
|---|---|---|---|---|---|
| 14A | A | 4 | 12 | 1A | 50% |
| 14B | B | 3 | 12 | 1B | 50% |
| 14Z | C | 6 | 6 | 3 | 0% |

(56) References Cited

U.S. PATENT DOCUMENTS

| | | | |
|---|---|---|---|
| 4,842,278 | A | 6/1989 | Markowicz |
| 4,844,464 | A | 7/1989 | Berge |
| 4,856,787 | A | 8/1989 | Itkis |
| 4,871,171 | A | 10/1989 | Rivero |
| 5,048,833 | A | 9/1991 | Lamle |
| 5,092,598 | A | 3/1992 | Kamille |
| 5,116,055 | A | 5/1992 | Tracy |
| 5,123,649 | A | 6/1992 | Tiberio |
| 5,249,800 | A | 10/1993 | Hilgendorf et al. |
| 5,275,400 | A | 1/1994 | Weingardt |
| 5,280,909 | A | 1/1994 | Tracy |
| 5,286,023 | A | 2/1994 | Wood |
| 5,292,127 | A | 3/1994 | Kelly et al. |
| 5,342,049 | A | 8/1994 | Wichinsky et al. |
| 5,344,144 | A | 9/1994 | Canon |
| 5,417,430 | A | 5/1995 | Breeding |
| 5,472,194 | A | 12/1995 | Breeding et al. |
| 5,476,259 | A | 12/1995 | Weingardt |
| 5,489,101 | A | 2/1996 | Moody |
| 5,511,781 | A | 4/1996 | Wood |
| 5,531,441 | A | 7/1996 | Dabrowski et al. |
| 5,536,016 | A | 7/1996 | Thompson |
| 5,544,893 | A | 8/1996 | Jones et al. |
| 5,547,192 | A | 8/1996 | Ishibashi |
| 5,564,700 | A | 10/1996 | Celona |
| 5,584,485 | A | 12/1996 | Jone et al. |
| 5,584,763 | A | 12/1996 | Kelly et al. |
| 5,603,502 | A | 2/1997 | Nakagawa |
| 5,611,730 | A | 3/1997 | Weiss |
| 5,626,341 | A | 5/1997 | Jones |
| 5,645,486 | A | 7/1997 | Nagao et al. |
| 5,655,961 | A | 8/1997 | Acres et al. |
| 5,664,998 | A | 9/1997 | Seelig et al. |
| 5,702,304 | A | 12/1997 | Acres et al. |
| 5,741,183 | A | 4/1998 | Acres et al. |
| 5,743,523 | A | 4/1998 | Kelly et al. |
| 5,743,800 | A | 4/1998 | Huard et al. |
| 5,752,882 | A | 5/1998 | Acres et al. |
| 5,758,875 | A | 6/1998 | Giacalone, Jr. |
| 5,761,647 | A | 6/1998 | Boushy |
| 5,762,552 | A | 6/1998 | Vuong |
| 5,766,076 | A | 6/1998 | Pease et al. |
| 5,779,545 | A | 7/1998 | Berg et al. |
| 5,779,547 | A | 7/1998 | SoRelle et al. |
| 5,779,549 | A | 7/1998 | Walker et al. |
| 5,816,918 | A | 10/1998 | Kelly et al. |
| 5,820,459 | A | 10/1998 | Acres et al. |
| 5,833,537 | A | 11/1998 | Barrie |
| 5,836,817 | A | 11/1998 | Acres et al. |
| 5,851,011 | A | 12/1998 | Lott |
| 5,851,149 | A | 12/1998 | Xidos et al. |
| 5,855,514 | A | 1/1999 | Kamille |
| 5,855,515 | A | 1/1999 | Pease et al. |
| 5,876,284 | A | 3/1999 | Acres et al. |
| 5,885,158 | A | 3/1999 | Torango et al. |
| 5,941,773 | A | 8/1999 | Harlick |
| 5,944,606 | A | 8/1999 | Gerow |
| 5,947,820 | A | 9/1999 | Morro et al. |
| 5,951,011 | A | 9/1999 | Potter et al. |
| 5,967,894 | A | 10/1999 | Kinoshita et al. |
| 5,976,015 | A | 11/1999 | Seelig et al. |
| 5,980,384 | A | 11/1999 | Barrie |
| 5,984,779 | A | 11/1999 | Bridgeman et al. |
| 5,989,121 | A | 11/1999 | Sakamoto |
| 5,993,316 | A | 11/1999 | Coyle et al. |
| 5,997,400 | A | 12/1999 | Seelig et al. |
| 6,001,016 | A | 12/1999 | Walker et al. |
| 6,004,207 | A | 12/1999 | Wilson, Jr. et al. |
| 6,007,427 | A | 12/1999 | Wiener |
| 6,012,982 | A | 1/2000 | Piechowiak et al. |
| 6,019,369 | A | 2/2000 | Nakagawa et al. |
| 6,033,307 | A | 3/2000 | Vancura |
| 6,039,648 | A | 3/2000 | Guinn et al. |
| 6,048,271 | A | 4/2000 | Barcelou |
| 6,056,642 | A | 5/2000 | Bennett |
| 6,062,980 | A | 5/2000 | Luciano |
| 6,062,981 | A | 5/2000 | Luciano, Jr. |
| 6,068,553 | A | 5/2000 | Parker |
| 6,077,162 | A | 6/2000 | Weiss |
| 6,080,062 | A | 6/2000 | Olson |
| 6,089,977 | A | 7/2000 | Bennett |
| 6,089,980 | A | 7/2000 | Gauselmann |
| 6,102,400 | A | 8/2000 | Scott et al. |
| 6,110,041 | A | 8/2000 | Walker et al. |
| 6,110,043 | A | 8/2000 | Olsen |
| 6,120,376 | A | 9/2000 | Cherry |
| 6,126,542 | A | 10/2000 | Fier |
| 6,142,872 | A | 11/2000 | Walker et al. |
| 6,142,875 | A | 11/2000 | Kodachi et al. |
| 6,146,273 | A | 11/2000 | Olsen |
| 6,152,823 | A | 11/2000 | Lacoste et al. |
| 6,155,925 | A | 12/2000 | Giobbi et al. |
| 6,159,095 | A | 12/2000 | Frohm et al. |
| 6,159,096 | A | 12/2000 | Yoseloff |
| 6,159,097 | A | 12/2000 | Gura |
| 6,162,122 | A | 12/2000 | Acres et al. |
| 6,168,520 | B1 | 1/2001 | Baerlocher et al. |
| 6,174,233 | B1 | 1/2001 | Sunaga et al. |
| 6,174,235 | B1 | 1/2001 | Walker et al. |
| 6,174,237 | B1 | 1/2001 | Stephenson |
| 6,183,366 | B1 | 2/2001 | Goldberg et al. |
| 6,193,606 | B1 | 2/2001 | Walker et al. |
| 6,203,010 | B1 | 3/2001 | Jorasch et al. |
| 6,203,429 | B1 | 3/2001 | Demar et al. |
| 6,203,430 | B1 | 3/2001 | Walker et al. |
| 6,206,374 | B1 | 3/2001 | Jones |
| 6,210,275 | B1 | 4/2001 | Olsen |
| 6,210,277 | B1 | 4/2001 | Stefan |
| 6,217,448 | B1 | 4/2001 | Olsen |
| 6,220,961 | B1 | 4/2001 | Keane et al. |
| 6,224,482 | B1 | 5/2001 | Bennett |
| 6,224,484 | B1 | 5/2001 | Okuda et al. |
| 6,224,486 | B1 | 5/2001 | Walker et al. |
| 6,231,445 | B1 | 5/2001 | Acres |
| 6,234,897 | B1 | 5/2001 | Frohm et al. |
| 6,238,287 | B1 | 5/2001 | Komori et al. |
| 6,238,288 | B1 | 5/2001 | Walker et al. |
| 6,241,608 | B1 | 6/2001 | Torango |
| 6,244,958 | B1 | 6/2001 | Acres |
| 6,254,483 | B1 | 7/2001 | Acres |
| 6,257,981 | B1 | 7/2001 | Acres et al. |
| 6,270,409 | B1 | 8/2001 | Shuster |
| 6,287,202 | B1 | 9/2001 | Pascal et al. |
| 6,293,865 | B1 | 9/2001 | Kelly et al. |
| 6,293,866 | B1 | 9/2001 | Walker et al. |
| 6,299,165 | B1 | 10/2001 | Nagano |
| 6,302,793 | B1 | 10/2001 | Fertitta et al. |
| 6,309,298 | B1 | 10/2001 | Gerow |
| 6,309,299 | B1 | 10/2001 | Weiss |
| 6,312,330 | B1 | 11/2001 | Jones et al. |
| 6,315,660 | B1 | 11/2001 | DeMar et al. |
| 6,315,662 | B1 | 11/2001 | Jorasch et al. |
| 6,319,125 | B1 | 11/2001 | Acres |
| 6,322,078 | B1 | 11/2001 | Adams |
| 6,322,309 | B1 | 11/2001 | Thomas et al. |
| 6,328,649 | B1 | 12/2001 | Randall et al. |
| 6,336,857 | B1 | 1/2002 | McBride |
| 6,343,989 | B1 | 2/2002 | Wood et al. |
| 6,354,592 | B1 | 3/2002 | Virzi |
| 6,358,149 | B1 | 3/2002 | Schneider et al. |
| 6,361,441 | B1 | 3/2002 | Walker et al. |
| 6,371,852 | B1 | 4/2002 | Acres |
| 6,375,567 | B1 | 4/2002 | Acres |
| 6,375,569 | B1 | 4/2002 | Acres |
| 6,386,977 | B1 | 5/2002 | Hole |
| 6,398,218 | B1 | 6/2002 | Vancura |
| 6,406,369 | B1 | 6/2002 | Baerlocher et al. |
| 6,416,408 | B2 | 7/2002 | Tracy et al. |
| 6,416,409 | B1 | 7/2002 | Jordan |
| 6,419,583 | B1 | 7/2002 | Crumby et al. |
| 6,425,828 | B2 | 7/2002 | Walker et al. |
| 6,431,983 | B2 | 8/2002 | Acres |
| 6,435,511 | B1 | 8/2002 | Vancura et al. |
| 6,435,968 | B1 | 8/2002 | Torango |

(56) References Cited

U.S. PATENT DOCUMENTS

| | | | |
|---|---|---|---|
| 6,439,995 | B1 | 8/2002 | Hughs-Baird et al. |
| 6,443,837 | B1 | 9/2002 | Jaffe et al. |
| 6,454,651 | B1 | 9/2002 | Yoseloff |
| 6,464,582 | B1 | 10/2002 | Baerlocher et al. |
| 6,471,591 | B1 | 10/2002 | Crumby |
| 6,506,118 | B1 | 1/2003 | Baerlocher et al. |
| 6,508,707 | B2 | 1/2003 | DeMar et al. |
| 6,511,375 | B1 | 1/2003 | Kaminkow |
| 6,511,376 | B2 | 1/2003 | Walker et al. |
| 6,514,141 | B1 | 2/2003 | Kaminkow et al. |
| 6,533,658 | B1 | 3/2003 | Walker et al. |
| 6,533,664 | B1 | 3/2003 | Crumby |
| 6,546,374 | B1 | 4/2003 | Esposito et al. |
| 6,554,283 | B2 | 4/2003 | Vancura et al. |
| 6,565,434 | B1 | 5/2003 | Acres |
| 6,565,436 | B1 | 5/2003 | Baerlocher |
| 6,569,015 | B1 | 5/2003 | Baerlocher et al. |
| 6,575,830 | B2 | 6/2003 | Baerlocher et al. |
| 6,575,832 | B1 | 6/2003 | Manfredi et al. |
| 6,589,115 | B2 | 7/2003 | Walker et al. |
| 6,592,460 | B2 | 7/2003 | Torango |
| 6,595,854 | B2 | 7/2003 | Hughs-Baird et al. |
| 6,599,185 | B1 | 7/2003 | Kaminkow et al. |
| 6,599,193 | B2 | 7/2003 | Baerlocher et al. |
| 6,607,437 | B2 | 8/2003 | Casey et al. |
| 6,609,971 | B2 | 8/2003 | Vancura |
| 6,609,973 | B1 | 8/2003 | Weiss |
| 6,616,531 | B1 | 9/2003 | Mullins |
| 6,620,046 | B2 | 9/2003 | Rowe |
| 6,626,758 | B1 | 9/2003 | Parham et al. |
| 6,652,378 | B2 | 11/2003 | Cannon et al. |
| 6,656,047 | B1 | 12/2003 | Tarantino et al. |
| 6,656,048 | B2 | 12/2003 | Olsen |
| 6,656,052 | B2 | 12/2003 | Abramopoulos et al. |
| 6,659,864 | B2 | 12/2003 | McGahn et al. |
| 6,666,765 | B2 | 12/2003 | Vancura |
| 6,682,419 | B2 | 1/2004 | Webb et al. |
| 6,682,420 | B2 | 1/2004 | Webb et al. |
| 6,688,977 | B1 | 2/2004 | Baerlocher et al. |
| 6,692,355 | B2 | 2/2004 | Baerlocher et al. |
| 6,695,700 | B2 | 2/2004 | Walker et al. |
| 6,712,695 | B2 | 3/2004 | Mothwurf et al. |
| 6,712,697 | B2 | 3/2004 | Acres |
| 6,726,563 | B1 | 4/2004 | Baerlocher et al. |
| 6,746,328 | B2 | 6/2004 | Cannon et al. |
| 6,749,510 | B2 | 6/2004 | Giobbi |
| 6,758,750 | B2 | 7/2004 | Baerlocher et al. |
| 6,764,397 | B1 | 7/2004 | Robb |
| 6,776,714 | B2 | 8/2004 | Ungaro et al. |
| 6,776,715 | B2 | 8/2004 | Price |
| 6,780,110 | B2 | 8/2004 | Baerlocher et al. |
| 6,790,141 | B2 | 9/2004 | Muir |
| 6,800,030 | B2 | 10/2004 | Acres |
| 6,805,352 | B2 | 10/2004 | Hunter |
| 6,811,483 | B1 | 11/2004 | Webb et al. |
| 6,814,664 | B2 | 11/2004 | Baerlocher et al. |
| 6,817,948 | B2 | 11/2004 | Pascal et al. |
| 6,832,958 | B2 | 12/2004 | Acres et al. |
| 6,837,788 | B2 | 1/2005 | Cannon |
| 6,852,030 | B2 | 2/2005 | Baerlocher et al. |
| 6,860,810 | B2 | 3/2005 | Cannon et al. |
| 6,869,361 | B2 | 3/2005 | Sharpless et al. |
| 6,884,167 | B2 | 4/2005 | Walker et al. |
| 6,884,168 | B2 | 4/2005 | Wood et al. |
| 6,887,154 | B1 | 5/2005 | Luciano, Jr. et al. |
| 6,899,625 | B2 | 5/2005 | Luciano, Jr. et al. |
| 6,908,390 | B2 | 6/2005 | Nguyen et al. |
| 6,910,964 | B2 | 6/2005 | Acres |
| 6,913,532 | B2 | 7/2005 | Baerlocher et al. |
| 6,918,832 | B2 | 7/2005 | Baerlocher et al. |
| 6,918,834 | B2 | 7/2005 | Vancura |
| 6,935,958 | B2 | 8/2005 | Nelson |
| 6,939,234 | B2 | 9/2005 | Beatty |
| 6,955,600 | B2 | 10/2005 | Glavich et al. |
| 6,966,834 | B1 | 11/2005 | Johnson |
| 7,029,395 | B1 | 4/2006 | Baerlocher |
| 7,241,219 | B2 | 7/2007 | Walker et al. |
| 7,354,345 | B2 | 4/2008 | Bortnik et al. |
| 7,393,280 | B2 | 7/2008 | Cannon |
| 7,422,521 | B2 | 9/2008 | Peterson |
| 8,021,222 | B2 | 9/2011 | Walker et al. |
| 2001/0036855 | A1 | 11/2001 | DeFrees-Parrott et al. |
| 2001/0049303 | A1 | 12/2001 | Found |
| 2002/0045475 | A1 | 4/2002 | Glavich et al. |
| 2002/0065123 | A1 | 5/2002 | Packes, Jr. et al. |
| 2002/0071557 | A1 | 6/2002 | Nguyen |
| 2002/0094855 | A1 | 7/2002 | Berman |
| 2002/0116615 | A1 | 8/2002 | Nguyen et al. |
| 2002/0138594 | A1 | 9/2002 | Rowe |
| 2002/0142822 | A1 | 10/2002 | Baerlocher et al. |
| 2002/0142829 | A1 | 10/2002 | Inoue |
| 2002/0152120 | A1 | 10/2002 | Howington |
| 2002/0165023 | A1 | 11/2002 | Brosnan et al. |
| 2002/0187834 | A1 | 12/2002 | Rowe et al. |
| 2002/0193162 | A1 | 12/2002 | Walker et al. |
| 2002/0198036 | A1 | 12/2002 | Baerlocher et al. |
| 2003/0027625 | A1 | 2/2003 | Rowe |
| 2003/0027630 | A1 | 2/2003 | Kelly et al. |
| 2003/0040360 | A1 | 2/2003 | Kaminkow |
| 2003/0045350 | A1 | 3/2003 | Baerlocher et al. |
| 2003/0050111 | A1 | 3/2003 | Saffari |
| 2003/0054878 | A1 | 3/2003 | Benoy et al. |
| 2003/0060254 | A1 | 3/2003 | Cuddy et al. |
| 2003/0060266 | A1 | 3/2003 | Baerlocher |
| 2003/0060269 | A1 | 3/2003 | Paulsen et al. |
| 2003/0060272 | A1 | 3/2003 | Glavich et al. |
| 2003/0060279 | A1 | 3/2003 | Torango |
| 2003/0064772 | A1 | 4/2003 | Tempest et al. |
| 2003/0064773 | A1 | 4/2003 | Baerlocher et al. |
| 2003/0064785 | A1 | 4/2003 | Stone et al. |
| 2003/0069056 | A1 | 4/2003 | Cormack et al. |
| 2003/0069064 | A1 | 4/2003 | Ainsworth |
| 2003/0073482 | A1 | 4/2003 | Baerlocher et al. |
| 2003/0083943 | A1 | 5/2003 | Adams et al. |
| 2003/0092484 | A1 | 5/2003 | Schneider et al. |
| 2003/0119583 | A1 | 6/2003 | Kaminkow et al. |
| 2003/0162584 | A1 | 8/2003 | Hughs-Baird et al. |
| 2003/0162585 | A1 | 8/2003 | Bigelow et al. |
| 2003/0181231 | A1 | 9/2003 | Vancura et al. |
| 2003/0199321 | A1 | 10/2003 | Williams |
| 2003/0207710 | A1 | 11/2003 | Rodgers et al. |
| 2003/0211879 | A1 | 11/2003 | Englman |
| 2003/0211884 | A1 | 11/2003 | Gauselmann |
| 2003/0216166 | A1 | 11/2003 | Baerlocher et al. |
| 2003/0222402 | A1 | 12/2003 | Olive |
| 2003/0228904 | A1 | 12/2003 | Acres et al. |
| 2003/0232640 | A1 | 12/2003 | Walker et al. |
| 2003/0232647 | A1 | 12/2003 | Moser |
| 2003/0236116 | A1 | 12/2003 | Marks et al. |
| 2004/0009811 | A1 | 1/2004 | Torango |
| 2004/0029631 | A1 | 2/2004 | Duhamel |
| 2004/0048649 | A1 | 3/2004 | Peterson et al. |
| 2004/0048652 | A1 | 3/2004 | Ching et al. |
| 2004/0053672 | A1 | 3/2004 | Baerlocher |
| 2004/0053683 | A1 | 3/2004 | Hartl et al. |
| 2004/0072615 | A1 | 4/2004 | Maya et al. |
| 2004/0087368 | A1 | 5/2004 | Gavselmann |
| 2004/0137982 | A1 | 7/2004 | Cuddy et al. |
| 2004/0147306 | A1 | 7/2004 | Randall et al. |
| 2004/0152509 | A1 | 8/2004 | Hornik et al. |
| 2004/0171416 | A1 | 9/2004 | Baerlocher et al. |
| 2004/0171420 | A1 | 9/2004 | Baerlocher et al. |
| 2004/0235552 | A1 | 11/2004 | Gauselmann |
| 2004/0242297 | A1 | 12/2004 | Walker |
| 2004/0254018 | A1* | 12/2004 | Priestar ........................... 463/42 |
| 2005/0026694 | A1 | 2/2005 | Kelly et al. |
| 2005/0029745 | A1 | 2/2005 | Walker et al. |
| 2005/0032573 | A1 | 2/2005 | Acres et al. |
| 2005/0054429 | A1 | 3/2005 | Baerlocher et al. |
| 2005/0070356 | A1 | 3/2005 | Mothwurf |
| 2005/0075163 | A1 | 4/2005 | Cuddy et al. |
| 2005/0079908 | A1 | 4/2005 | Pacey |
| 2005/0079911 | A1 | 4/2005 | Nakatsu |
| 2005/0101374 | A1 | 5/2005 | Acres |

(56) References Cited

U.S. PATENT DOCUMENTS

| | | | |
|---|---|---|---|
| 2005/0101375 | A1 | 5/2005 | Webb et al. |
| 2005/0101384 | A1 | 5/2005 | Parham |
| 2005/0119047 | A1 | 6/2005 | Olive |
| 2005/0143168 | A1 | 6/2005 | Torango |
| 2005/0159211 | A1 | 7/2005 | Englman |
| 2005/0176488 | A1 | 8/2005 | Olive |
| 2005/0192083 | A1 | 9/2005 | Iwamoto |
| 2005/0192099 | A1 | 9/2005 | Nguyen et al. |
| 2005/0197180 | A1 | 9/2005 | Kaminkow et al. |
| 2005/0209004 | A1 | 9/2005 | Torango |
| 2005/0227754 | A1 | 10/2005 | Kaminkow et al. |
| 2005/0239542 | A1 | 10/2005 | Olsen |
| 2005/0267610 | A1 | 12/2005 | Shinoda |
| 2005/0282626 | A1 | 12/2005 | Manfredi et al. |
| 2006/0003829 | A1 | 1/2006 | Thomas |
| 2006/0010001 | A1 | 1/2006 | Hamelink |
| 2006/0025210 | A1 | 2/2006 | Johnson |
| 2006/0035694 | A1 | 2/2006 | Fuller |
| 2006/0035706 | A1 | 2/2006 | Thomas et al. |
| 2006/0040732 | A1 | 2/2006 | Baerlocher et al. |
| 2006/0040736 | A1 | 2/2006 | Baerlocher et al. |
| 2006/0052159 | A1 | 3/2006 | Cahill et al. |
| 2006/0052161 | A1 | 3/2006 | Soukup et al. |
| 2006/0052162 | A1 | 3/2006 | Soukup et al. |
| 2006/0052169 | A1 | 3/2006 | Britt et al. |
| 2006/0058089 | A1 | 3/2006 | White et al. |
| 2006/0073889 | A1 | 4/2006 | Edidin et al. |
| 2006/0073897 | A1 | 4/2006 | Englman et al. |
| 2006/0121972 | A1 | 6/2006 | Walker et al. |
| 2006/0178203 | A1 | 8/2006 | Hughes et al. |
| 2007/0004508 | A1 | 1/2007 | Walker et al. |
| 2007/0060247 | A1 | 3/2007 | Low et al. |
| 2007/0060319 | A1 | 3/2007 | Block et al. |
| 2007/0077988 | A1 | 4/2007 | Friedman |
| 2007/0293293 | A1 | 12/2007 | Baerlocher et al. |
| 2007/0298857 | A1 | 12/2007 | Schlottmann et al. |
| 2007/0298873 | A1 | 12/2007 | Nguyen et al. |
| 2008/0045344 | A1 | 2/2008 | Schlottmann et al. |
| 2008/0070680 | A1 | 3/2008 | Baerlocher et al. |
| 2008/0070692 | A1 | 3/2008 | Schlottmann et al. |
| 2008/0070693 | A1 | 3/2008 | Schlottmann et al. |
| 2008/0070694 | A1 | 3/2008 | Schlottmann et al. |
| 2008/0070695 | A1 | 3/2008 | Baerlocher et al. |
| 2009/0163271 | A1 | 6/2009 | George et al. |
| 2011/0306407 | A1 | 12/2011 | Walker et al. |

FOREIGN PATENT DOCUMENTS

| | | | |
|---|---|---|---|
| AU | 567001 | | 11/1987 |
| AU | 585160 | | 6/1989 |
| AU | 589158 | | 10/1989 |
| AU | 593059 | | 2/1990 |
| AU | 630112 | | 3/1990 |
| AU | 628330 | | 9/1992 |
| AU | 633469 | | 1/1993 |
| AU | 649009 | | 5/1994 |
| AU | 655801 | | 1/1995 |
| AU | 1996 70247 | | 4/1997 |
| AU | 680920 | | 8/1997 |
| AU | 710015 | | 9/1997 |
| AU | 733599 | | 10/1997 |
| AU | 722969 | | 6/1998 |
| AU | 1998 63553 | A | 10/1998 |
| AU | 1998 84162 | A1 | 3/1999 |
| AU | 707687 | | 7/1999 |
| AU | 1999 17318 | A1 | 9/1999 |
| AU | 709724 | | 9/1999 |
| AU | 711501 | | 10/1999 |
| AU | 714299 | | 12/1999 |
| AU | 716299 | | 2/2000 |
| AU | 721968 | | 7/2000 |
| AU | 722107 | | 7/2000 |
| AU | 728788 | | 1/2001 |
| AU | 2001 1000032 | | 11/2001 |
| AU | 2001 1000033 | | 11/2001 |
| AU | 748263 | | 5/2002 |
| AU | 749222 | | 6/2002 |
| AU | 754689 | | 11/2002 |
| AU | 758306 | | 3/2003 |
| DE | 3415114 | | 10/1985 |
| DE | 8710757 | | 11/1987 |
| DE | 3638100 | | 11/1988 |
| DE | 3917683 | | 12/1990 |
| DE | 4200254 | | 8/1993 |
| DE | 4301855 | | 7/1994 |
| DE | 19600787 | | 5/1997 |
| DE | 19613455 | | 8/1997 |
| DE | 19936196 | | 1/2001 |
| EP | 0 342 797 | | 11/1989 |
| EP | 0 444 932 | | 2/1991 |
| EP | 0 449 433 | | 10/1991 |
| EP | 0 798 676 | | 10/1997 |
| EP | 0 874 337 | | 10/1998 |
| EP | 0 926 645 | | 6/1999 |
| EP | 0 944 030 | | 9/1999 |
| EP | 0 945 837 | | 9/1999 |
| EP | 0 981 119 | | 2/2000 |
| EP | 0 984 408 | | 3/2000 |
| EP | 0 984 409 | | 3/2000 |
| EP | 1 003 138 | | 5/2000 |
| EP | 1 467 329 | | 10/2004 |
| EP | 1 498 860 | | 1/2005 |
| EP | 1 513 114 | | 3/2005 |
| EP | 1 528 516 | | 5/2005 |
| EP | 1 528 517 | | 5/2005 |
| GB | 912 685 | | 12/1962 |
| GB | 2 083 936 | | 3/1982 |
| GB | 2 096 376 | | 10/1982 |
| GB | 2 097 160 | | 10/1982 |
| GB | 2 100 905 | | 1/1983 |
| GB | 2 117 155 | | 10/1983 |
| GB | 2 117 952 | | 10/1983 |
| GB | 2 118 445 | | 11/1983 |
| GB | 2 144 644 | | 3/1984 |
| GB | 2 137 392 | | 10/1984 |
| GB | 2 139 390 | | 11/1984 |
| GB | 2 142 457 | | 1/1985 |
| GB | 2 147 773 | | 5/1985 |
| GB | 2 148 135 | | 5/1985 |
| GB | 1 151 054 | | 7/1985 |
| GB | 2 153 572 | | 8/1985 |
| GB | 2 161 008 | | 1/1986 |
| GB | 2 161 009 | | 1/1986 |
| GB | 2 170 636 | | 8/1986 |
| GB | 2 180 682 | | 4/1987 |
| GB | 2 181 589 | | 4/1987 |
| GB | 2 183 882 | | 6/1987 |
| GB | 2 191 030 | | 12/1987 |
| GB | 2 201 821 | | 9/1988 |
| GB | 2 222 712 | | 3/1990 |
| GB | 2 226 436 | | 6/1990 |
| GB | 2 226 907 | | 7/1990 |
| GB | 2 231 189 | | 11/1990 |
| GB | 2 282 690 | | 4/1995 |
| GB | 2 322 217 | | 8/1998 |
| GB | 2 333 880 | | 9/1998 |
| GB | 2 328 311 | | 2/1999 |
| GB | 2 353 128 | | 2/2001 |
| GB | 2 383 668 | | 11/2001 |
| GB | 2 387 703 | | 10/2003 |
| JP | 7148307 | | 6/1995 |
| JP | 2001-297200 | A | 10/2001 |
| JP | 2002-320703 | | 11/2002 |
| JP | 2003-141302 | A | 5/2003 |
| WO | WO 94 12256 | | 6/1994 |
| WO | WO 95 22811 | | 8/1995 |
| WO | WO 95 30944 | | 11/1995 |
| WO | WO 97 12338 | | 4/1997 |
| WO | WO 97 27568 | | 7/1997 |
| WO | WO 97 32285 | | 9/1997 |
| WO | WO 98 35309 | | 8/1998 |
| WO | WO 98 47115 | | 10/1998 |
| WO | WO 98 51384 | | 11/1998 |

(56) References Cited

FOREIGN PATENT DOCUMENTS

| | | |
|---|---|---|
| WO | WO 99 03078 | 1/1999 |
| WO | WO 99 10849 | 3/1999 |
| WO | WO 00 12186 | 3/2000 |
| WO | WO 00 32286 | 6/2000 |
| WO | WO 00 66235 | 11/2000 |
| WO | WO 00 76606 | 12/2000 |
| WO | WO 01 10523 | 2/2001 |
| WO | WO 01 15055 | 3/2001 |
| WO | WO 01 15790 | 3/2001 |
| WO | WO 01 26019 | 4/2001 |
| WO | WO 03 030066 | 4/2003 |
| WO | WO 03 075235 | 9/2003 |
| WO | WO 2004 035161 | 4/2004 |
| WO | WO 2004 066061 | 8/2004 |
| WO | WO 2005 027058 | 3/2005 |
| WO | WO 2005 076193 | 8/2005 |
| WO | WO 2005 081623 | 9/2005 |
| WO | WO 2005 083599 | 9/2005 |
| WO | WO 2005 099425 | 10/2005 |
| WO | WO 2005 099845 | 10/2005 |
| WO | WO 2005 106702 | 11/2005 |
| WO | WO 2005 113093 | 12/2005 |
| WO | WO 2006 014770 | 2/2006 |
| WO | WO 2006 014883 | 2/2006 |
| WO | WO 2006 014990 | 2/2006 |
| WO | WO 2006 039366 | 4/2006 |

OTHER PUBLICATIONS

Atronic Systems Progressive Products at G2E, published by Atronic in 2004, printed from ForRelease.com.
Austin Powers in Goldmember™ Advertisement written by IGT, published in 2003.
Big Shot!™ Advertisement published by Aristocrat Technologies, Inc., published in 2002.
Big Top Keno Advertisement published by Aristocrat Technologies, Inc., published in 2000.
Cartoon Jackpots description, printed from www.ballygaming.com/home.asp, on Feb. 4, 2005.
Cash Express Advertisements, written by Aristocrat, published in 2002.
Cashing In Article, written by Strictly Slots, published in Aug. 2006.
Fast Buck Systems Manual, written by International Game Technology, available to Mirage shift supervisors at least as early as May 30, 1990.
Hot Shot Progressive Article, written by Strictly Slots, published in Feb. 2006.
Jackpot Carnival Hyperlink Advertisement, written by Aristocrat, published prior to 2002.
Jackpot Hunter Advertisement, written by IGT, available prior to Jan. 2005.
Lemons, Cherries and Bell-Fruit-Gum written by Richard M. Bueschel, pp. 39-41, 64, 70, 137, 149-150, 195-196 and 251, 1995.
Lemons, Cherries and Bell-Fruit-Gum, pp. 1 to 4 and 304 to 314, written by Bueschel, published in Royal Bell Books in Nov. 1995.
Little Green Men Jr.™ Article written by Strictly Slots, published in Feb. 2003.
Magic 8 Ball Advertisement written by IGT, published in 2002.
Mikohn Product Catalog, Chapters 1, 2, 6, 7 and 8, written by Mikohn, published in Jan. 1993.
Mikohn Ripley's Believe It or Not Article written by Strictly Slots published in 2001.
Mikohn Super Controller Manual, Chapters 1 to 3 and 6 to 7, written by Mikohn, published in 1989.
Millioni$er articles, written by Strictly Slots, published in Sep. 2003 and Mar. 2004.
Money Grab Article written by Strictly Slots, published in Apr. 2001.
Money Time advertisement, written by Mikohn Gaming, published in 1999.
Money to Burn Brochure written by WMS Gaming, Inc., published prior to 2001.
Monte Carlo Advertisement written by Bally Gaming, published prior to Sep. 2002.
PEM—Precision Electronic Meter, written by GRIPS Electronic GmbH, printed from website reported as archived on Feb. 20, 1997 (available at http://web.archive.org/web/19970220165753/www.grips.com/pem.htm).
Penguin Pucks article, written by Note in Gaming Marketplace, published prior to 2004.
Pick a Prize Brochure written by Acres Gaming Incorporated, published prior to 2001.
Player Tracking on Slots, written by GRIPS Electronic GmbH, printed from website reported as archived on Feb. 20, 1997 (available at http://web.archive.org/web/19970220165921/www.grips.com/playtrac.htm).
Progressive Jackpot System article, printed from casinomagazine.com.managearticle.asp@c_2908a=518, on Jun. 21, 2004.
ProLINK Progressive Controller User/Reference Manual, written by Casino Data Systems, published in Apr. 1997.
Quick Pick Paytime Brochure written by Acres Gaming Incorporated, published prior to 2001.
Scarne's New Complete Guide to Gambling (© 1997)—John Scarne.
Slot Line Progressive Advertisement, written by IGT, published in 1993.
Slot Line Progressive Advertisement, written by IGT, published in 1994.
Slot Line Progressive Advertisement, written by IGT, published in 1995.
Slot Line Progressive Mega Jackpots Advertisement, written by IGT, published in 1997.
Slot Line Temperature Rising Game Description, written by IGT, published in 1998.
Slot Machines A Pictorial History of the First 100 Years (pp. 216, 242 to 243), 5th edition, written by Marshall Fey, published in 1983-1997.
Slot Machines and Coin-Op Games written by Bill Kurtz, pp. 16, 65, 105 and 111, 1991.
Slot Machines on Parade, 1st edition written by Robert N. Geddes and illustrated by Daniel R. Mead, published in 1980.
Super Cherry Advertisement written by IGT in 2001.
Take Your Pick Brochure and Article written by IGT/Anchor Games, Strictly Slots, published in 1999.
Top Dollar Brochure written by IGT, published in 1998.
Wide Area Progressive Link System, written by GRIPS Electronic GmbH, printed from website reported as archived on Feb. 20, 1997 (available at http://web.archive.org/web/19970220165457/www.grips.com/wap.htm).
Zorro Advertisement, written by Aristocrat, published in 2004.
International Search Report corresponding to PCT Patent Application No. PCT/US07/72211 dated Jul. 7, 2008.
Written Opinion corresponding to PCT Patent Application No. PCT/US07/72211 dated Jul. 7, 2008.
Thousands Win Every Time Jumbo Jackpot Hits. Station Casinos Press Release [online]. May 20, 2005 [retrieved on Feb. 3, 2011]. Retrieved from the Internet: <URL:http://www.stationcasinos.com/corp/newsroom/releases/2005/052005.php>.
Office Action for U.S. Appl. No. 13/212,618 dated Jun. 15, 2012.
Office Action for U.S. Appl. No. 11/428,419 dated May 30, 2012.
Letter from Reina Kakimoto of Mots Law dated Jan. 24, 2012 regarding Third Party Submission Filed for U.S. Appl. No. 13/197,501 (2 pages).
Third Party Submission in Published Application Under 37 C.F.R. 1.99 for U.S. Appl. No. 13/197,501, dated Jan. 24, 2012 (3 pages).

* cited by examiner

FIG. 8

| GAMING MACHINE | PLAYER | AMOUNT OF EACH PLACED WAGER (IN MONETARY UNITS) | AVERAGE FREQUENCY OF EACH PLACED WAGER (SECONDS PER EACH PLACED WAGER) | AMOUNT WAGERED DURING BONUS EVENT QUALIFICATION PERIOD ( IN MONETARY UNITS WAGERED DURING A THIRTY SECOND TIME PERIOD) | NUMBER OF WAGERS PLACED DURING BONUS EVENT QUALIFICATION PERIOD ( A THIRTY SECOND TIME PERIOD) | RANK |
|---|---|---|---|---|---|---|
| 14A | A | 250 | 7.5 | 1000 | 4 | 1 |
| 14B | B | 100 | 15 | 200 | 2 | 2 |
| 14C | C | 50 | 10 | 150 | 3 | 3 |
| 14D | D | 10 | 6 | 50 | 5 | 4 |

FIG. 9

| GAMING MACHINE | PLAYER | AMOUNT OF EACH PLACED WAGER (IN MONETARY UNITS) | AVERAGE FREQUENCY OF EACH PLACED WAGER (SECONDS PER EACH PLACED WAGER) | AMOUNT WAGERED DURING BONUS EVENT QUALIFICATION PERIOD ( IN MONETARY UNITS WAGERED DURING A NINETY SECOND TIME PERIOD) | NUMBER OF WAGERS PLACED DURING BONUS EVENT QUALIFICATION PERIOD ( A NINETY SECOND TIME PERIOD) | RANK |
|---|---|---|---|---|---|---|
| 14A | A | 250 | 0 | 0 | 0 | NOT RANKED |
| 14B | B | 200 | 15 | 1200 | 6 | 1 |
| 14C | C | 50 | 10 | 450 | 9 | 2 |
| 14D | D | 10 | 6 | 150 | 15 | 3 |

FIG. 10

| GAMING MACHINE | PLAYER | AMOUNT OF EACH PLACED WAGER (IN MONETARY UNITS) | AVERAGE FREQUENCY OF EACH PLACED WAGER (SECONDS PER EACH PLACED WAGER) | AMOUNT WAGERED DURING BONUS EVENT QUALIFICATION PERIOD ( IN MONETARY UNITS WAGERED DURING A ONE HUNDRED TWENTY SECOND TIME PERIOD) | NUMBER OF WAGERS PLACED DURING BONUS EVENT QUALIFICATION PERIOD ( A ONE HUNDRED TWENTY SECOND TIME PERIOD) | PREVIOUS RANK | RANK |
|---|---|---|---|---|---|---|---|
| 14A | A | 250 | 30 | 1000 | 4 | 1 | 2 |
| 14B | B | 150 | 15 | 1400 | 8 | 2 | 1 |
| 14C | C | 50 | 10 | 600 | 12 | 3 | 3 |
| 14D | D | 10 | 6 | 200 | 20 | 4 | 4 |

FIG. 11

| PLAYER | NUMBER OF GAMES | NUMBER OF MAX. WAGERS | NUMBER OF WAGERED MONETARY UNITS | RANK POINTS FOR NUMBER OF GAMES | RANK POINTS FOR NUMBER OF MAX. WAGERS | RANK POINTS FOR NUMBER OF WAGERED MONETARY UNITS | TOTAL RANK POINTS | OVERALL RANK |
|---|---|---|---|---|---|---|---|---|
| A | 4 | 4 | 400 | 80 | 90 | 95 | 260 | 1 |
| B | 6 | 3 | 300 | 100 | 80 | 75 | 255 | 2 |
| C | 2 | 2 | 400 | 50 | 70 | 95 | 210 | 4 |
| D | 4 | 1 | 200 | 80 | 50 | 50 | 175 | 6 |
| E | 5 | 5 | 250 | 90 | 100 | 60 | 250 | 3 |
| F | 3 | 2 | 300 | 60 | 70 | 75 | 200 | 5 |

FIG. 12

| PLAYER | NUMBER OF GAMES | NUMBER OF MAX. WAGERS | NUMBER OF WAGERED MONETARY UNITS | RANK POINTS FOR NUMBER OF GAMES | RANK POINTS FOR NUMBER OF MAX WAGERS | RANK POINTS FOR NUMBER OF WAGERED MONETARY UNITS | TOTAL RANK POINTS | OVERALL RANK |
|---|---|---|---|---|---|---|---|---|
| A | 4 | 4 | 400 | 3.5 | 5 | 5.5 | 14 | 1 |
| B | 6 | 3 | 300 | 6 | 4 | 3.5 | 13.5 | 2 |
| C | 2 | 2 | 400 | 1 | 2.5 | 5.5 | 9 | 4 |
| D | 4 | 1 | 200 | 3.5 | 1 | 1 | 5.5 | 6 |
| E | 5 | 5 | 250 | 5 | 6 | 2 | 13 | 3 |
| F | 3 | 2 | 300 | 2 | 2.5 | 3.5 | 8 | 5 |

FIG. 14

| GAMING MACHINE | PLAYER | NUMBER OF GAMES | TOTAL WAGERED MONETARY UNITS | RANKING | PROBABILITY OF BEING SELECTED |
|---|---|---|---|---|---|
| 14A | A | 4 | 64 | 1 | 100% |
| 14B | B | 3 | 24 | 2 | 0% |
| 14Z | C | 6 | 12 | 3 | 0% |

FIG. 15

| GAMING MACHINE | PLAYER | NUMBER OF GAMES | TOTAL WAGERED MONETARY UNITS | RANKING | PROBABILITY OF BEING SELECTED |
|---|---|---|---|---|---|
| 14A | A | 4 | 12 | 1A | 50% |
| 14B | B | 3 | 12 | 1B | 50% |
| 14Z | C | 6 | 6 | 3 | 0% |

FIG. 16

| GAMING MACHINE | PLAYER | NUMBER OF GAMES | TOTAL WAGERED MONETARY UNITS | RANKING | PROBABILITY OF BEING SELECTED |
|---|---|---|---|---|---|
| 14A | A | 4 | 64 | 1A | 33% (rounded) |
| 14B | B | 3 | 24 | 1B | 33% (rounded) |
| 14Z | C | 6 | 12 | 1C | 33% (rounded) |

FIG. 17

| GAMING MACHINE | PLAYER | NUMBER OF GAMES | TOTAL WAGERED MONETARY UNITS | RANKING | PROBABILITY OF BEING SELECTED |
|---|---|---|---|---|---|
| 14A | A | 4 | 64 | 1A | 65% |
| 14B | B | 3 | 24 | 1B | 24% |
| 14Z | C | 6 | 12 | 1C | 12% |

GAMING SYSTEM HAVING AWARDS PROVIDED BASED ON RATE OF PLAY

PRIORITY CLAIM

This application is a continuation application of, claims priority to and the benefit of U.S. patent application Ser. No. 13/197,501, filed on Aug. 3, 2011, which is a continuation application of, claims priority to and the benefit of U.S. patent application Ser. No. 11/466,315, filed on Aug. 22, 2006, now U.S. Pat. No. 8,012,014, the entire contents of which are each incorporated by reference herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Symbols or symbol combinations which are less likely to occur usually provide higher awards.

In such known gaming machines, the amount of the wager made on the base game by the player may vary. For instance, the gaming machine may allow the player to wager a minimum number of credits, such as one credit (e.g., one penny, nickel, dime, quarter or dollar) up to a maximum number of credits, such as five credits. This wager may be made by the player a single time or multiple times in a single play of a primary game. For instance, a slot game may have one or more paylines and the slot game may allow the player to make a wager on each payline in a single play of the primary game. Slot games with 1, 3, 5, 9, 15 and 25 lines are widely commercially available. Thus, it is known that a gaming machine, such as a slot game, may allow players to make wagers of substantially different amounts on each play of the primary or base game ranging, for example, from one credit up to 125 credits (e.g., five credits on each of 25 separate paylines). This is also true for other wagering games, such as video draw poker, where players can wager one or more credits on each hand and where multiple hands can be played simultaneously. Accordingly, it should be appreciated that different players play at substantially different wagering amounts or levels and at substantially different rates of play.

Secondary or bonus games are also known in gaming machines. The secondary or bonus games usually provide an additional award to the player. Secondary or bonus games usually do not require an additional wager by the player to be activated. Secondary or bonus games are generally activated or triggered upon an occurrence of a designated triggering symbol or triggering symbol combination in the primary or base game. For instance, a bonus symbol occurring on the payline on the third reel of a three reel slot machine may trigger the secondary bonus game. When a secondary or bonus game is triggered, the gaming machines generally indicates this to the player through one or more visual and/or audio output devices, such as the reels, lights, speakers, video screens, etc. Part of the enjoyment and excitement of playing certain gaming machines is the occurrence of the secondary or bonus game (even before the player knows how much the bonus award will be). In other words, obtaining a bonus award is part of the enjoyment and excitement for players.

Progressive awards associated with gaming machines are also known. A progressive award is an award amount which includes an initial amount funded by a casino and an additional amount funded through a portion of each wager made on the progressive gaming machine. For example, 1% of each wager placed on the primary game of the gaming machine may be allocated to the progressive award or progressive award fund. The progressive award grows in value as more players play the gaming machine and more portions of the players wagers are allocated to the progressive award. When a player obtains a winning symbol or symbol combination which results in the progressive award, the accumulated progressive award is provided to the player. After the progressive award is provided to the player, the amount of the next progressive award is reset to the initial value and a portion of each subsequent wager is allocated to the next progressive award as described above.

A progressive award may be associated with a single gaming machine or multiple gaming machines which each contribute portions of the progressive award. The multiple gaming machines may be in the same bank of machines, in the same casino or gaming establishment (usually through a local area network ("LAN")) or in two or more different casinos or gaming establishments (usually through a wide area network ("WAN")). Such progressive awards are sometimes called local area progressives ("LAP") and wide area progressives ("WAP"), respectively.

There is a continuing need to provide new and different gaming machines and gaming systems as well as new and different ways to provide awards to players including bonus awards and progressive awards. There is also a continuing need to provide new and different linked or related gaming machines.

SUMMARY

One embodiment disclosed herein provides a gaming system including a central server or controller in communication with or linked to a plurality of gaming machines or gaming devices. Another embodiment provides a method for operating a gaming system. An alternative embodiment provides a gaming system having a plurality of linked gaming machines where one of the gaming machines functions as the central server or controller. The gaming system also includes at least one award adapted to be provided to one or more players of the gaming machines in the gaming system. The terms central server and controller as well as the terms gaming machine and gaming device are used interchangeably herein.

Generally, players of system gaming machines play at different rates, wager different amounts, wager different denominations and often vary these rates and amounts. These rates and amounts are generally referred to herein as player activity, wager activity and/or play activity.

In operation of one embodiment, the central server or controller monitors this wager activity and/or play activity on each gaming machine. Based at least in part on the wager activity and/or play activity, the central server or controller determines a ranking for one, a plurality or all of the players playing the gaming machines. In another embodiment, the central server or controller determines a ranking for one, a plurality or all of the gaming machines based at least in part on the wager activity and/or play activity. In addition to determining the ranking, the central server or controller monitors the gaming system for a triggering event. After the occurrence of the triggering event, the central server or controller selects which of the player(s) or gaming machine(s), if any, to be provided any award(s). This selection is based at least in part on the rankings determined by the central server or controller.

The controller acquires or determines at least one ranking component for each player or for each gaming machine in the gaming system through monitoring of wager activity or play activity as described above. Each ranking component can be acquired or determined as statistical data. The statistical data may include any suitable numerical or quantitative value based on wagering and/or play activity by the players or gaming machines in the gaming system. In one embodiment, the statistical data is accumulated and stored in separate ranking component categories to form an accumulated ranking table. The terms ranking component and ranking component category are used interchangeably herein.

Acquired ranking components include at least one of the following: (1) a total amount wagered on each gaming machine, (2) a total amount wagered by each player, (3) a number of games played on each gaming machine, wherein the games are primary or secondary games, (4) a number of games played by each player, wherein the games are primary or secondary games, (5) an amount of each wager placed on each play of each gaming machine, wherein the play is of a primary or secondary game, (6) an amount of each wager placed on each play by each player, wherein the play is of a primary or secondary game, (7) an amount of time between each play of each game on the gaming machines, wherein the play is of a primary or secondary game, (8) an amount of time between each play of each game by each player and (9) a quality of play of each player (i.e., a player's skill level or how closely each player plays to optimal play). In various alternative embodiments, a players ranking can be based on only one or only a designated number of the above-listed ranking components. The central server or controller may acquire the ranking components in play of a primary game, a secondary game or both on each of the system gaming machines.

In one embodiment, the controller determines a rank or ranking for at least one player based on at least one of the acquired ranking components. For example, as indicated above in one embodiment, one tracked or acquired ranking component includes the amount wagered on plays of each gaming machine in the gaming system. In this example, the controller includes: (a) a separate coin-in or wager meter for each individual gaming machine which tracks the total coin-in or wagers placed on the primary games for each of the gaming machines in the gaming system, and (b) a total coin-in or wager meter which tracks the total coin-in wagers placed on all of the primary games for all of the gaming machines in the gaming system. This total wager meter can be a calculated amount based on the sum of the individual gaming machine coin-in meters. The controller tracks the total wagers for each individual gaming machine and the total wagers for all of the gaming machines in the gaming system in any suitable compatible or comparable manner such as credits wagered (i.e., if all of the system gaming machines are of the same denomination) or monetary units (e.g., total dollars or other currency) wagered. Alternatively, each of the gaming machines tracks the wagers placed on that gaming machine (via an individual gaming machine meter). This can be done for all wagers on the gaming machine or for the wagers placed by individual players. In this embodiment, the gaming machines send information to the central controller upon request from the central controller, at designated intervals or in any other suitable manner. Tracking in monetary units accounts for gaming machines having multi-denominations and/or for gaming machines of different denominations and/or gaming machines which accept different currencies. Monetary units wagered on gaming machines are sometimes referred to as "coin-in" in the gaming industry and herein.

In another embodiment, the controller determines a rank or ranking for at least one player based on a plurality of the acquired ranking components. For example, as indicated above in one embodiment, the central server or controller tracks or acquires an amount of each wager placed on each play of each player wherein the play is of a primary or secondary game and an amount of time between each play of each game by each player as ranking components. In this example, the tracked or acquired ranking components determine a rate of play for each player.

In one embodiment, the controller tracks or acquires one or more ranking components dynamically. That is, the controller tracks or acquires one or more ranking components during a constantly or consistently moving time period. The moving time period is represented by a moving indicator that shifts or moves in accordance with a predetermined algorithm or any other suitable manner. Each ranking component, such as wager activity, is associated with at least one player and is acquired or tracked over the moving time period. The wager activity may include wagers of monetary units placed by the player in one or more games. In one embodiment, the moving time period is illustrated by a time window or any other suitable moving indicator. The time window represents a predetermined number of time units. As time passes, the time window moves or shifts from an initial time unit, such as zero or a first time unit, to a final time unit, such as a thirtieth time unit or a fiftieth time unit. The central server or controller utilizes the wager activity acquired from the player during the time units represented by the time window to determine a ranking for the player. It should be appreciated that the time window moves or shifts at designated intervals, such as every second, every ten seconds, every thirty seconds or at any other suitable number of time units. With each movement, different time units (and different ranking components) are utilized by the central server or controller to determine the player's ranking. The central server or controller positions the ranked player along a ranking scale relative to other ranked players based on the determined ranking.

It should be appreciated that a player may change gaming machines during the acquisition of ranking component(s) and that the tracking and acquisition of ranking component(s) can be independent of the specific gaming machine. For example, in this embodiment, the central server or controller monitors, tracks and acquires wager activity or play activity on each gaming machine by individual players through a player tracking system or player tracking card, which is operable with system gaming machines. In an alternative embodiment, the central server or controller determines a rank or ranking for at least one gaming machine based on at least one or a plurality of acquired ranking components.

After determining the rankings, in one embodiment, the controller selects a ranked player and provides an award or bonus award to the same based on the ranking determined for the player. In one embodiment, the controller selects and provides a bonus award to the highest ranked player. In another embodiment, the controller selects and provides a bonus award to a plurality of ranked players, such as the three highest ranked players or the highest ranked group of players. In another embodiment, the controller selects a plurality of players and provides a bonus award to only one player in the selected plurality of players. For example, if two players are tied for a highest ranking, the controller may determine which one of the two selected players are provided an award. This determination may be made randomly based on suitable probabilities or percentages or may be predetermined or determined in another suitable manner. In an additional embodiment, the controller selects a plurality of players and provides any award(s) to all of the selected players. In alternative embodiments, the controller selects and provides an award or bonus award to a player or a plurality of players based on the rankings of system gaming machines instead of rankings of one or more players as described above.

The number of awards and the amount of the awards provided to ranked player(s) selected by the central server or controller can vary and be determined in a variety of different manners in accordance with the embodiments disclosed herein. In one embodiment, one award is selected to be provided to one or more ranked players of gaming machines in the gaming system. In another embodiment, one award from a plurality of different awards is selected to be provided to one or more ranked players of gaming machines in the gaming system. In one such embodiment, the plurality of awards are progressive awards. In another embodiment, central server or controller determines the number of awards based on the number of ranked players or gaming devices in the gaming system at a designated time, for example, when a triggering event occurs.

One embodiment provides one or more displays in conjunction with the gaming machines. The one or more displays provide the players of the gaming machines information about the ranking components, rankings for player(s) and/or gaming device(s) and awards. Such display increases player awareness of these ranking components, rankings and awards and interaction between the players of the gaming machines.

It is therefore an advantage of the disclosed embodiments to provide a gaming system including a central server or controller linked to a plurality of gaming machines, wherein the central server (1) acquires at least one ranking component based on wager activity, play activity or both from each of the plurality of gaming machines, (2) determines rankings based on the acquired ranking components, and (3) selects at least one player or gaming device for an award based on the determined rankings. Ranking players or gaming machines based on wager activity and play activity increases player excitement and enjoyment.

Another advantage of the disclosed embodiments is to provide a gaming system and a method for operating a gaming system that awards players for a high rate of wager activity or play activity in a primary game, a secondary game or both a primary game and a secondary game.

A further advantage of the disclosed embodiments is to provide a gaming system and a method for operating a gaming system that ranks players or gaming machines in the gaming system and continually adjusts the rankings in response to the wager activity and play activity on system gaming machines.

Another advantage of the disclosed embodiments is to provide a gaming system and a method for operating a gaming system that displays the rankings for the players, the gaming machines or both determined or ranked by the central server or controller.

Additional features and advantages of the disclosed embodiments are described in, and will be apparent from, the following Detailed Description and the Figures.

BRIEF DESCRIPTION OF THE FIGURES

FIG. 8 is a chart illustrating an example of rankings determined for four players of gaming machines based on ranking components acquired during a designated time period.

FIG. 9 is a chart illustrating an example of rankings determined for four players of gaming machines based on ranking components acquired during a designated time period, wherein at least one player is not ranked.

FIG. 10 is a chart illustrating an example of rankings determined for four players of gaming machines based on accumulated ranking components during a plurality of designated time periods.

FIG. 11 is a chart illustrating an example of rankings determined for six players of gaming machines based on ranking components accumulated during one or more designated time periods.

FIG. 12 is a chart illustrating an example of rankings determined for six players of gaming machines based on ranking components accumulated during one or more designated time periods.

FIG. 14 is a chart illustrating an example of rankings determined for three players of gaming machines based on accumulated ranking components and a probability of being selected for an award based on the player rankings in one embodiment of the gaming system.

FIG. 15 is a chart illustrating an example of rankings determined for three players of gaming machines based on accumulated ranking components and a probability of being selected for a bonus award based on the player rankings in one embodiment of the gaming system.

FIG. 16 is a chart illustrating an example of rankings determined for three players of gaming machines based on accumulated ranking components and a probability of being selected for a bonus award based on the player rankings in one embodiment of the gaming system.

FIG. 17 is a chart illustrating an example of rankings determined for three players of gaming machines based on accumulated ranking components and a probability of being selected for a bonus award based on the player rankings in one embodiment of the gaming system.

DETAILED DESCRIPTION

Central Server Generally

Figure 1:
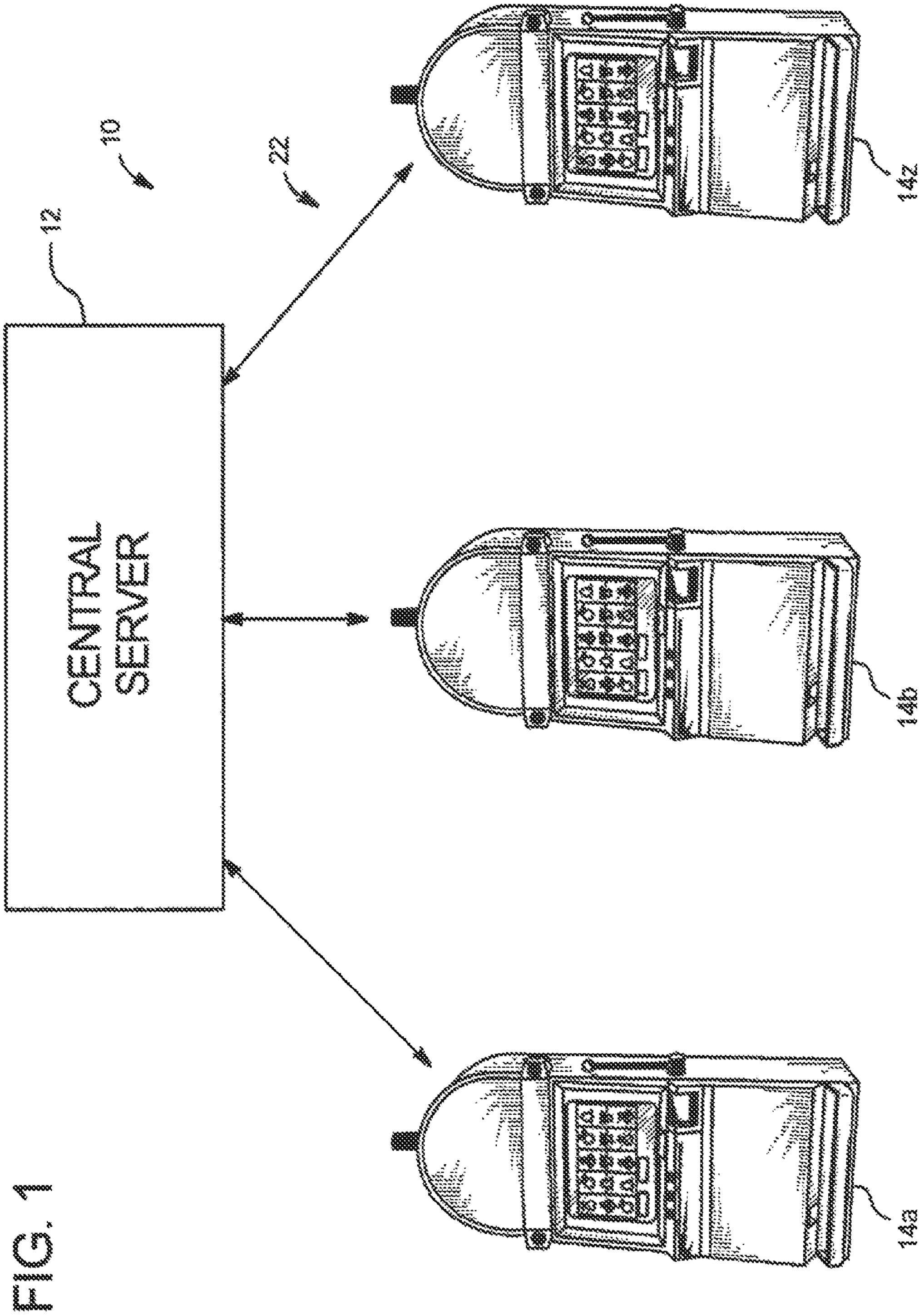
FIG. 1 is a schematic diagram of a central server in communication with a plurality of gaming machines in accordance with one disclosed embodiment.

Referring now to FIG. 1, one embodiment of the gaming system 10 includes a central server or controller 12 and a plurality of gaming machines or gaming devices 14*a*, 14*b* . . . 14*z* in communication with or linked to the central server or processor 12. One or more of the gaming machines 14*a*, 14*b* . . . 14*z* may be connected to each other through a data network or remote communication link 22 with some or all of the functions of each gaming machine provided at a central location, such as the central server or controller 12. The number of gaming machines in the gaming system can vary as desired by the implementer of the gaming system. These gaming machines are referred to herein alternatively as the group of gaming machines, the linked gaming machines or the system gaming machines. The linked gaming machines may be of the same type or of different types of gaming machines. The linked gaming machines may have the same primary game or two or more different primary games. For example, one gaming machine may be adapted to play a slot game while another gaming machine may be adapted to play a poker game. The linked gaming machines may have no secondary games, one or more secondary games, the same secondary games or two or more different secondary games. The linked gaming machines may have no progressive award, one or more progressive awards, the same progressive awards or may have two or more different progressive awards. The activity on each gaming machine 14*a*, 14*b* . . . 14*z* in the group is monitored by the central server 12. For example, the central server 12 may monitor wager activity or play activity on each of the linked gaming machines or for individual players on each of the linked gaming machines for a predetermined or designated time period. The central server or controller may be any suitable server or computing device which includes a processor and a memory or storage device. In alternative embodiments, the central server is a progressive controller or another gaming machine in the gaming system.

The central server or controller maintains or tracks wager activity and/or play activity on system gaming machines for one or more predetermined or designated time periods. In one embodiment, the central server tracks the activity on each gaming machine 14*a*, 14*b* . . . 14*z* or the activity for individual players using ranking components or ranking information. As described above, the central server or controller acquires or determines each ranking component as statistical data including any numerical or quantitative value based on wagering and/or play activity by the players or on system gaming machines 14*a*, 14*b* . . . 14*z*. An acquired ranking component or ranking information includes at least one of the following: (1) a total amount wagered on each gaming machine, (2) a total amount wagered by each player, (3) a number of games played on each gaming machine, wherein the games are primary or secondary games, (4) a number of games played by each player, wherein the games are primary or secondary games, (5) an amount of each wager placed on each play of each gaming machine, wherein the play is of a primary or secondary game, (6) an amount of each wager placed on each play by each player, wherein the play is of a primary or secondary game, (7) an amount of time between each play of each game on the gaming machines, wherein the play is of a primary or secondary game, (8) an amount of time between each play of each game by each player and (9) a quality of play of each player (i.e., a player's skill level or how closely each player plays to optimal play). The central server or controller acquires the ranking components described above in a primary game, a secondary game or both in different embodiments. In one embodiment, the acquired ranking components are independent of game outcome. In another embodiment, the central server or controller acquires and accumulates the ranking information or the ranking components described above for a predetermined or randomly determined period of time. In different embodiments, the central server or controller acquires the ranking information or the ranking components from a gaming machine in the gaming system, from an individual player at a gaming machine in the gaming system, from an individual player at another location associated with the gaming system (e.g., such as via a proxy device or portable gaming device) or any suitable combination thereof. In one embodiment, the central server or controller generates the ranking components based on information sent to the central server or controller from at least one gaming machine. For example, at least one gaming machine sends wager activity or play activity to the central server or controller. Based on this information, the central server or controller generates the ranking components for a ranking determination.

In one embodiment, the central server determines a ranking for at least one system gaming machine or at least one player of a gaming machine based on the ranking information. In one embodiment, the central server positions ranked players or ranked gaming devices along a ranking scale relative to other ranked players or ranked gaming devices based on the determined ranking. It should be appreciated that the central server or controller employs one or a plurality of ranking components to determine a ranking for individual gaming machines or individual players of the system gaming machines or other gaming machines. In another embodiment, the central server or controller employs other ranking information, such as a number of games played of a particular game (e.g., either a primary game, a secondary game or both), to determine the ranking of individual gaming machines or individual players. In one embodiment, the other ranking information is employed in addition to or as replacement for any other wager activity, play activity or ranking component desired by the implementer or operator of the gaming system.

Figure 2:
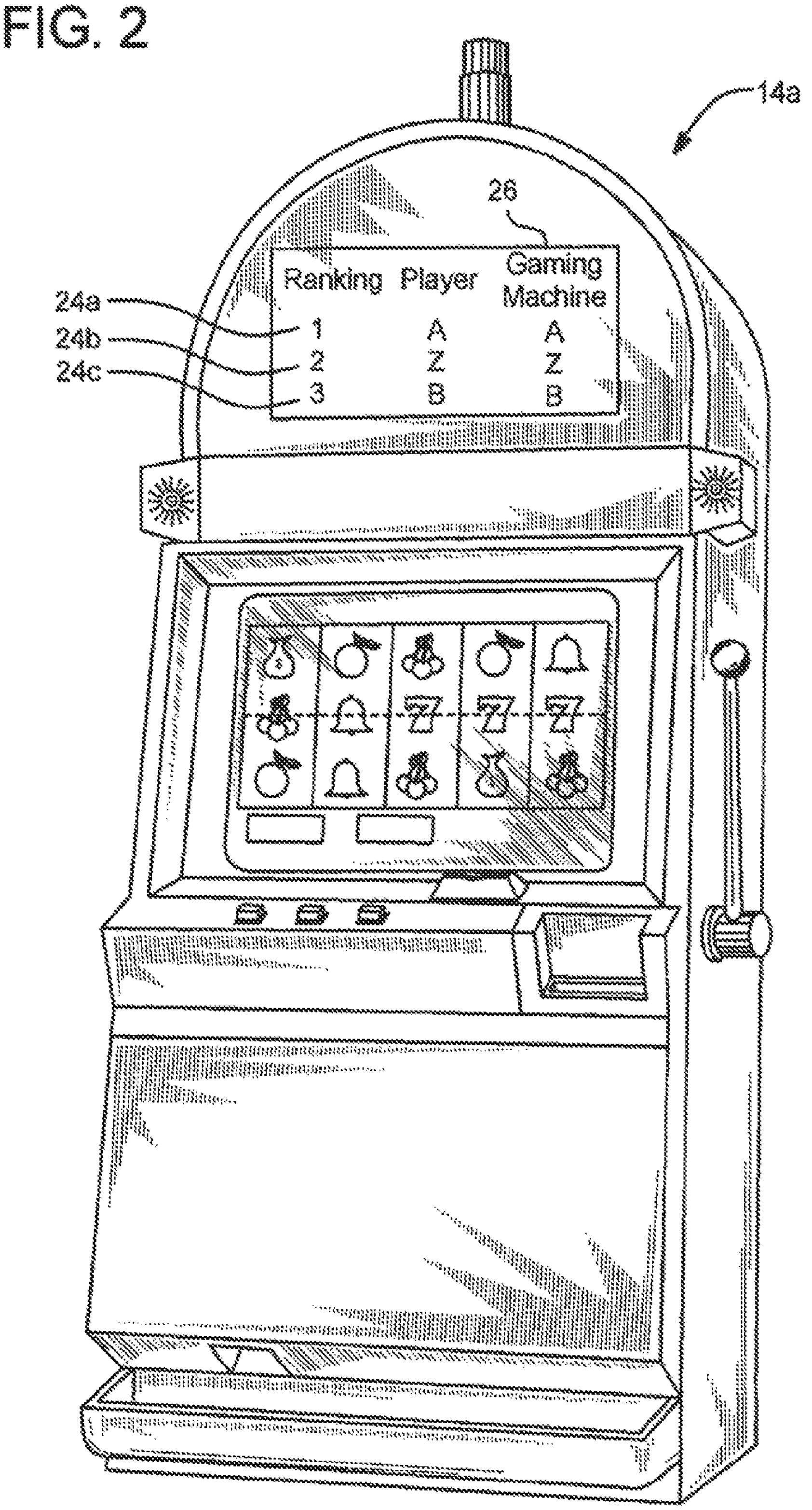
FIG. 2 is a perspective view of a gaming machine having a display adapted to display a plurality of rankings determined by the central server in FIG. 1 in accordance with one disclosed embodiment.

FIG. 2 illustrates one system gaming machine 14*a* in the gaming system 10. In this example, the gaming machine 14*a* is in communication with a display 26 and operable with the central server or controller and the display to display certain information, such as one or a plurality of rankings 24*a*, 24*b* and 24*c*. The display 26 is provided at or adjacent to gaming machine 14*a* and is configured to display one, several or all of the rankings 24*a*, 24*b* and 24*c* for a plurality of players (e.g., players A, Z and B) in addition to or as a substitute for rankings for a plurality of gaming devices (e.g., gaming devices A, Z and B). Gaming devices A, Z and B of FIG. 2 correspond to gaming devices 14*a*, 14*z* and 14*b* of FIG. 1. It should be appreciated that the central server or controller uses one, a plurality or all of the ranking components described above to determine the displayed rankings 24*a*, 24*b* and 24*c*. In another embodiment, the display is operable to display any number of ranked players or gaming machines and any award(s) available to be provided the ranked player(s) or gaming machine(s).

Additionally, in an additional embodiment, a display including a common display area viewable from multiple linked gaming machines is provided in communication with the gaming system and is operable to display the certain information described above as well as any other information desired by the implementer or operator of the gaming system in real time. Displaying such information may increase player excitement and anticipation as players in the gaming system try to improve their ranking (e.g., by adjusting their wager activity and/or play activity).

Figure 3:
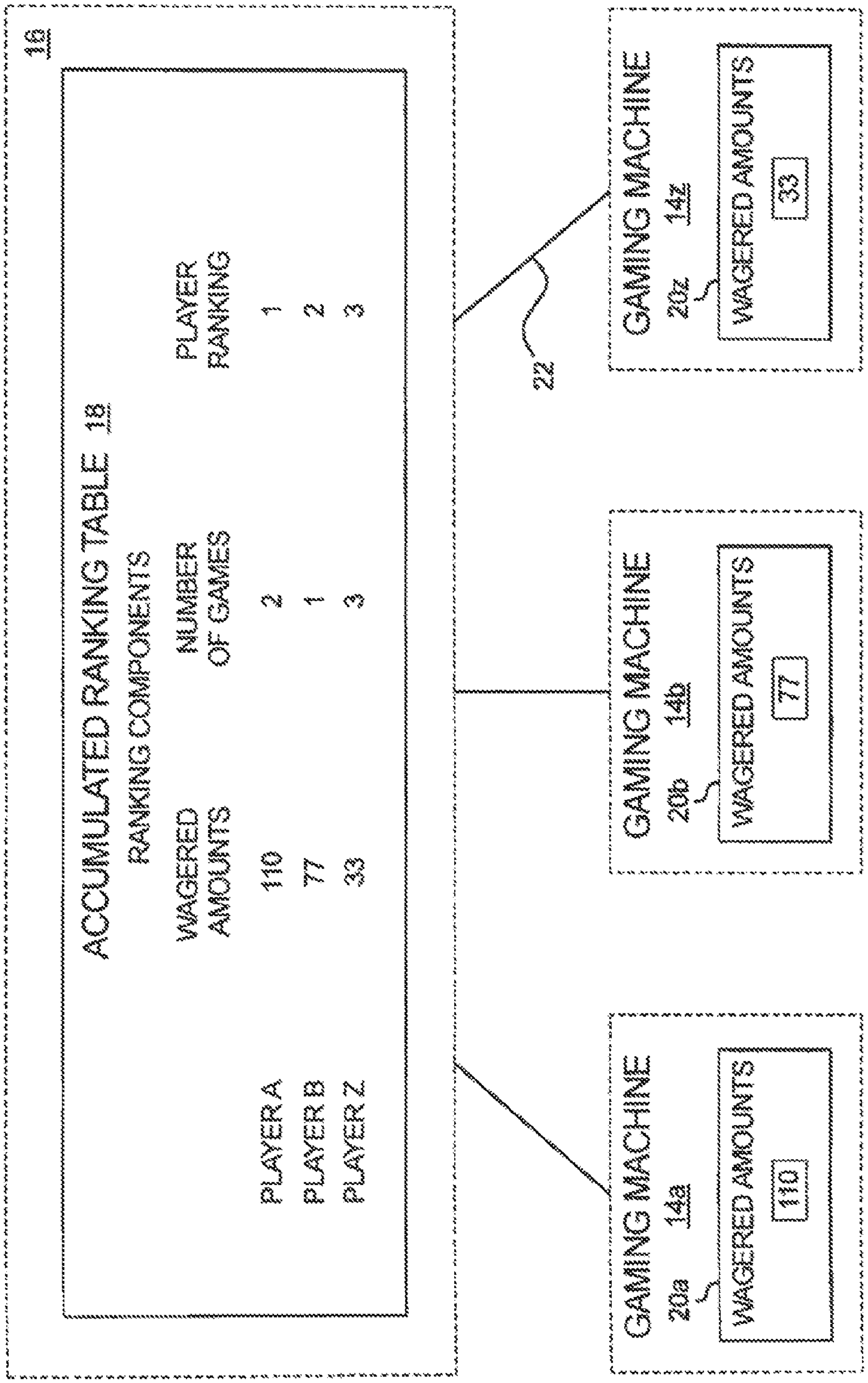
FIG. 3 is a schematic diagram of a memory of the central server in FIG. 1, and which generally illustrates one example of an accumulated ranking table.

The central server or controller 12 includes a memory 16 (FIG. 3) which maintains tracked, acquired or determined information relating to wagering and/or play activity from players of system gaming machines. Such tracked or acquired information (e.g., ranking components 24*a*, 24*b*, 24*c* and 24*d* of FIG. 2) is stored and accumulated in a ranking table 18 (FIG. 3). The ranking table 18 is stored in and retrieved from the memory 16 of the central server or controller 12. In one embodiment, the ranking components may be stored in and retrieved from the ranking table 18 via gaming machines 14*a*, 14*b* . . . 14*z* through data connection 22. Each ranking component can be tracked, acquired, stored and retrieved as statistical data in a plurality of ranking component categories (e.g., number of games played or total wager amount in monetary units) throughout a single designated time period or a plurality of designated time periods. The statistical data is accumulated and stored for each individual player or for each system gaming machine in the ranking table 18 (FIG. 3). The statistical data may include a number of points or another numerical or quantitative value used to rank the individual players or gaming machines based on wagering activity, play activity or other ranking components acquired from system gaming machines.

Referring to FIG. 3, the central server 12 tracks at least one ranking component on the gaming machines 14*a*, 14*b* . . . 14*z* during a designated time period. The central server 12 includes coin-in or wager meters or counters 20*a*, 20*b* . . . 20*z* which respectively individually track the wagers placed on primary or secondary games played by each player of the gaming machines 14*a*, 14*b* . . . 14*z*. The central server 12 includes the ranking table 18 which at least tracks one ranking component, such as a total coin-in, for the gaming machines 14*a*, 14*b* . . . 14*z* by individual Players A, B . . . Z. The individual gaming machine wager meters 20*a*, 20*b* . . . 20*z* may track the wagers made on the gaming machines in any suitable manner, such as in monetary units. Tracking in monetary units enables two or more of the gaming machines in the group to be of different denominations and also enables the individual gaming machines to have multiple denominations. In such embodiments, the monetary unit can be in the lowest common denomination. In one embodiment, every gaming machine of the system will also have a separate coin-in or wager meter for the designated time period. As described above in one embodiment, wager meters 20*a*, 20*b* . . . 20*z* track monetary units wagered by individual players on the system gaming machines.

The central server or controller 12 determines a ranking for each individual player, a plurality of players, such as a group of players, or for all of the players based on the ranking components tracked or acquired throughout the designated time period. Alternatively, the central server or controller 12 determines a ranking for each individual gaming machine, a plurality of gaming machines, such as a group of gaming machines, or for all of the gaming machines based on the ranking components tracked or acquired throughout the designated time period. In one embodiment, the designated time period includes one or more predetermined time periods, such as fixed time intervals. In another embodiment, the designated time period is randomly determined, e.g., through the occurrence or triggering of a triggering event. In one embodiment, the central server or controller determines a ranking for or ranks the plurality of players or gaming machines after the designated time period ends. In another embodiment, the central server or controller ranks or determines a ranking for the plurality of players or gaming machines in real time. In another embodiment, the central server or controller divides the players or gaming machines into groups and determines a ranking for or ranks one, a plurality of or all of the groups of players or gaming machines.

Ranking Table

As generally illustrated in FIG. 3, the memory 16 of the central server also maintains the wagered amounts 20*a*, 20*b* . . . 20*z* by each player for each gaming machine 14*a*, 14*b* . . . 14*z*, respectively. The ranking table 18 includes one, a plurality of or all of the ranking components for each of the players during the designated time period. As described in the examples of FIGS. 3 and 4, the ranking component includes at least the total amounts wagered by the players of the primary games on system gaming machines during the designated time period.

In FIG. 3, the wagered amounts on gaming machine 14*a* during the designated time period is 110 monetary units for Player A, the wagered amounts on gaming machine 14*b* during the designated time period is 77 monetary units for Player B and the wagered amounts on gaming machine 14*z* during the designated time period is 33 monetary units for Player Z. Therefore, a total of 220 monetary units have been wagered by Players A, B and Z as illustrated in FIG. 3. Players A, B and Z have respectively accumulated 110, 77 and 33 monetary units in the ranking component table 18, e.g., for the total coin-in ranking component.

Figure 4:
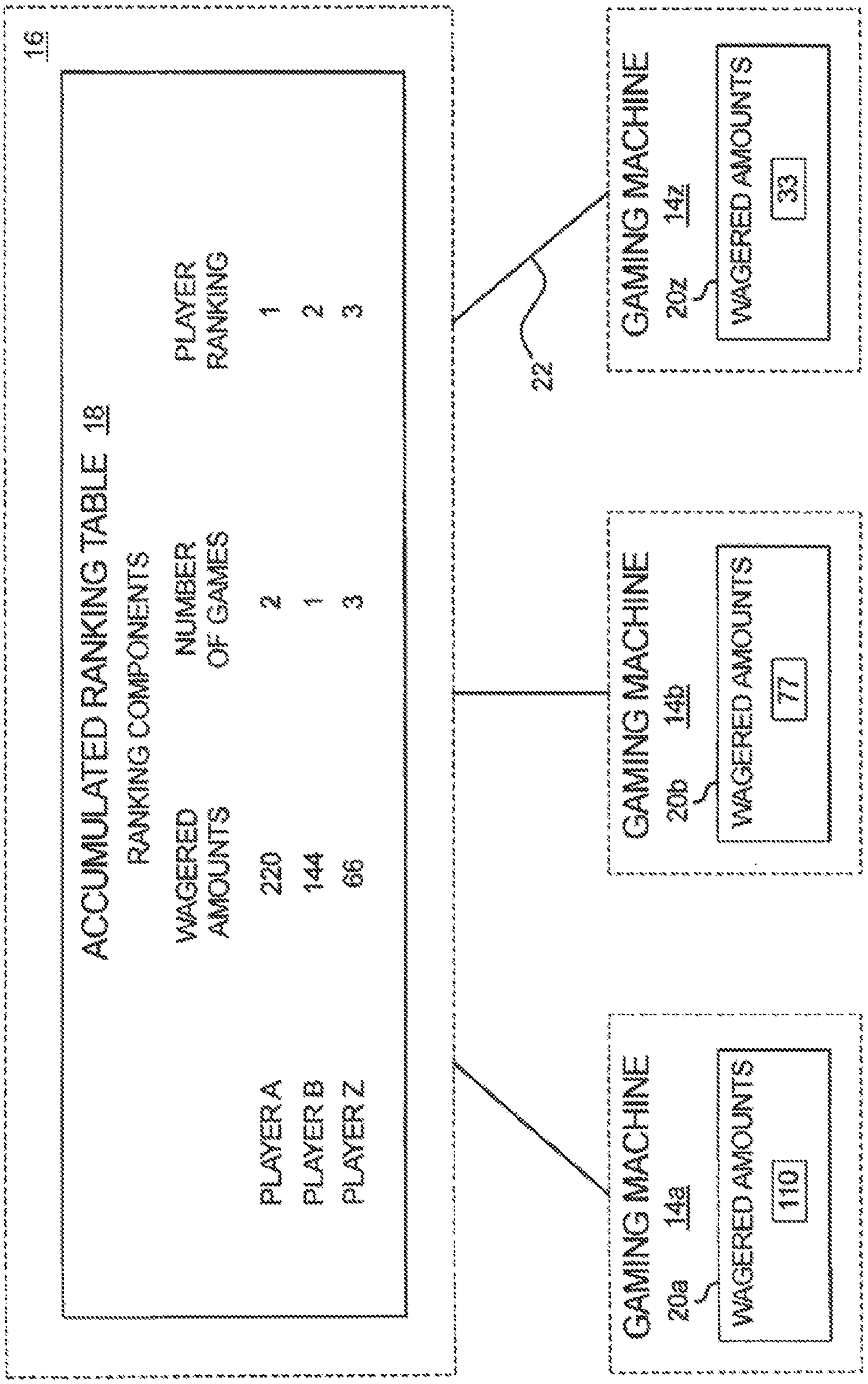
FIG. 4 is a schematic diagram of the memory of the central server in FIG. 1, and which generally illustrates one example of the ranking table of FIG. 3.

Using this example and referring now to FIG. 4, if Players A, B and Z have respectively accumulated 110, 77 and 33 monetary units in the ranking component table 18 from a previous designated time period and the amounts wagered during the present designated time period are the same as in FIG. 3, the ranking table will include 220 monetary units for Player A, 144 monetary units for Player B and 66 monetary units for Player Z. In this example, Players A, B and Z have respectively accumulated 220, 144 and 66 monetary units in the ranking component table 18, e.g., for the total coin-in ranking component.

As illustrated in FIGS. 3 and 4, ranking components in the ranking table 18 are tracked (e.g., number of games played) for each player during the designated time period and may or may not be employed in the determination of the ranking described below. Alternatively, ranking components in the ranking table 18 can be tracked for each gaming machine during the designated time period and may or may not be employed in the determination of the ranking described below.

In another embodiment, one or more ranking components are acquired or determined at different times (e.g., different gaming sessions or for different triggering events) than one or more other ranking components. In this instance, different ranking components are accumulated during different designated time periods.

In another embodiment, the designated time period may end with the determination or occurrence of a triggering event. In this embodiment, any additional accumulation of the ranking components (e.g., total wagered monetary units) for the current triggering event will cease immediately upon the conclusion of the designated time period. That is, the designated time period ends at the same time as the triggering event occurs.

Figure 5:
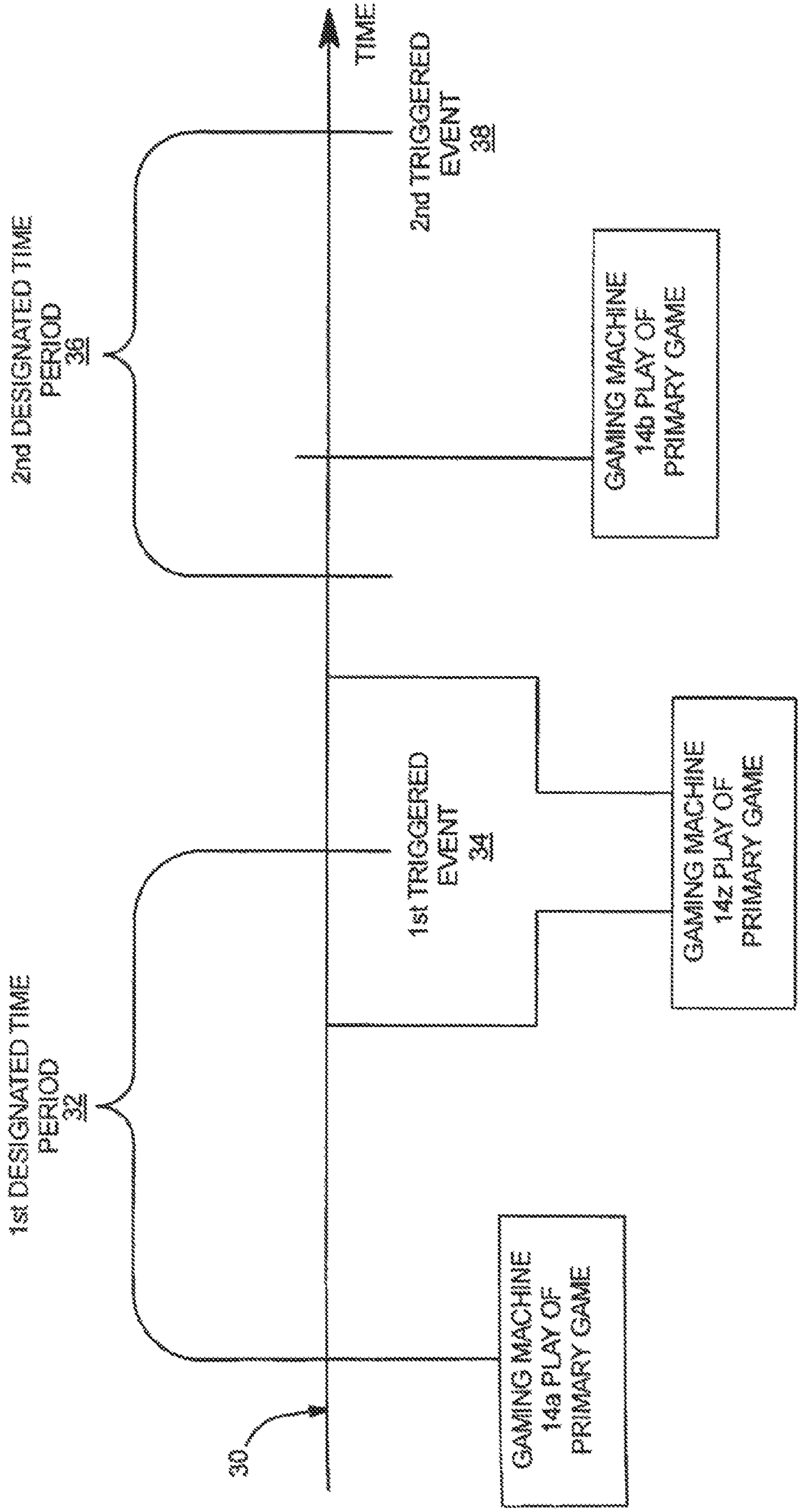
FIG. 5 is a timeline illustrating an example of designated time periods relative to triggering event triggers.

For example, FIG. 5 illustrates a timeline 30 of a first designated time period 32, a first triggering event 34, a second designated time period 36 and a second triggering event 38. The designated time periods 32 and 36 are periods of time prior to the occurrence or triggering of triggering events 34 and 38. Players of gaming machines 14*z*, 14*a* both played a game on respective gaming machines 14*z* and 14*a* during the first designated time period 32. The first designated time period 32 ends at the first triggering event 34. In this example, players of both gaming machines 14*a* and 14*z* accumulated ranking components during the first designated time period 32. A player of gaming machine 14*b* played a game on the gaming machine 14*b* during the second designated time period 36 which ends at the second triggering event 38. The player of gaming machine 14*z* played a game on gaming machine 14*z* after the first triggering event 34, but not within the second designated time period 36. Accordingly, the player of gaming machine 14*b* accumulated ranking components during the second designated time period 36 while the player of gaming machine 14*z* did not accumulate any ranking components during the second designated time period 36 in this embodiment. It should be appreciated that the designated time periods preferably remain constant or consistent, but may be variable as shown in FIG. 5, or changed as determined by the implementer or operator of the gaming system. Multiple designated time periods of the same duration may simplify the comparison between ranking components over the multiple designated time periods. In an alternative embodiment, the player of gaming machine 14*z* accumulates ranking components during the first designated time period 32 and the accumulated ranking components are carried over to the second designated time period 36 so that the player of gaming machine 14*z* accumulates ranking components during the first and second designated time periods 32 and 36.

In another embodiment, each designated time period starts at the occurrence of a triggering event and ends at the occurrence of a next or subsequent triggering event. For example, when a triggering event occurs, the accumulation of the ranking components (e.g., total wagered monetary units) for that designated time period immediately ceases and the values of the ranking components are stored or set in the ranking table 18. In one embodiment, the ranking table and ranking components are reset and all further ranking components (e.g., coin-in or wagers) which are subsequently acquired or tracked on the linked gaming machines are accumulated in the ranking table for the next designated time period. It should be appreciated that the exact period of time of the designated time period will vary based on many factors, such as the ranking components (e.g., rate of coin-in or wagered monetary units), probability of an occurrence of a triggering event and when the triggering event occurs or is triggered. It should also be appreciated that the designated time period can begin upon the initiation or enrollment of one or more gaming machines or individual players in the gaming system. For example, the designated time period can begin when an individual player initiates play on one of the system gaming machines.

Figure 6A:
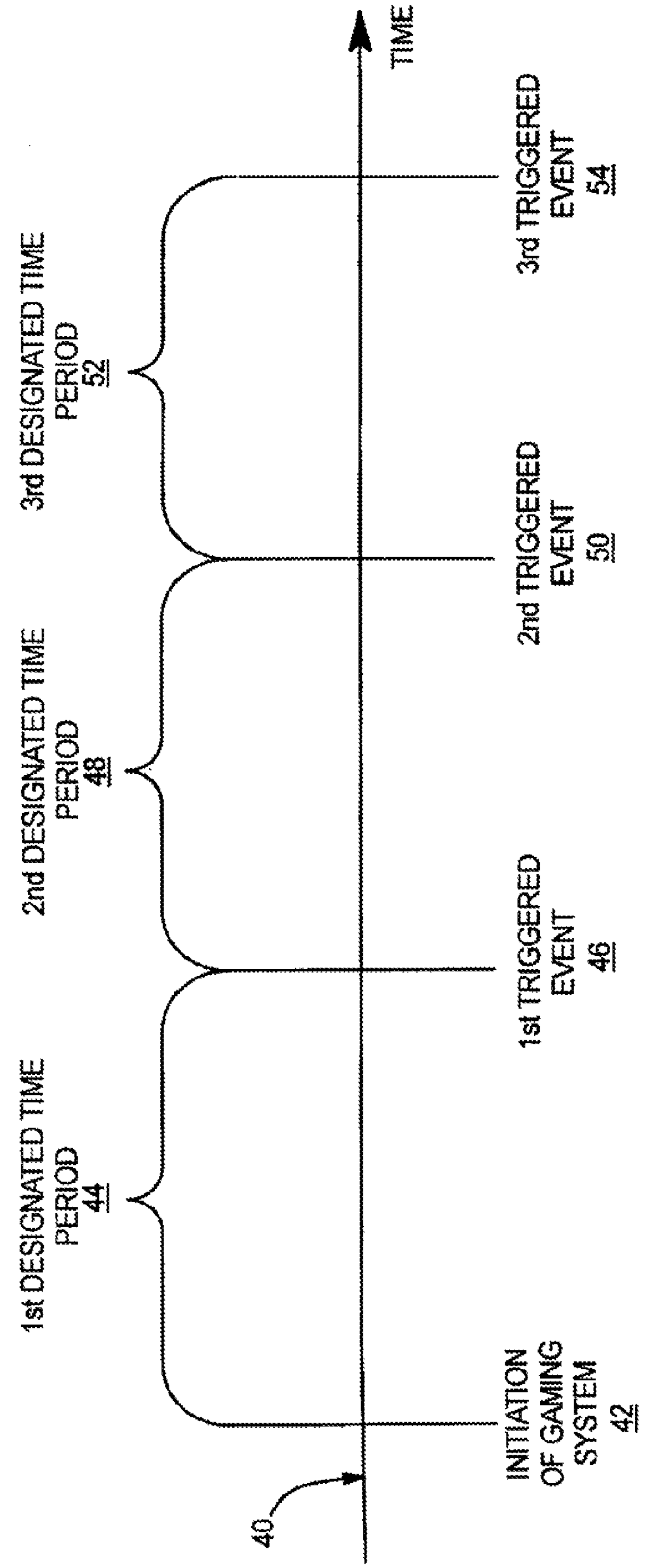
FIG. 6A is a timeline illustrating an example of designated time periods relative to triggering event triggers.

FIG. 6A illustrates a timeline 40 upon which multiple designated time periods occur and multiple triggering events are triggered. Specifically, an initiation or enrollment of one or more system gaming machines or individual players in the gaming system 42 begins a first designated time period 44. The first designated time period 44 ends upon a first triggering event 46. A second designated time period 48 occurs between the first triggering event 46 and a second triggering event 50. A third designated time period 52 occurs between the second triggering event 50 and a third triggering event 54. In this example, ranking components are acquired from one or more of the system gaming machines and accumulated during the first, second and third designated time periods 44, 48, 52. For example, ranking components acquired during the first designated time period 44 are not accumulated in the second or third designated time periods 48, 52. FIG. 6A further illustrates that the designated time periods can vary in duration and the event triggers can occur or be triggered at different times.

In another embodiment, ranking components acquired during the first designated time period 44 are accumulated with ranking components acquired during the second and third designated time periods 48 and 52. In this manner, ranking components acquired during the first designated time period 44 are accumulated with ranking components acquired during the second and third designated time periods 48, 52. In one embodiment, different ranking components are acquired in each of the first, second and third designated time periods 44, 48 and 52. For example, the central server or controller acquires or determines a first ranking component (e.g., a total coin-in) during the first designated time period 44, acquires or determines a second ranking component (e.g., a number of games played) during the second designated time period 48, and acquires or determines a third ranking component (e.g., a rate of play) during the third designated time period 52. The first, second and third designated time periods 44, 48 and 52 can coincide with one another, be at different times or overlap as desired by the implementer or operator of the gaming system.

Figure 6B:
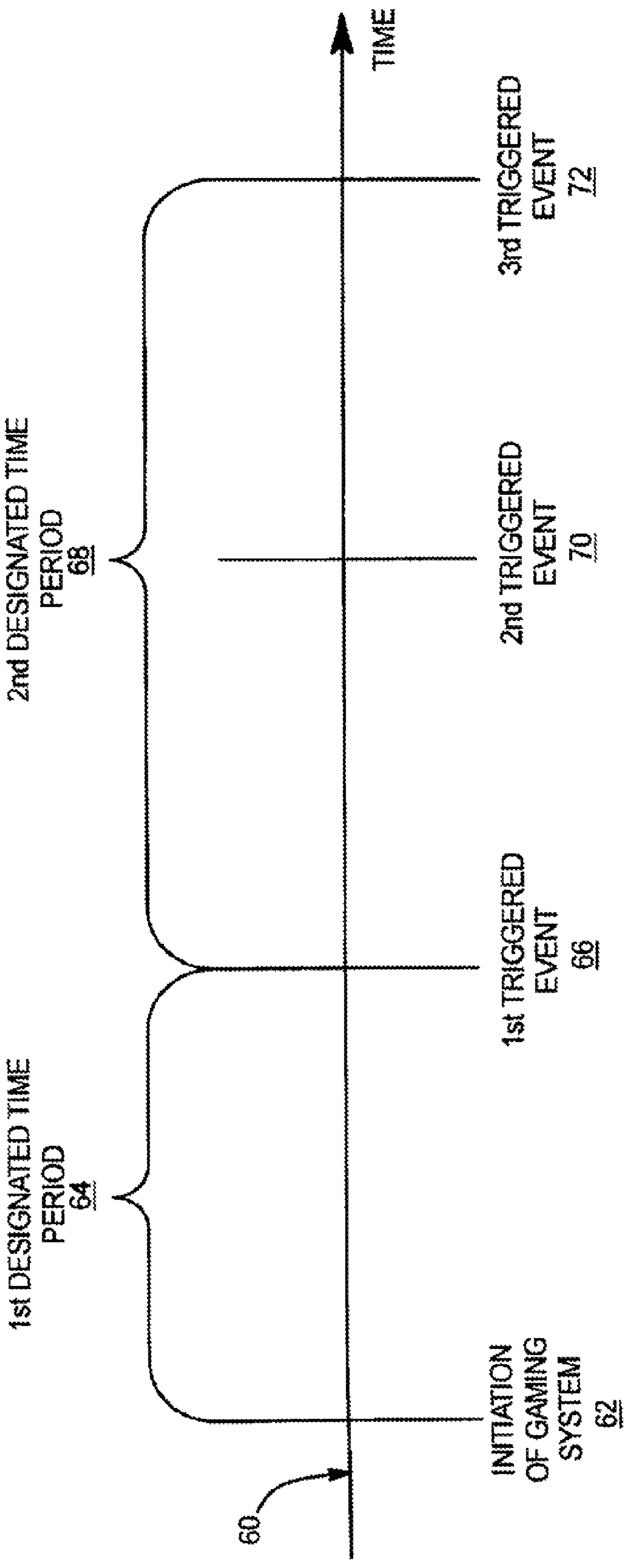
FIG. 6B is a timeline illustrating an example of designated time periods relative to bonus triggers, wherein a plurality of triggering events are triggered during one designated time period.

In the example illustrated in FIG. 6B, a first triggered event 66, a second triggered event 70, a third triggered event 72, a first designated time period 64 and a second designated time period 68 occur along time line 60 after an initiation of the gaming system 62. This illustrates that the second designated time period 68 can be longer than the first designated time period 64. FIG. 6B also illustrates three triggering events 66, 70 and 72. In this example, the central server or controller accumulates ranking components during the first designated time period 64 and the second designated time period 68. The first designated time period 64 ends with triggering event 66. At triggering event 70, the controller continues to accumulate ranking components during the second designated time period 68. In this example, the second designated time period 68 does not end with triggering event 70 and the range of the designated time period 68 can encompass more than one triggering event, e.g., triggering events 70 and 72. As a result, ranking component(s) acquired during the second designated time period 68 are not reset at triggering event 70 and are employed for both triggering events 70 and 72 during the second designated time period 68.

In one embodiment, a moving indicator is displayed to one or more players. The moving indicator is configured to dynamically indicate one or a plurality of ranking components associated with each of the players over a certain time period. The moving indicator is displayable to the players and constantly moves between a first point of the certain time period and a second point of the certain time period to display the ranking components acquired from the players. In this embodiment, changes in a player's play and/or wager activity (e.g., one or more ranking components) and the relative position of the moving indicator influence the player's ranking. For example, a high ranked player who is interrupted during play and does not wager (or wagers less the certain time period (as displayed to the players as the moving indicator), may lose ranking points or ranking position from inactivity or reduced wagers. Similarly, a low ranked player who wagers an increased amount for the certain time period (as displayed to the players as the moving indicator) may gain ranking points or ranking position based on consistent and constant wagering at the increased amount.

Generally, players who produce a high amount of ranking components, such as a high wager activity (e.g., a maximum wager per play), are ranked higher than players who produce a low amount of ranking components. However, the moving indicator enables players to vary the players' play and/or wager activity to affect their determined ranking. For example, a first player may average wagers of ten monetary units for each of ten plays. In a hope to increase the first player's determined ranking, the first player increases the wager to twenty monetary units per play for the next five plays. If the moving indicator represents these five plays, the player's ranking is based on the twenty monetary units per play. In this manner, the moving indicator enables the central server or controller to reward player(s) who happen to produce a high amount of wager activity during a certain amount of time.

Figure 7:
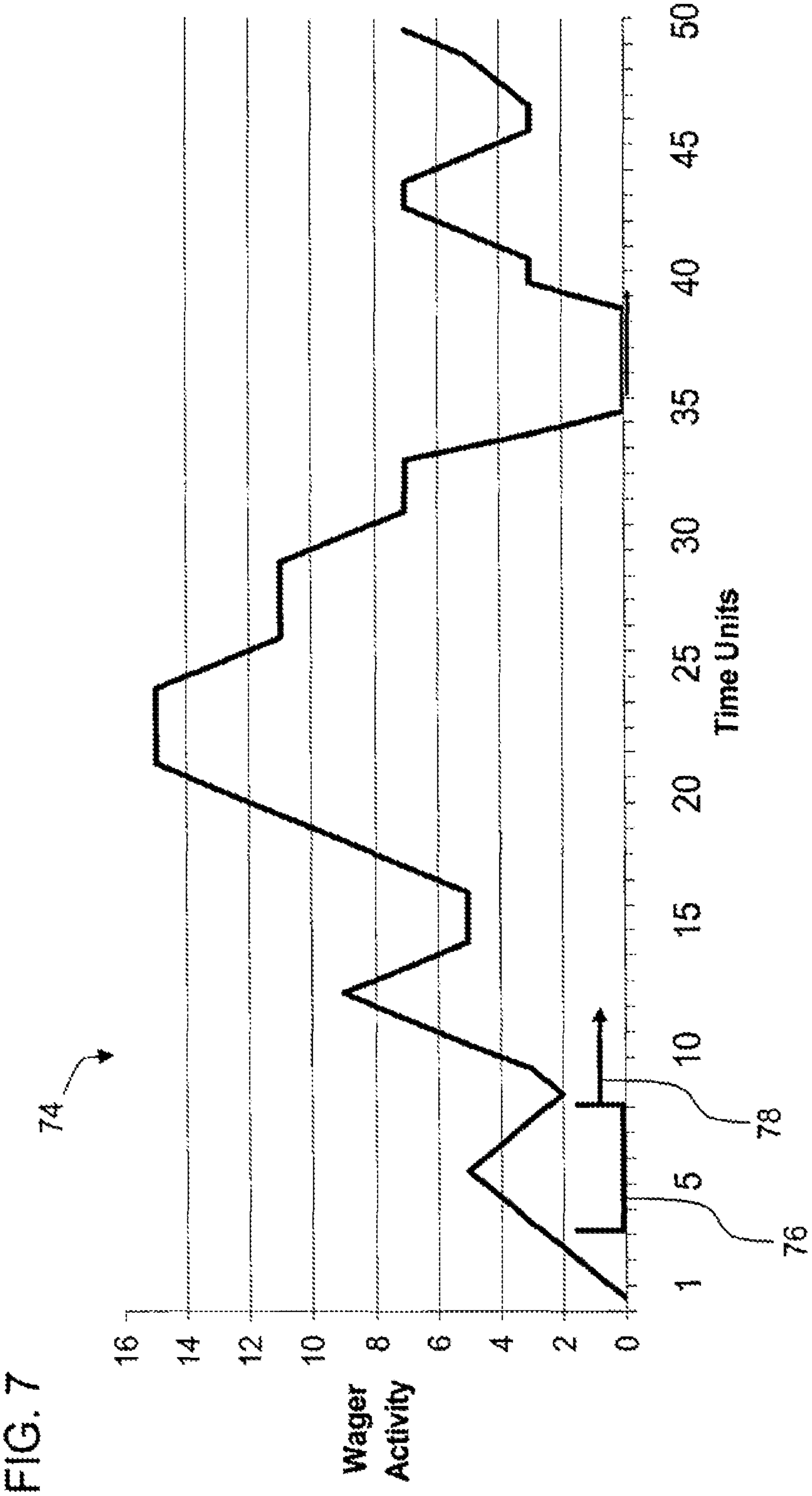
FIG. 7 is a chart illustrating an example of a moving time window relative to wager activity.

In such an embodiment, ranking components are acquired during a constantly or consistently moving time period, wherein the moving time period shifts or moves in accordance with a predetermined algorithm or any other suitable manner. The predetermined algorithm may be stored in and implemented by the central server or controller and/or an individual gaming machine processor. As illustrated in FIG. 7, a chart 74 shows a ranking component, such as wager activity, associated with one player graphed over time. The wager activity includes wagers of monetary units placed by the player in one or more games associated with the gaming system. The central server or controller acquires the wager activity of the player in the manner described above. The wager activity is graphed along the vertical axis of the chart 74. Time units, such as one or more predetermined time intervals, are graphed along the horizontal axis of the chart 74.

It should be appreciated that one or more time units may include one or more predetermined time intervals or any suitable portion thereof. The time units may be measured in seconds, minutes, hours, days or any other metric deemed appropriate by the game implementer. Alternatively, one or more time units represents a designated time period, such as one of the designated time periods 64 or 68 described above.

In FIG. 7, the moving time period is illustrated by a time window 76 or any other suitable indicator. As illustrated, the time window 76 represents six time units although the time window 76 may include or represent any suitable number of time units. As each time unit passes, the time window 76 moves or shifts in a direction of arrow 78 along the X-axis. In one embodiment, the time window 76 constantly moves or shifts from an initial time unit, such as zero or the first time unit, to a final time unit, such as the thirtieth or fiftieth time unit. The central server or controller utilizes the wager activity acquired from the player during the time units represented by the time window 76 to determine a ranking for the player. The central server or controller positions the ranked player along a ranking scale relative to other ranked players based on the determined ranking.

In one embodiment, the ranking scale is displayed to the ranked players on a display device in operation with the central server or controller, such as display device 26 shown in FIG. 2. The displayed ranking scale may be displayed in the form of a leader board, standings or any other suitable format. The displayed ranking scale enables ranked players to see their ranking and the ranking of other players as well as in certain embodiments to determine the likelihood of obtaining a specific ranking and/or a specific award. Additionally, or alternatively, the displayed ranking scale enables ranked players to see any changes to the ranking scale in accordance with the moving time window 76.

In FIG. 7, the time window 76 represents six time units. As illustrated, the time window 76 represents the third, fourth, fifth, sixth, seventh and eighth time units, which are associated with wagers of 3, 4, 5, 4, 3, 2 monetary units, respectively. The central server or controller determines the ranking for the player based on these wager amounts. The wager amounts between the first time unit and the third time unit and the time units between the ninth time unit and the fiftieth time unit are not used as ranking components in this embodiment, and thus, are not used in the ranking determination. If each time unit is one minute in duration, for example, the time window 76 represents a time period totaling six minutes. For this time period, the player wagers a total of 21 monetary units. The central server or controller utilizes the acquired wager activity (i.e., 21 monetary units) to determine a ranking for the player during this time period.

When the time window 76 moves or shifts, at least one time unit is replaced in the time window 76 with a corresponding number of new time units. For example, if the time window 76 moves or shifts one time unit, the third time unit associated with 3 monetary units is replaced with the ninth time unit in the time window 76. The ninth time unit is associated with 3 monetary units. For the new time period represented by time window 76 (e.g., the fourth time unit, the fifth time unit, the sixth time unit, the seventh time unit, the eighth time unit and the ninth time unit), the player wagers a total of 21 monetary units. The central server or controller utilizes the acquired wager activity (i.e., 21 monetary units) to determine a ranking for the player during this new time period. In one embodiment, the time window 76 increases or decreases in size between movements of shifts.

It should be appreciated that as the time window 76 shifts or moves, the wager activity acquired during the time units represented by the time window 76 changes. However, as shown above, the monetary units associated with the wager activity may or may not change. Since the player's ranking is based on the same number of monetary units (i.e., 21 monetary units) for both time periods, it is possible that the player's ranking will not change. In cases where the number of monetary units changes between time periods, the players ranking may increase or decrease relative to the ranking of other players. In this manner, the constantly moving time window encourages the players to wager consistently and constantly. Since each player's ranking is based on time, players who do not wager consistently and constantly risk reducing their determined ranking along the ranking scale. For example, if a player stops playing, the player's ranking will drop or be reduced relative to players who continue playing because the player's ranking is based on time.

In one embodiment, the moving time window enables the central server or controller to reward one or more players who happen to produce a high amount of wager activity during the time units represented by the time window 76. For this time period, the player wagered 86 total monetary units between the twentieth time unit and the twenty-fifth time unit. Specifically, the player wagered 13 monetary units at the twentieth time unit, 15 monetary units at the twenty-first time unit, 15 monetary units at the twenty-second time unit, 15 monetary units at the twenty-third time unit, 15 monetary units at the twenty-fourth time unit and 13 monetary units at the twenty-fifth time unit. If the time window 76 represents the player's wager activity between the twentieth time unit and the twenty-fifth time unit, the central server or controller may reward the player for producing a high amount of wager activity during this time period. For example, the central server or controller may provide the player with an award, such as a monetary or non-monetary value. Additionally, or alternatively, the central server or controller may reward the player with a higher relative percentage of obtaining an award, a higher multiplier, a greater number of free games, a greater number of free spins or any suitable combination thereof based on the high wager activity during this time period. This enables the central server or controller to provide the player with incentives or rewards for wager activity acquired during a dynamic time period.

In one embodiment, the central server or controller designates certain time intervals, such as between the twentieth time unit and the twenty-fifth time unit, as a hot zone. A hot zone may include any number of time units and may be designated by the central server, the gaming device processor and/or the game implementer in any random, predetermined or other suitable manner. In one embodiment, the central server or controller is operable to reward the player with greater changed awards during the hot zone. The hot zone may or may not be displayed to the player. In one embodiment, the central server or controller indicates the hot zone to the player via a randomly displayed pop-up or display provided by a display device associated with the gaming system.

In one example, if the chart 74 represents the wagers placed by the player between 9:00 pm and 9:50 pm, the central server or controller determines the player's ranking relative to other players based on wager amounts placed by the player between 9:03 pm and 9:08 pm. Based on this example, it should be appreciated that the chart 74 may reflect wager activity or another ranking component in real time. For example, the time window 76 may include six time units and reflect the player's wager activity between 9:45 pm (i.e., the forty-fifth time unit) and 9:50 pm (i.e., the fiftieth time unit). When one minute passes, the time window 76 moves or shifts so that the time window 76 reflects the player's wager activity between 9:46 pm (i.e., the forty-sixth time unit) and 9:51 pm (i.e., the fifty-first time unit, which is not shown on chart 74). After another minute passes, the time window 76 moves or shifts so that the time window 76 reflects the players wager activity between 9:47 pm (i.e., the forty-seventh time unit) and 9:52 pm (i.e., the fifty-second time unit, which is not shown on chart 74). This movement or shifting may continue for a suitable number of time units, for a suitable number of predetermined time periods, for a suitable number of movements or shifts and/or until a predetermined time, such as 10:00 pm (i.e., the sixtieth time unit, which is not shown on chart 74).

In another embodiment, the time window 76 moves or shifts at predetermined time intervals. As each predetermined time interval passes, the time window 76 moves one time unit in the direction of arrow 78 along the X-axis. Each time unit is a predetermined time interval which may be measured in seconds, hours, days or any other suitable metric. For each movement, one or more time units are replaced in the time window 76 with a different time unit. Replacement of one or more time units may affect the player's ranking. For example, if each time unit is 30 seconds, FIG. 7 illustrates that the player wagered 19 monetary units in the first three minutes of the chart 74 (i.e., 1 monetary unit in the first 30 seconds, 2 monetary units in the second 30 seconds, 3 monetary units in the third 30 seconds, 4 monetary units in the fourth 30 seconds, 5 monetary units in the fifth 30 seconds, and 4 monetary units in the sixth 30 seconds).

As each 30 second time interval passes, the time window 76 moves one time unit in the direction of arrow 78 along the X-axis. When the time window 76 moves one time unit in the direction of arrow 78, the monetary units wagered at the first time unit are replaced in the time window 76 with the monetary units wagered at the seventh time unit. The player's wager activity increases from 19 monetary units wagered during the first six time units to 21 monetary units wagered during the second time unit to the seventh time unit. In this embodiment, the time window 76 enables the central server to dynamically determine the player's ranking based on the player's wager activity.

It should be appreciated that the player's ranking may or may not change as the time window 76 moves. Since the player's ranking is determined relative to other players, an increase in the players wager activity may or may not increase that player's ranking. FIG. 7 shows such an increase in wager activity between the sixteenth time unit and the twenty-third time unit. If the player's wager activity increases relative to other players, the player's determined ranking will increase. Similarly, a decrease in the player's wager activity may or may not decrease that player's ranking.

In one embodiment, the time units illustrated in FIG. 7 represent one predetermined time period. During the predetermined time period, the central server or controller acquires one or more ranking components, such as wager activity. For example, the central server or controller utilizes the wager activity acquired between an initial time unit, such as the first time unit, and a final time unit, such as the fiftieth time unit, to determine a ranking for the player during the predetermined time period.

In an another embodiment, the central server or controller utilizes one or more ranking components, such as wager activity, acquired in a certain portion of the predetermined time period (i.e., in certain time units) to determine a ranking for the player. For example, the central server or controller utilizes the wager activity acquired between the third time unit and the eighth time unit in the determination of the player's ranking while wager activity acquired at other portions of the predetermined time period are not used in the ranking determination. It should be appreciated that any portion of the predetermined time period may be used by the central server or controller in the ranking determination and that the portion may be predetermined, randomly determined or determined in any other suitable manner.

In one embodiment, at least one time unit illustrated in FIG. 7 represents a predetermined time period. The time units collectively represent a plurality of predetermined time periods. As illustrated, one or more ranking components, such as wager activity, are acquired during the plurality of predetermined time periods. For example, if each time unit represents a predetermined time period, the central server or controller utilizes the wager activity acquired from the fifth time unit to the ninth time unit (i.e., five predetermined time periods) in the ranking determination while ranking components acquired during other predetermined time periods (i.e., the first time unit to the fourth time unit and the tenth time unit to the fiftieth time unit) are not used in the ranking determination. The central server or controller controls which time period(s) are used in the ranking determination and such time period(s) may be predetermined, randomly determined or determined in any other suitable manner.

In one embodiment, the central server or controller determines the time period in which the player wagered the most monetary units relative to other time periods. For example, chart 74 shows that the player wagered 86 monetary units between the twentieth time unit and the twenty-fifth time unit.

These time units represent the player's highest wager activity, wherein the player wagered the most monetary units relative to other time units. In this embodiment, the central server or controller selects these time units to determine the player's ranking. The central sever or controller selects the time period(s) or the time unit(s) in which the player has the highest likelihood of obtaining a high ranking.

In another embodiment, a group or pool of time units represents a predetermined time period. Each group or pool of time units includes at least one time unit. A plurality of the groups or pools collectively represent a plurality of predetermined time periods. For example, if each predetermined time period includes five time units, the chart 74 of FIG. 7 illustrates ten predetermined time periods. It should be appreciated that the chart 74 may illustrate any number of predetermined time periods and that each predetermined time period may include any number of time units, such as one time unit or six time units. The central server or controller utilizes the wager activity acquired during at least one of the predetermined time periods in the ranking determination.

In alternative embodiments, a moving time window may be associated with other ranking components in addition to, or in replacement of, wager activity. For example, a number of games played by a player at a gaming device in the gaming system may replace the wager activity component of the chart 74 in FIG. 7. In this example, the central server's ranking determination is based on a number of games played during one or more time units. Additionally, a player's quality of play (i.e., a player's skill level or how closely each player plays to optimal play) may replace the wager activity component of the chart 74 in FIG. 7. The central server's ranking determination is based on how well a player plays a particular game or how closely that player plays to optimal play. In one embodiment, the ranking components are associated with a particular gaming machine that is associated with the gaming system, a particular player (such as tracked by a player tracking module or system) or some combination thereof.

It should be appreciated that certain time units may be weighted such that any ranking components acquired during weighted time units are weighted in the ranking determination. For example, wager activity may be weighted to a higher rate during weighted time units. If the third time unit in FIG. 7 is weighted, the 3 monetary units wagered by the player at the third time unit may be treated at double the normal rate (i.e., 6 monetary units) in the ranking determination by the central server or controller. In one embodiment, the central sever or controller may selectively weight certain time units. The weighted time units are predetermined to be weighted by any suitable amount, such as 1.5 times, 2 times or 5 times, or are weighted by randomly selected amounts. In one embodiment, a player's status (such as determined by a player tracking module or system) determines the weighting amount such that wagers placed by players with a higher status are weighted at 3 times the normal rate while wagers placed by players with a lower status are weighted 1.5 times the normal rate.

Ranking of Players

Generally, players of gaming machines 14*a*, 14*b* . . . 14*z* play at different rates, wager different amounts, wager different denominations and often vary these rates and amounts. These rates and amounts are generally referred to herein as wager activity and play activity. The central server or controller 12 determines a ranking for individual players or gaming machines based on this wager activity and play activity and provides one or more awards to one or more ranked players or gaming machines based on the determined ranking. In one embodiment, the central server positions ranked players or ranked gaming devices along a ranking scale relative to other ranked players or ranked gaming devices based on the determined ranking and provides one or more awards to one or more ranked players based on the ranking scale.

In one embodiment, the controller acquires or determines ranking components from one or more of the linked gaming machines in the gaming system as described above. The ranking components are acquired or determined in one or more designated time periods. The central server or controller ranks individual players or individual gaming machines using one, a plurality of or all of the acquired ranking components. For example, the central server or controller acquires a number or total of primary or secondary games played from one or more players of the linked gaming machines (e.g., a ranking component) and ranks the one or more players in accordance with the acquired ranking component. In another embodiment, the central server or controller ranks individual players or gaming machines using a plurality of the acquired or determined ranking components, such as rate of play, total coin-in or monetary units wagered, number of games played or any of the other ranking components described above. For example, the central server or controller acquires a number of primary or secondary games played (e.g., a first ranking component) along with the amount of each wager placed on each play or game (e.g., a second ranking component) and ranks one, a plurality of or all of the players in accordance with the acquired ranking components. In an alternative embodiment, the central server or controller acquires a plurality of ranking components for ranking or providing a plurality of awards to multiple players substantially simultaneously or during the designated time period. For example, a player who plays 5 games during the designated time period may achieve one ranking or award and a player wagering 10 credits per play for 2 games may achieve a different ranking or award simultaneously or during the designated time period.

In the above examples, it should be appreciated that the central server or controller is adapted to rank one, a plurality of or all of the gaming machines in accordance with the acquired or determined ranking components instead of ranking one, a plurality of or all of the players in alternative embodiments of the gaming system.

In one embodiment, the acquired ranking components are weighted or adjusted based on any one or more suitable parameters or criteria as designated by the implementer or operator of the gaming system. For example, the ranking is weighted based on the wager placed on each play. For instance, a player who plays 5 games during the designated time period may achieve a higher ranking than a player who plays 3 games. Similarly, a player wagering 5 credits per play for 5 games may achieve a higher ranking than a player wagering 10 credits per play for 2 games. In an alternative embodiment, the acquired ranking components are not weighted or adjusted based on such suitable parameters or criteria.

In another embodiment, the determination of the ranking for one, a plurality of or all of the players may alternatively or additionally be based on the total amount wagered on the plays of a gaming device during a designated time period. In a further alternative embodiment, the determination of the player ranking may be based on a designated minimum number of plays or wagers of a primary game, a second game or both in a designated time period. The determination of the ranking may take into account other factors such as interruptions or displays in play of the primary or secondary game such as caused by the triggering of other bonuses or the operation of other secondary games of the gaming machines.

It should be appreciated that one, a plurality of or all of the players of the linked gaming machines may be ranked based on any suitable parameters or criteria as determined by the implementer or operator of the gaming system. For example, in an alternative embodiment, a player can only be ranked if an additional wager, such as a side-bet or side-wager, is made by the player at a system gaming machine for one play of a game, a plurality of plays of a game or all plays of a game in a designated period of time. It should also be appreciated that the rankings of at least one player of the linked gaming machines can be weighted or adjusted based on any one or more suitable parameters or criteria as designated by the implementer or operator of the gaming system. For example, in an alternative embodiment, players can obtain a ranking advantage to improve their ranking by making an additional wager, such as a side-bet or side-wager, for one play of a game, a plurality of plays of a game or all plays of a game in a designated period of time.

In one embodiment, the central server or controller is configured to track or acquire ranking components (e.g., total wagers, time elapsed between wagers, the number of games or wager level, such as the number of maximum bets or some other minimum wager level, or any other ranking component described above) for each player, determine a ranking for each player based on the tracked or acquired ranking components, trigger a triggering event to occur and base an award or awards on each player's ranking after the triggering event occurs. In one such embodiment, if a player leaves the gaming machine of the gaming system, the ranking components and ranking accumulated for each player or gaming device are removed from the central server or controller. In another such embodiment, if a player leaves the gaming machine of the gaming system, the accumulated ranking components and ranking are saved for the player in the ranking table for later use at another gaming machine or during another designated time period. In one embodiment, the ranking components and ranking for each player are tracked via a player tracking system or module (implemented through the use of a playing tracking card or any other suitable manner). In this instance, the player tracking system or module can be provided in communication with the central server or controller or alternatively, the functionality of such a player tracking system or module can be provided in the central server or controller.

In one embodiment, if the player leaves a gaming machine of the gaming system, the ranking components and ranking for the player are retained through the playing tracking system until a designated time or event, such as based on a predefined time period (e.g., annually or monthly) or until the ranking component pool is reset or the triggering event occurs. In this instance, the ranking components and ranking accumulate and update through one or more designated time periods for the player.

In another embodiment, if the player leaves a gaming machine of the gaming system without transferring their accumulated ranking components or points using the player tracking system (e.g., the player is not registered in the player tracking system or the player does not have a playing tracking card), the gaming system sets certain criteria which must be fulfilled to reset the ranking components and ranking for that individual player. For example, if a player does not make additional wagers at that gaming machine within a designated period of time, the gaming machine determines that the player has left without transferring any accumulated ranking components or points to the player tracking system and thus the ranking components and player ranking for the player are reset or considered inactive. Alternatively, inactive players are not eligible for a bonus award.

In an additional embodiment, if the player leaves a gaming machine of the gaming system or does not play or wager on a suitable game within a predetermined period of time, the ranking for that player (or the ranking components associated with that player) decreases. In one such embodiment, the length of time or the number of designated periods of time that the player does not play or wager on a suitable game changes the player's ranking (or ranking components associated with that player). For example, if a player does not play or wager on a suitable game within a predetermined period of time, the ranking (or ranking components) associated with that player is reduced. In another example, if a first player does not play or wager in one hour and a second player does not play or wager in two hours, the ranking associated with the first player may change or be reduced by a lesser amount than the ranking associated with the second player. In another embodiment, the change to a player's ranking or to ranking components associated with a player are based on a player's status or a player tracking level (as determined by a player tracking system or module).

FIGS. 8, 9 and 10 illustrate examples of ranking determination wherein four players are playing four linked gaming machines. In these examples, upon the first player(s) initiating game play on system gaming machine(s), a first designated time period begins. As illustrated, the designated time period is thirty seconds. As seen in FIG. 8, Player A is playing at a $2.50 denomination gaming machine 14*a* at an average rate of one play of a primary or secondary game every seven and one-half seconds and Player B is playing at a $1 denomination gaming machine 14*b* at an average rate of one play of a primary or secondary game every fifteen seconds. The amounts wagered and other ranking components at the linked gaming machines in the system are tracked by the central server and accumulated in the ranking table 18. It should be appreciated that even though Player A and Player B are playing different denomination gaming machines, the system equates and tracks each player's wagers in terms of monetary units. In this example, each penny or $0.01 wagered at a gaming machine in the system is equivalent to one monetary unit. Thus, in this example, the system equates and tracks one play of gaming machine 14*a* by Player A as two-hundred-fifty monetary units and one play of gaming machine 14*b* by Player B is equated to and tracked as one-hundred monetary units.

As illustrated in FIGS. 8, 9, and 10, Player C begins playing at a $0.50 denomination gaming machine 14*c* at an average rate of one play of a primary or secondary game every ten seconds and Player D begins playing at a $0.10 denomination gaming machine 14*d* at an average rate of one play of a primary or secondary game every six seconds. As described above, even though the four gaming machines each enable play at different denominations, the central server equates and tracks each player's wagers in terms of wagered units or monetary units (i.e., wherein each $0.01 wagered equals one monetary unit) and thus one play of gaming machine 14*c* by Player C is tracked as fifty monetary units and one play of gaming machine 14*d* by Player is tracked as ten monetary units.

In this embodiment, a player is considered active, if one of two separate criteria (i.e., the minimum amount wagered requirement or the minimum frequency of wagers placed requirement) are satisfied. However, it should be appreciated that, as described above, any number of different criteria alone or in combination may be employed for ranking one or more players or gaming machines as described below.

As illustrated in FIG. 8, Player A placed four wagers of two-hundred fifty monetary units per wager (i.e., four $2.50 wagers) at gaming machine 14*a* during the designated time period. The central server ranks Player A of gaming machine 14*a* according to the acquired ranking components (e.g., 1000 wagered monetary units and 7.5 seconds per each placed wager) during the designated time period. Player B placed two wagers of one-hundred monetary units per wager (i.e., two $1 wagers) at gaming machine 14*b* during the designated time period. The central server ranks Player B of gaming machine 14*b* according to the ranking components (e.g., 100 wagered monetary units and 15 seconds per each placed wager) acquired during the designated time period. Player C placed three wagers of fifty monetary units per wager (i.e., three $0.50 wagers) at gaming machine 14*c* during the designated time period. The central server ranks Player C of gaming machine 14*c* according to the ranking components (e.g., 50 wagered monetary units and 10 seconds per each placed wager) acquired during the designated time period. Player D placed five wagers of ten monetary units per wager (i.e., five $0.10 wagers) at gaming machine 14*d* during the designated time period. The central server ranks Player D of gaming machine 14*d* according to the ranking components (e.g., 10 wagered monetary units and 6 seconds per each placed wager) acquired during the designated time period. In this example, Player A is ranked first, Player B is ranked second, Player C is ranked third and Player D is ranked fourth based on the ranking components acquired during the designated time period.

In an alternative embodiment, ranking components for an individual player or gaming machine are accumulated if the player or gaming machine achieves certain criteria. That is, the player or gaming machine is considered inactive and ranking components will not be acquired if the player or gaming machine fails to satisfy the certain criteria. For example, the player may only be ranked if the player has played a predetermined number of primary or secondary games (e.g., a plurality of games) in a predetermined time period (e.g., ninety seconds; one-hundred twenty seconds or the thirty seconds preceding the occurrence of a triggering event). Alternatively, the ranking components are acquired if the player or gaming machine fails to satisfy the certain criteria, but are not employed to determine the ranking as described below. In another example, ranking components are accumulated for an individual player or gaming machine when, during the designated time period, the player has played a minimum number of games (e.g., at least four plays of the primary or secondary game) regardless of the amount wagered or the player has wagered a minimum amount (e.g., two-hundred monetary units) in the primary or secondary game. In an alternative embodiment, other certain criteria including one or more additional ranking components described above is employed as desired by the implementer or operator of the gaming system.

Referring now to FIG. 9, inactive players are not ranked in this example. The designated time period for the example illustrated in FIG. 9 is ninety seconds. Inactive players are determined by a player or gamine machine not satisfying one of two separate criteria (i.e., the minimum amount wagered requirement or the minimum frequency of wagers placed requirement) in the designated time period. During a designated time period (i.e., ninety seconds), Player A placed zero wagers of two-hundred fifty monetary units (i.e., zero $2.50 wagers) at gaming machine 14*a*. Since Player A did not satisfy one of ranking criteria, the ranking components acquired from gaming machine 14*a* are not accumulated for the designated time period. Player B placed six wagers of two-hundred monetary units per wager (i.e., six $2 wagers) at gaming machine 14*b* during the designated time period. The central server ranks Player B of gaming machine 14*b* according to the ranking components (e.g., 1200 wagered monetary units and 15 seconds per each placed wager) acquired during the designated time period. Player C placed nine wagers of fifty monetary units per wager (i.e., nine $0.50 wagers) at gaming machine 14*c* during the designated time period. The central server ranks Player C of gaming machine 14*c* according to the ranking components (e.g., 450 wagered monetary units and 10 seconds per each placed wager) acquired during the designated time period. Player D placed fifteen wagers of ten monetary units per wager (i.e., fifteen $0.10 wagers) at gaming machine 14*d* during the designated time period. The central server ranks Player D of gaming machine 14*d* according to the acquired ranking components (e.g., 150 wagered monetary units and 6 seconds per each placed wager) during the designated time period. In this example, Player B is ranked first, Player C is ranked second, Player D is ranked third and Player A is not ranked based on the ranking components acquired during the designated time period.

Turning now to FIG. 10, active or inactive players or gaming machines are ranked based on ranking components acquired during one or more previous designated time periods in the illustrated embodiment. FIG. 10 illustrates an example in which a designated time period includes a plurality of previous designated time periods (e.g., as shown in FIGS. 8 and 9). The previous designated time periods may occur consecutively (e.g., in one continuous time period) or discontinuously (e.g., separate time periods). The designated time period illustrated in FIG. 10 lasts one hundred twenty seconds. In this example, the central server or controller determines rankings for players or gaming machines based on ranking components acquired during the designated time period (e.g., the one-hundred twenty second time period of FIG. 10). The central server or controller determines the rankings for active or inactive players or gaming machines during one of the previous designated time periods in this example.

During the designated time period of FIG. 10, Player A of gaming machine 14*a* placed four wagers of two-hundred fifty monetary units per wager (i.e., four $2.50 wagers) at gaming machine 14*a* during the designated time period. The ranking components accumulated during a previous time period (e.g., FIG. 8) are carried over to current time period (e.g., FIG. 10) even though Player A was inactive for a previous time period (e.g., FIG. 9). The central server ranks Player A of gaming machine 14*a* based on the ranking components (e.g., 1000 total wagered monetary units and 30 seconds per each placed wager) acquired during the previous designated time periods (FIG. 8 and FIG. 9). Player B placed eight wagers for one-hundred fifty monetary units per wager (i.e., two $1 wagers and six $2 wagers) at gaming machine 14*b* during the designated time period. Since Player B increased the amount of each placed wager from 100 monetary units to 200 monetary units in the previous time periods (FIG. 8 and FIG. 9), the average amount of each placed wager is 150 monetary units for the designated time period (FIG. 10). The central server ranks Player B of gaming machine 14*b* based on the ranking components (e.g., 1400 wagered monetary units and 15 seconds per each placed wager) acquired during the designated time period. Player C placed twelve wagers of fifty monetary units per wager (i.e., twelve $0.50 wagers) at gaming machine 14*c* during the designated time period. The central server ranks Player C of gaming machine 14*c* based on the ranking components (e.g., 600 wagered monetary units and 10 seconds per each placed wager) acquired during the designated time period. Player D placed twenty wagers of ten monetary units per wager (i.e., twenty $0.10 wagers) at gaming machine 14*d* during the designated time period. The central server ranks Player D of gaming machine 14*d* based on the ranking components (e.g., 200 wagered monetary units and 6 seconds per each placed wager) acquired during the designated time period.

In this example, Player B ranks highest or first. Player A ranks second highest or second, Player C ranks third highest or third and Player ranks fourth highest or fourth based on the ranking components acquired during the designated time period. As illustrated in FIG. 10, the player rankings adjust in real time based on wagering and play activity of each player. For example, player B ranks first based on consistent and increased wager activity and player A ranks second based in part on being inactive during the ninety second designated time period shown in FIG. 9. In an alternative embodiment, inactive player A may not be permitted to be ranked.

In another embodiment, the central server or controller acquires at least one ranking component in a bonus or secondary game that does not require a wager for participation. In this example, the at least ranking component is based on a rate of play for each player or for each gaming machine. For example, the central server or controller tracks or acquires an amount of time between each play of each game by each player as ranking components. The central server or controller determines the amount of time between each play by each player or placed on each gaming machine as a rate of play for each player or each gaming machine. For example, the amount of time between each play is measured as the time between activations of a player input device or other activation device in a primary or secondary game. In one embodiment, the amount of time is a set period (e.g., one-hundred twenty seconds) after the player or gaming machine was initiated or enrolled in the gaming system as described above. In another embodiment, the amount of time is a set period (e.g., thirty seconds) after the primary or secondary game was initiated on the gaming machine. Alternatively, in an additional embodiment, the bonus or secondary game requires a wager for participation and ranking components based on wager activity for each player or for each gaming machine are acquired for determination of the rankings. In this embodiment, such ranking components include total coin-in or an amount of each wager placed on each play for each player or any another ranking component based on wager activity desired by the implementer or operator of the gaming system.

Eligibility for Ranking

One or more ranked players or gaming machines may be active or inactive when a triggering event occurs. Active generally means that the central server has acquired at least one ranking component, wager activity or play activity from one or more players or gaming machines in a current designated time period. Inactive generally means that the central server has acquired some ranking component, wager activity or play activity from one or more players or gaming machines in a previous designated time period. In one embodiment, active or inactive players or gaming machines may be awarded an award based on their ranking. In another embodiment, only active players or gaming machines may be awarded an award based on their ranking and inactive players or gaming machines are ineligible for the award.

In one embodiment, the central server or controller will determine for each player if that player can be ranked (as discussed above) and thus eligible for the controller to select for an award. It should be appreciated that a player in the system needs to be ranked during at least one designated time period to be eligible for an award in some embodiments. For example, the central server or controller selects at least one ranked player to be provided with a bonus award based on the rankings determined by the central server or controller.

Additionally, the described embodiments contemplate other or additional methods for determining that a player is active. For instance, the player may be enabled to make a side wager or additional wager to be active for one or more subsequent triggering events. The side wager feature could also be time based where the additional wager causes the player to be considered active for a subsequent time period, such as one minute. In one embodiment, the side wager or additional wager qualifies the player to be ranked or improves the player's ranking for one or more subsequent designated time periods.

In one embodiment, at least one additional status is employed in accordance with the gaming system 10. In one embodiment, a participating status is provided for a player based on a determination of whether the player will be part of the triggering event or be eligible to be selected for a bonus award. For instance, a player will be in a participating status if the individual player playing a gaming machine is a premier player or has achieved another suitable status. This could be determined at least in part based on the player's status determined via a player tracking card that the player uses in the gaming machine. It should be appreciated that other criteria can be used to determine if a player is in the participating status. It should be further appreciated that when a player is in the participating status, the gaming system automatically treats the player as an active player for the purposes of ranking and bonus award eligibility by the gaming system.

In another embodiment, participating players (i.e., players not actively playing during a designated time period, but treated as an active player) can also be eligible for ranking. For example, a player who has achieved a ranking in one designated time period can maintain their ranking components over multiple designated time periods with or without actively playing the primary game of one of the linked gaming machines during those multiple designated time periods. In this instance, a ranking for at least one player may change (e.g., rise or fall) over the multiple designated time periods such that a player ranked first in one designated time period may fall to the fifth ranked player in a subsequent designated time period based on other players wager and play activity.

The controller determines a ranking for at least one player of the linked gaming machines or at least whether one or more players of the linked gaming machines is eligible for ranking. The ranking or eligibility for ranking can be based on whether a player is actively playing a gaming machine during a designated time period, such as the ninety seconds preceding a trigger event, in one embodiment. In this embodiment, actively playing during a designated time period means that the player is playing the gaming machine (i.e., placing wagers on plays of a primary or secondary game) at least at a predefined minimum rate during a predefined time period, such as the designated time period. Accordingly, in one example, the player is considered active upon playing the primary game of the gaming machine (i.e., placing wagers on plays of the primary game) at least at one time or at a predefined minimum rate during a predefined time period. For example, the player may be eligible for ranking after having made at least one play of the primary game in a fifteen second period prior to the triggering of the triggering event. In this example, the designated time period is that fifteen second period prior to the occurrence of the triggering event. In this instance, being considered active could help the player to some ranking advantage (e.g.; by increasing the value of at least one ranking component or ranking determined for at least one player or at least one gaming machine). In another embodiment, the player or gaming machine must be considered active to be ranked.

In one embodiment, the designated time period is the period of time when a primary game of a gaming machine must be actively played by a player prior to a triggering event in order to qualify that player for ranking in that triggering event. For example, the designated time period may start at 8:30 p.m. and end at 8:32 p.m. upon the occurrence of a triggering event. In this example; the designated time period is one-hundred-twenty seconds and one or more ranked players may be eligible to win a bonus award upon the occurrence of the triggering event if the player wagers a minimum amount (e.g., at least one monetary unit) on a game of that gaming machine in a predetermined time period (e.g., thirty seconds) prior to the triggering event as described above.

It should also be appreciated that other methods for giving the player a ranking advantage are contemplated. For instance, the gaming system can allow the players to place one or more side wagers or additional wagers to directly improve their player ranking or indirectly improving their player ranking through ranking components. In one example, a side wager increases the ranking for at least one player or gaming machine by a predetermined or random amount. In another example, a side wager increases at least one ranking component by a predetermined or random amount, which may also increase the ranking for at least one player or gaming machine. Alternatively, one ranking component (e.g., a number of maximum wagers or wagers above a minimum level) may be weighted more heavily than another ranking component (e.g., a number of games played) so to give a ranking advantage to one, a plurality of or all of the players or gaming machines. Such ranking advantages give the player a greater relative percentage of obtaining an award, a greater award, or some combination thereof.

Player Status

It should also be appreciated that the relative amount of the ranking components along with the determined player rankings for each player could vary based on other factors such as the desire to reward a player who has a higher gaming status than other players. For instance, if a player has a higher level player tracking card or a player's status, the player may be provided with a ranking advantage. In one embodiment, the ranking advantage is indirectly provided to the player by increasing one or more ranking components for that player. For example, in this embodiment, the number of monetary units in the meter of the gaming machine which the player plays is increased based on the player's status to provide that player a greater advantage in achieving a higher determined ranking. In another embodiment, the ranking advantage is directly provided through increasing the ranking for at least one player. In this embodiment, the determined ranking of a player with a high status may be increased by a predetermined number of ranks, such as four ranks. For example, if a player ranks tenth prior to the ranking advantage, the ranking advantage would increase the player's ranking to sixth. Alternatively, the player's status may increase the determined ranking of a player to a predetermined rank, such as first or another rank. For example, if a player ranks fifth prior to the ranking advantage, the ranking advantage would increase the player's ranking to first. Such ranking advantages provide players of status with an increased opportunity of being selected to receive a bonus award. In an alternative embodiment, a meter for a gaming machine or a ranking for a player may be set or reset to a seed amount or to include a seed amount based on the status of the player or one or more other factors to give that player a ranking advantage.

In one embodiment, the level of a player tracking card or a player's status (as determined through a player tracking system) is associated with one or more ranking components. For example, a player's status is associated with a total amount wagered by that player or the number of games played by that player. The wager amounts or the number of games may be determined from one of the system gaming machines, a plurality of the system gaming machines, through play of a proxy device, or through some combination thereof. In one embodiment, the wager amounts and the number of games are determined using gaming machines, such as gaming machines in a gaming system, portable gaming machines or proxy devices, that enable the player to play any suitable game at one or more different locations.

Wager Levels

In one embodiment of the gaming system, a minimum wager level is required for a player or gaming machine to qualify for ranking. In this embodiment, the minimum wager level is the maximum wager level for the primary or secondary game in a gaming machine. In another embodiment, the minimum wager level is a wager on all available paylines or wagering opportunities, such as a plurality of card hands or wagering rounds. In another embodiment, the minimum wager level is a maximum wager on all available paylines or wagering opportunities, such as a plurality of card hands or wagering rounds. In one embodiment, this requirement is in addition to any requirement that the player or gaming machine be active to qualify for ranking. In such embodiments, the maximum wager level is or is not be employed by the central server or controller as a ranking component to determine the rankings. In another embodiment, the method for determining if the player is active or eligible to be ranked includes whether or not the player has wagered a minimum level of monetary units since the occurrence of the last triggering event or any other designated time period.

In one such embodiment, if the player makes a designated number of wagers at a designated level, such as maximum wager on the primary game of a gaming machine, that player or gaming machine can qualify for ranking in one or more designated time periods. In this instance, the designated number of wagers at a designated wager level is a ranking component which contributes to and helps determine the ranking.

Ranking System

The central server or controller employs at least one ranking component acquired from the system gaming machines to determine a ranking for individual players or each system gaming machine. In the following description, examples of a ranking system for determining the ranking will be described in greater detail. In these examples, players are ranked based on ranking components acquired during a designated time period. R should be appreciated that in alternative embodiments based on the following examples, one or more system gaming machines are ranked based on ranking components acquired during the designated time period instead of one or more players.

FIG. 11 illustrates an example of a ranking system implemented by the central server to rank one or more players. The illustrated ranking system can be a numerical or quantitative point-based ranking system, which ranks players of the linked gaming machines from first to last in at least one or a plurality of ranking components or other statistical categories. In this example, players A, B, C, D, E and F are ranked from first to last in each of a plurality of ranking components or ranking component categories.

As illustrated in this example, the ranking components include the number of games played, the number of maximum wagers and the number of wagered monetary units and may include other ranking components described above. Points are awarded according to the order of each player's finish in each ranking component category and are totaled to determine an overall player rank. In one embodiment, only a certain number of players in each ranking component category are awarded points. For example, as shown in FIG. 11, if six players are playing the linked gaming machines during the designated time period, the player ranked highest in a certain ranking component category will receive 100 points (e.g., Player B in number of games played), the player ranked second highest in a certain ranking component category (e.g., Player E in number of games played) will receive 90 points and the player ranked third highest in a certain ranking component category (e.g., Player E in number of games played) will receive 80 points and so on. In the case of a tie, each player involved receives the total points due (e.g., if two players were tied for third highest ranking in number of games played, each player would receive 80 points). Alternatively, each tied player could receive 75 points or a split of the total points due.

In this example, rankings within the individual ranking components are based on the cumulative totals earned by players during a designated time period and may be based on multiple designated time periods or any other time period. The overall ranking of each player rises and falls depending on how the player performs relative to the performance of other players of the linked gaming machines. Since points within each ranking component will be adjusted in real time, the overall ranking of individual players may rise or fall through any gain or loss in points. The overall rankings, the individual ranking component categories, the rank points associated with the individual ranking component categories and the total rank points may or may not be displayed to the player.

For example, in FIG. 11, if player B would increase the number of max wagers played from three (e.g., 3 max wagers) to six (e.g., 6 max wagers), Player B would increase his/her overall rank to the highest ranking, while decreasing Player A to the second highest ranking and Player E to the third highest ranking. In another example based on FIG. 11, if Player C would increase the number of games played and the number of max wagers from two (e.g., 2 games played and 2 max wagers) to four (e.g., 4 games played and 4 max wagers), Player C would increase his/her total rank points to 260, which would tie with Player A for the second highest ranking. Player B would remain the highest ranked with a total of 280 points in this example.

In an alternative embodiment, a predetermined number of players earn points in each ranking component category. For example, FIG. 11 illustrates all six players A, B, C, D, E and F receiving points for a number of games played, a number of max wagers and a number of wagered monetary units. In the alternative embodiment, only the top four players in each ranking component category earn points toward an overall rank. In this example, based on FIG. 11, Players C and F would receive 0 points for number of games, player D would receive 0 points for number of max wagers and players and E would receive 0 points for number of wagered monetary units. Accordingly, in this example, the total rank points of players A, B, C, D, E and F would be adjusted and the overall ranking would be changed, if required.

It should be appreciated that more or less players may be given points in each ranking component category. For instance, in the example of FIG. 11, players C and F tied for fourth in the number of max wagers. Players E, A and B ranked first, second and third and earned 100 points, 90 points and 80 points, respectively and both fourth ranked players (e.g., players C and F) earned 70 points in this example. In an alternative embodiment, only one of the fourth ranked players would be selected to earn the 70 points for fourth place. Such selection could be random, predetermined such as based on a player's status established through a player tracking system, a player tracking card or determined in any other suitable manner as desired by the implementer or operator of the gaming system. Alternatively, players C and F can split the total expected points, so that players C and F each receive 65 points (e.g., 70 points for fourth place+60 points for fifth place divided by the number of tied players).

In the above example, players achieve point values associated with individual ranking components. The achieved point values are compared for different players to determine the rankings for those players. In one example, 100 points may be assigned to the player who scores the highest in a first ranking component, while 90 points may be assigned to the player who scores the highest in a second ranking component and 80 points may be assigned to the player who scores the highest in a third ranking component. The total number of points from at least one or a plurality of ranking components would contribute to the overall ranking of each player. Any number of points can be assigned to each particular ranking component and certain raking components can be weighted more heavily than others as desired by the implementer or operator of the gaming system. For example, the player having the highest coin-in total may be assigned 100 points whereas the player having the highest number of games played may be assigned 50 points. That is, the ranking component of total coin-in is weighted more heavily than the ranking component of highest number of games player in this example.

In an alternative embodiment, a predetermined threshold of points may be required before gaining eligibility for ranking by the central server or controller. For example, a player might have to achieve 500 points in the designated time period before becoming eligible for obtaining an overall ranking as determined by the central server or controller.

In one embodiment, rank points for individual players are accumulated in multiple designated time periods. In this example, the player rankings are based on a point total accumulated throughout the multiple designated time periods. In another embodiment, players are awarded points during one designated time period and the rankings are determined based on a point total accumulated and tracked by the central server or controller throughout the one designated time period.

The ranking system could alternatively implement a numerical or quantitative point-based system wherein players of the linked gaming machines are ranked from first to last in at least one or a plurality of ranking components or other statistical categories. As shown in the example of FIG. 12, players A, B, C, D, E and F are ranked from first to last in each of a plurality of ranking components. Points are awarded according to the order of each player's finish in each ranking component category and are totaled to determine an overall player rank. For example, as shown in FIG. 12, if six players are playing the linked gaming machines during the designated time period, the player who played the most number of games will receive 6 points (e.g., Player B), the player who played the second most number of games (e.g., Player E) will receive 5 points and so on. In the case of a tie, each player involved receives an average of the total points due (e.g., if two players were tied for third in number of games played, each player would receive 3.5 points [(4+3) 2=3.5]). In this example, rankings within the individual ranking components are based on the cumulative totals earned by players during a designated time period and may be based on multiple designated time periods or any other time period. Accordingly, the maximum number of points that a player can earn is equal to the number of ranking components multiplied by the number of players competing or being ranked. Similarly, the lowest number of points that a player can earn is equal to the number of ranking components multiplied by 1. The overall ranking of each player rises and falls depending on how the player performs relative to the performance of other players of the linked gaming machines. Since points within each ranking component will be adjusted in real time, the overall ranking of individual players may rise or fall through any gain or loss in points. As discussed above, the overall rankings, the individual ranking component categories, the rank points associated with the individual ranking component categories and the total rank points may or may not be displayed to the player via a display.

For example, in FIG. 12, if player B would increase the number of max wagers played from three (e.g., 3 max wagers) to six (e.g., 6 max wagers), Player B would rise to the highest overall rank of 1, while Player A would fall to the second highest ranking (e.g., overall rank of 2) and Player E would fall to the third highest ranking (e.g., overall rank of 3). In another example based on FIG. 12, if Player C would increase the number of games played and the number of max wagers from two (e.g., 2 games played and 2 max wagers) to four (e.g., 4 games played and 4 max wagers), Player C would increase to 12 total rank points, which would tie with Players A and E for the second highest ranking. Player B would remain the highest ranked with a total of 15.5 points.

As described in the above embodiments, one or more methods of breaking a tie between two or more players can be implemented to distinguish between two tied players. In one embodiment, the tied players split the ranking points. In another embodiment, the ranking points are assigned to only one of the tied players. It should be appreciated that any alternative tiebreaker or method of distinguishing between tied players could be used, such as a competition or game between tied players, a random selection between the tied players, or any other suitable tiebreaker as desired by the implementer or operator of the gaming system.

Triggering Event

One embodiment of the gaming system includes a plurality of linked gaming machines in which players are ranked according to wager and play activity on the plurality of linked gaming machines. After a triggering event, the central server or controller 12 selects one or more players from the plurality of players based on the determined player ranking described above. The triggering event can be random, predetermined or otherwise determined in any suitable manner desired by the implementer or operator of the gaming system.

In one embodiment, after the occurrence of a suitable triggering event, a bonus game is provided to one or more ranked players. The central server or controller determines a ranking for a plurality of players based on one or more acquired ranking components as described above. The central server or controller positions each ranked player along a ranking scale relative to other ranked players based on the determined ranking. The central controller or server selects at least one player based on the ranking scale after a suitable triggering event occurs. The central server or controller selects one or more ranked players based on the acquired ranking components and provides the selected player an award.

In one embodiment, outcomes generated in a game or a bonus provided after the triggering event are based on one or more of the ranking components acquired prior to the triggering event. The ranking components acquired during one or more predetermined time periods prior to the triggering event are independent of the outcomes generated in games or bonuses provided after the triggering event. In this manner, play and/or wager activity acquired from a player prior to the triggering event influences an outcome generated in a game provided to the player after the triggering event.

For example, if two players play at gaming devices in the gaming system. A first player wins 10 credits after wagering 20 credits in a primary game and a second player wins 100 credits after wagering 3 credits in a primary game. Based on the players' wager activity during the primary game, the central server or controller may determine that the first player is ranked higher than the second player because the first player wagered more than the second player. After a suitable triggering event, the first and second players are each provided with a bonus game. Because the first player wagered more during the primary game, the central server or controller determines to provide the first player with an award of 100 credits, a higher multiplier or another award in the bonus game.

In another embodiment, the speed or skill at which a player plays a base game or game prior to a triggering event determines, at least in part, an outcome for a secondary game or bonus provided after the triggering event. It should be appreciated that an outcome in the bonus game (which occurs after the triggering event) may be based on: (i) how fast or the rate at which one or more players play a primary game prior to the triggering event, (ii) how well or skillfully one or more players play a primary game prior to the triggering event, (iii) how much one or more players wager during a primary game prior to the triggering event, or any combination thereof.

In one embodiment, the gaming machines provide at least one apparent reason to the one or more ranked players for obtaining awards or bonus awards upon the occurrence of a triggering event. In this embodiment, the triggering event is triggered by an event in or based on any of the plays of any primary game or on any of the plays of any secondary game of the system gaming machines. For example, the triggering event includes a random occurrence of a predetermined symbol or a predetermined combination of symbols (e.g., a symbol combination including a plurality of bonus symbols) in a play of the primary game. That is, the triggering event is symbol driven.

In one embodiment, the system gaming machines do not provide any apparent reasons to the one or more ranked players for obtaining such awards or bonus awards. Since the one or more ranked players do not know when the triggering event will occur, the obtainment of such awards appears random to the ranked players. In this embodiment, the bonus awards are not triggered by an event in or based specifically on any of the plays of any primary game or on any of the plays of any secondary game of the gaming machines in the system as described above. That is, the gaming machines may simply provide the bonus awards to one or more ranked players without any explanation or alternatively with simple explanations such as "You Have Won a Bonus Award of $ __________." Such explanations and other information may be delivered to the player(s) via signals or messages (e.g., via gaming machines) containing such explanations or information. In one embodiment, the explanations and other information are delivered to the player(s) via a pop-up display, which may be randomly displayed to the player(s).

In one embodiment, the triggering event includes a random trigger number selected from a range of numbers. When the game is commenced, each game/player is allotted numbers from the same number range from which the random number was selected. That is, prior to each primary game, the central server or controller selects a random number from a range of numbers and during each primary game, the central server or controller allocates N number(s) in the range to the plurality of players. The previously selected random number is compared with the N number(s) allotted to the player(s). If there is a match between the trigger number and one of the player's allotted numbers, the central server or controller determines that the triggering event will occur and causes the triggering event to occur.

In one embodiment, the triggering event includes a random trigger number selected from a range of numbers. When the game is commenced, each game/player is allotted numbers from the same number range from which the random number was selected, wherein one number in the range is allotted for each credit bet such that the player's probability of being awarded any award(s) is proportional to the wager amount. That is, prior to each primary game, the central server or controller selects a random number from a range of numbers and during each primary game, the central server or controller allocates the first N numbers in the range to each player, where N is the number of credits bet by the player in that primary game. The previously selected random number is compared with the N numbers allotted to the player(s). If there is a match between the trigger number and one of the player's allotted numbers, the central server or controller determines that the triggering event will occur and causes the triggering event to occur.

In one embodiment, the central server or controller maintains one or more trigger values that are each associated with a separate range of values. In this embodiment, a triggering event will occur when the trigger value increments or increases to a value (i.e., a trigger hit value) within the range of values associated with that trigger value. For example, a triggering event will occur when the trigger value for one ranking component, e.g., a total wagered amount in monetary units or a total coin-in, increments to a trigger hit value of $50. In another example, a triggering event will occur when the trigger value for a different ranking component, e.g., a total number of games played, increments to a second trigger hit value of 7. The trigger hit values can be randomly selected, predetermined or otherwise determined by the implementer or operator of the gaming system. Alternatively, a triggering event will occur when at least one of the trigger values for a plurality of ranking components increments to a respective trigger hit value. For example, a triggering event will occur when (1) the trigger value for a first ranking component (e.g., a number of maximum wagers) increments to a trigger hit value of 5 or (2) the trigger value for a second ranking component, e.g., a total wagered amount in monetary units or a total coin-in, increments to a trigger hit value of $50. In an alternative embodiment, the triggering event may occur when each trigger value for the first and second ranking components increments to a respective trigger hit value, e.g., 5 for the first ranking component and $50 for the second ranking component.

In one embodiment, the central server or controller 12 maintains an accumulated wager pool (e.g., wagered monetary units) for all of the gaming machines in the gaming system for the designated time period. The central server determines when a triggering event will occur based, at least in part, on the accumulated amount in the accumulated wager pool. If the accumulated wager pool has not reached a predefined minimal threshold level, the central server does not make a determination of whether to cause a triggering event to occur. If the accumulated wager pool has reached at least the minimum threshold level of monetary units required to provide a triggering event, the central server randomly determines, based on a predetermined probability, whether the triggering event will occur or not. If the central server determines not to provide the triggering event to the gaming machines, the central server continues to track wagered monetary units, ranking components and rankings and waits until the next interval (i.e., based on the sampling rate) to determine if a triggering event will occur. It should be appreciated that in other embodiments, there is no minimum threshold level and the central server determines if such triggering event will occur at each preset interval based on a suitable sampling rate.

Figure 13:
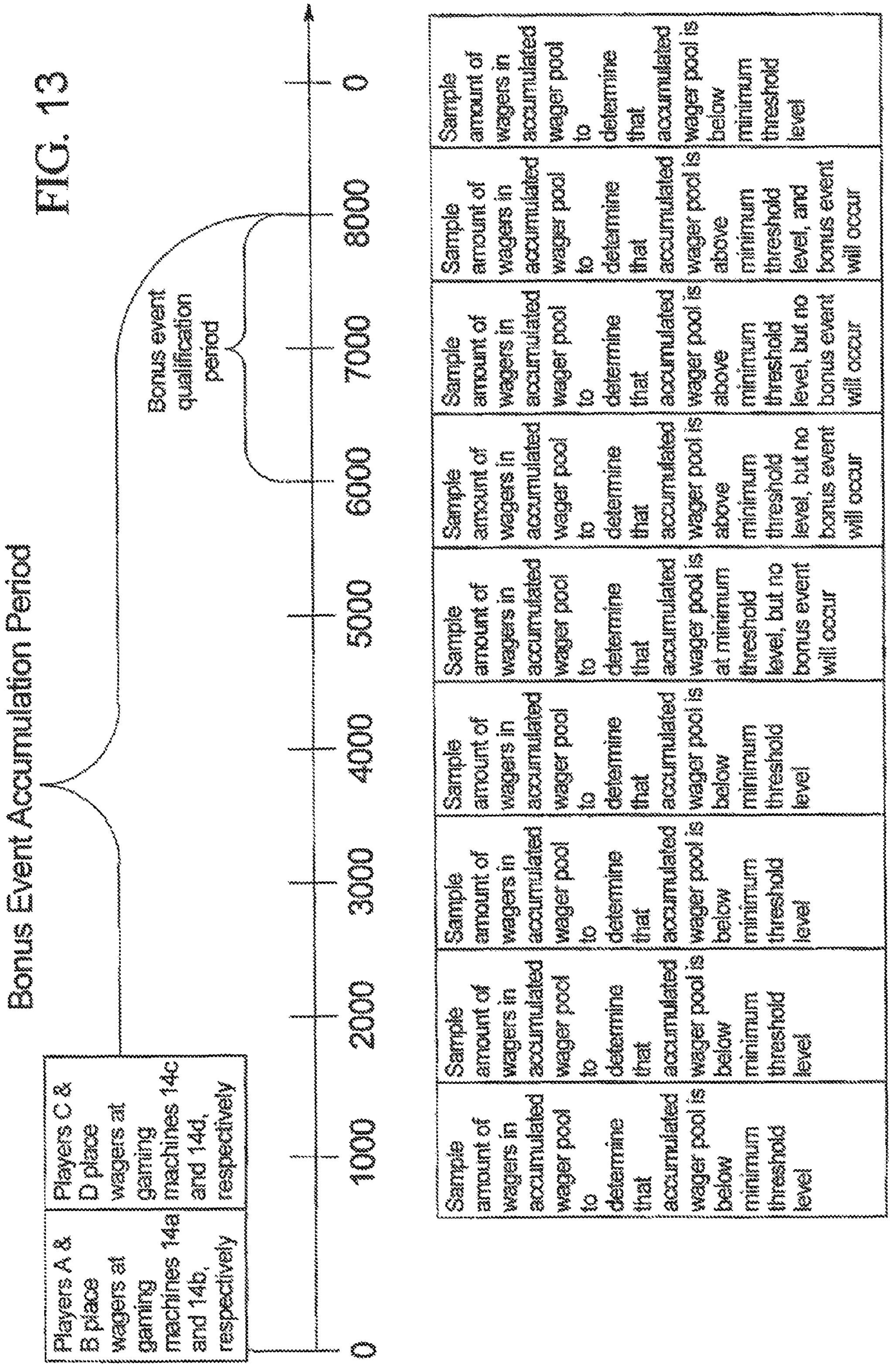
FIG. 13 is a timeline illustrating one embodiment of a triggering event in accordance with one embodiment of the gaming system.

In this embodiment, as generally illustrated in FIG. 13, the minimum accumulated wagered amount or threshold for a determination of whether a triggering event will occur is five-thousand monetary units in the accumulated wager pool. If the accumulated wager pool is below this predefined minimum threshold amount, the central server does not determine whether a triggering event will occur. The central server determines at regular intervals whether to provide a triggering event based on a sample rate. The sample rate can be any suitable rate, such as based on a number of monetary units wagered as tracked by the accumulated wager pool. For example, as seen in FIG. 13, a determination is made every one-thousand monetary units wagered. At each predetermined interval, the central server determines if the accumulated wager pool has reached the predefined minimum level of wagered monetary units for all of the gaming machines in the system.

In another embodiment, the central controller determines whether to provide a triggering event at regular intervals based on any other suitable sample rate, such as once every two minutes. In one embodiment, each time interval is associated with a probability of the triggering event occurring, wherein the probability of a triggering event occurring increases over time until the probability of the triggering event occurring is one-hundred percent (which may additionally coincide with a cap or limit of which the accumulated wager pool may grow to). For example, if the probability associated with a triggering event occurring after two minutes is 2.0%, the probability associated with a triggering event occurring after ten minutes may be 10.0%. In another such embodiment, even if the central server or controller determines that a triggering event will occur or be triggered (i.e., based on the probability associated with the elapsed time interval), the triggering event will only occur if the accumulated wager pool is at or above the predefined minimum threshold amount. In another such embodiment, if the accumulated wager pool is at or above the predefined minimum threshold amount (e.g., 5000 monetary units as shown in FIG. 13), the central controller will begin to determine at regular or predetermined intervals (such as every fifteen seconds or every 1000 monetary units wagered) whether to provide a triggering event.

In another embodiment, each time interval is associated with a probability of the triggering event occurring, wherein the probability of a triggering event occurring is based on the number of ranked players that are active in the gaming system. In this embodiment, the greater the number of active ranked players in the gaming system, the greater the probability of the triggering event occurring at each designated time interval. For example, if one ranked player is active, the probability of the triggering event occurring at each designated time interval may be 0.1%, if two ranked players are active, the probability of the triggering event occurring at each designated time interval may be 0.2% and if three ranked players are active, the probability of the triggering event occurring at each designated time interval may be 0.3%. In another embodiment, each time interval is associated with a probability of the triggering event occurring, wherein the probability of a triggering event occurring is based on the ranking components (e.g., the number of credits played or wagers placed during the previous bonus event accumulation period or designated time period).

If the accumulated wager pool has reached the predefined minimal level, the central server determines whether to provide the triggering event to one or more of the ranked players. In one embodiment, this is a random determination based on a suitable probability, such as two percent, five percent or ten percent. It should be appreciated that other suitable methods can be employed for determining whether to provide the triggering event to the one or more ranked players.

If the central server determines to provide the triggering event to the one or more ranked players, the central server immediately stores the accumulated wager pool for the triggering event along with any accumulated ranking components and rankings for at least one player or gaming machine. The central server then resets the accumulated wager pool, the ranking components and the rankings for the subsequent triggering event.

If the accumulated wager pool has not reached the predefined minimal level, the central server does not determine whether to provide a triggering event. If the central server does not determine whether to provide a triggering event, the central server waits until the next interval based on the sampling rate. In this case, the server continues to track monetary units in each of the meters or other ranking components in the ranking table because a new triggering event has not occurred.

It should also be appreciated that these determinations could be combined as one function instead of two functions. More specifically, as the accumulated wager pool reaches each of a plurality of predefined levels, the central server will make the random determination of whether to provide a triggering event. This eliminates the need to sample the accumulated wager pool at regular intervals. In a further embodiment, sampling is done only after the accumulated wager pool reaches the predefined threshold level.

In an alternative embodiment, the gaming system can allow the gaming machines to trigger the occurrence of the triggering event for a group of gaming machines instead of determining if the triggering event will occur based on a sampling rate. After the central server or controller determines that a triggering event will occur or be triggered by one of the gaming machines, the bonus awards are determined for at least one ranked player or gaming machine as described herein.

Ranking Table Resetting after Triggering Event

In one embodiment, after a triggering event, the ranking table is set or reset to zero for one, a plurality of or all of the players or gaming machines. As mentioned above, in one embodiment, any accumulated ranking components, such as the total coin-in of the wager meters of the gaming machines, are zeroed out at the occurrence of the triggering event for one, a plurality of or all of the players or gaming machines. In one embodiment, the value of each ranking component is set or reset to zero when the ranking table is set or reset to zero for one, a plurality of or all of the players or gaming machines. In another embodiment, some values of the ranking components are set or reset to zero when the ranking table is set or reset to zero for one, a plurality of or all of the players or gaming machines.

In another embodiment, any accumulated ranking components, such as the total coin-in of the wager meters of the gaming machines, are not zeroed out and/or respectively include a seed amount based on previous accumulated ranking components or a player's status for one, a plurality of or all of the players or gaming machines. In one embodiment, after each triggering event, the ranking table is set or reset to zero or a seed amount for one, a plurality of or all of the players or gaming machines. In an alternative embodiment, after a plurality or a predetermined number of triggering events, the ranking table is set or reset to zero or a seed amount as described above for one, a plurality of or all of the players or gaming machines.

In one embodiment, once the triggering event occurs and the award is provided to a selected for one, a selected plurality of or to all of the ranked players or ranked gaming machines, the ranking table is set or closed. After the ranking table is set or closed, a subsequent ranking table begins or opens with an initial accumulated amount of zero or another seed amount for each ranking component for one, a plurality of or all of the players or gaming machines. Additionally, the accumulation of ranking components and player rankings for each player also opens with an initial accumulated amount of zero or another seed amount for one, a plurality of or all of the players or gaming machines.

Prior to or after the ranking table is set or closed, the central server or controller determines a ranking for one, a plurality of or all of the players wagering on and playing the system gaming machines during a designated time period as described above. This determination is based on the ranking components accumulated throughout the designated time period. After the determination, the central server selects one, a plurality of or all of the ranked players for an award as described below.

Central Server Selection of Ranked Players or Gaming Machines

Generally, the central server or controller selects which player(s) or gaming machine(s) will be provided an award subsequent to a triggering event, such as any of the triggering events described above. In one embodiment, the central server determines which ranked players to select for the bonus award(s) and sends signals or messages containing such information to the selected ranked players (e.g., via gaming machines). In another embodiment, the central server determines which ranked gaming machines to select for the bonus award(s) and sends signals or messages containing such information to the selected ranked gaming machines for display to players thereof.

In one embodiment, the central server selects a plurality of ranked players for an award. In this example, the central server selects the three highest ranked players, and determines to provide the award to only one of the three selected players. In one embodiment, this determination is random and based on suitable predetermined probabilities, such as 50% for a high ranked player, 30% for an intermediate ranked player and 20% for a low ranked player. In one embodiment, the central server determines which ranked players to provide the award based on the relative amounts of total wagers placed by the players during the designated time period. In one embodiment, the central server selects the gaming machines (to provide the award) of a plurality of ranked players as a highest ranking group (e.g., a group including a plurality of players which had the most total wagers during the designated time period). In another embodiment, the controller selects all of the players in the selected group to be provided the award. In an alternative embodiment, the players proportionately or disproportionately share the award. In an additional embodiment, the central server or controller selects at least one ranked player based on a player's status described above. For example, the central server or controller employs information relating to a player's status established through a player tracking system or a player tracking card to select at least one ranked player for an award.

In another embodiment, the central server determines the relative percentage of amounts wagered by each ranked player to the total accumulated amounts wagered by those ranked players. In other words, the sum of the total wagers placed by the one or more ranked players will be used to determine a probability or percentage for each ranked player being selected for the award. The relative probabilities or percentages and player rankings will vary as players play at different rates, wager different amounts, play at different denominations and vary their own wager rates and amounts. Accordingly, the rank of each player and the associated probability or percentage will be adjusted in real time based on such wager and play activities.

The central server uses the relative probabilities or percentages of wagered amounts for each ranked player to randomly determine which ranked player will be selected for an award. Using this process, each ranked player has a chance of being selected for the bonus award. In this embodiment, the highest ranked player (i.e., the player with the most amount wagered during the designated time period in this embodiment) is selected by the central server for eligibility of the bonus award and has the best chance of being provided the bonus award. On the other hand, the lowest ranked player (i.e., the player with the least amount wagered during the designated time period in this embodiment) is selected by the central server for eligibility of the bonus award and has the worst chance of being provided the bonus award.

Referring back to FIG. 3, in this example, Players A, B and Z play gaming machines 14*a*, 14*b*, and 14*z*, respectively. The wager meter 20*a* or amount for gaming machine 14*a* is 110 monetary units, the wager meter 20*b* or amount for gaming machine 14*b* is 77 monetary units and the wager meter 20*z* or amount for gaming machine 14*z* is 33 monetary units. In this example, the controller ranks players A, B, Z as each plays respective gaming machines 14*a*, 14*b*, 14*z*. Players A, B and Z are ranked based on tracked and acquired ranking components (e.g., a total wager amount in monetary units). In this example, the probabilities for being selected for the bonus award for Player A of gaming machine 14*a* is 110/220 or 50%, for Player B of gaming machine 14*b* is 77/220 or 35% and for Player Z of gaming machine 14*z* is 33/220 or 15%. In one embodiment, the central server will determine the one or more ranked players which will be provided the bonus award based on these probabilities using a random number generator or random number generating algorithm.

Alternatively, the controller uses another method of selecting which player out of the three ranked players receives an award. For example, the controller can select the highest ranked player of the three ranked players. Alternatively, the controller can select the two highest ranked players. In one embodiment, the controller selects one or more groups including a plurality of ranked players. Although total wager amount is discussed above as the ranking component, any suitable ranking component (e.g., length of play, the number of games played, the number of maximum wagers or any other ranking component discussed above) can be used to rank players in any designated time period.

As illustrated in FIG. 14, in this example, three players are ranked according to their wager and play activity. In this example, the controller (1) tracks and acquires the number of games and the total wagered monetary units as ranking components, (2) determines a ranking for the players based on the total wagered monetary units by each player, and (3) selects one or more of the ranked players for a bonus award based on the player rankings. Player A has wagered 64 monetary units and is ranked first, Player B has wagered 24 monetary units and is ranked second and Player C has wagered 12 monetary units and is ranked third. In this example, the controller selects the highest ranked player, Player A, for the bonus award. As a result, the probability for being selected to receive the bonus award for Player A is approximately 100%, while the probabilities for being selected to receive the bonus award for Players B and C is 0%.

As illustrated in FIG. 15, in this example, three players are ranked according to their wager and play activity. In this example, the controller (1) tracks and acquires the number of games and the total wagered monetary units as ranking components, (2) determines a ranking for the players based on the total wagered monetary units by each player, and (3) selects one or more of the ranked players for a bonus award based on the player rankings. Player A has wagered 12 monetary units and is ranked first, Player B has wagered 12 monetary units and is ranked first and Player C has wagered 6 monetary units and is ranked third. In this example, Players A and B have tied for the same rank. Accordingly, Player A is ranked 1*a* and Player B is ranked 1*b*. As in the example of FIG. 14, the controller selects the highest ranked player for the bonus award, but since Players A and B are tied for the highest rank, the controller divides the percentage between the two tied players. In this example, each player has a 50% probability for being selected to receive 100% of the bonus award. Player C has a 0% probability for being selected to receive the bonus award in this example. In this example, the controller randomly selects either Player A or Player B to receive the bonus award based on the probabilities associated with each player. Alternatively, the controller could divide the percentage between the two tied players so that each player has a 100% probability for being selected to receive 50% of the bonus award (e.g., Players A and B each receive half of the bonus award).

As illustrated in FIG. 16, in this example, three individual players are grouped according to their wager and play activity and considered for an award based on the grouping. As illustrated, the controller (1) tracks and acquires the number of games and the total wagered monetary units as ranking components, (2) determines a ranking for the players based on the total wagered monetary units by each player, and (3) selects one or more of the ranked players for a bonus award based on the rankings. In this example, although Players A, B and C have wagered different amounts of monetary units, the controller groups Players A, B and C and considers Players A, B and C for an award based on the grouping. In one embodiment, Players A, B and C constitute a highest ranking group selected by the controller for a bonus award. Player A has wagered 64 monetary units and is ranked 1*a*, Player B has wagered 24 monetary units and is ranked 1*b* and Player C has wagered 12 monetary units and is ranked 1*c*. As a result, the probability for being selected to receive the bonus award for Players A, B and C, respectively, is approximately 33%. In this example, the controller randomly selects at least one player from the group to receive the bonus award based on the probabilities associated with each player. Alternatively, the controller could divide the percentage between the three players so that each player has a 100% probability for being selected to receive approximately 33% of the bonus award (e.g., Players A, B and C each receive about one-third of the bonus award).

As illustrated in FIG. 17, three individual players are grouped according to their wager and play activity and considered for an award based on the grouping. As illustrated, the controller (1) tracks and acquires the number of games and the total wagered monetary units as ranking components, (2) determines a ranking for the players based on the total wagered monetary units by each player, and (3) selects one or more of the ranked players for a bonus award based on the rankings. In this example, although Players A, B and C have wagered different amounts of monetary units, the controller groups Players A, B and C and considers Players A, B and C for an award based on the grouping. In one embodiment, Players A, B and C constitute a highest ranking group selected by the controller for an award or bonus award. Player A has wagered 64 monetary units and is ranked 1*a*, Player B has wagered 24 monetary units and is ranked 1*b* and Player C has wagered 12 monetary units and is ranked 1*c*. In this example, the controller uses the sum of the total wagers placed by Players A, B and C to determine the probability or percentage for each player of being selected for the bonus award. As a result, the probability for being selected to receive the bonus award for Players A is approximately 65%, the probability for being selected to receive the bonus award for Player B is approximately 24%, and the probability for being selected to receive the bonus award for Player C is approximately 12%. In this example, the controller randomly selects either Player A, Player B or Player C to receive the bonus award based on the probabilities associated with each player. Although one ranking component, e.g., monetary units wagered, is weighted in the above example, it should be appreciated that the central server or controller may employ any number of weighted or unweighted ranking components, alone or in combination, to determine the rankings for at least one player or gaming machine.

In a further alternative embodiment, a fixed percentage grid, matrix, or table is employed to determine the relative percentages generally described above. In one such embodiment, the ranking determines the relative percentages for each selected player regardless of at least one ranking component, e.g., total monetary units wagered or accumulated in each wager meter. For example, the highest ranking player or gaming machine could always have a 100% probability. Alternatively, the highest ranking player or gaming machine could always have a 75% probability, the intermediate ranking player or gaming machine could always have a 20% probability and the lowest ranking player or gaming machine could always have a 5% probability. Referring back to the example illustrated in FIG. 2 where:

(a) Player A of gaming machine 14*a* has wagered 110 monetary units, (b) Player B of gaming machine 14*b* has wagered 77 monetary units, and (c) Player Z of gaming machine 14*z* has wagered 33 monetary units, wherein the total wagered monetary units is the ranking component that determines ranking, then (1) Player A would have a 75% chance of being selected because Player A is ranked higher than Players B and C, (2) Player B would have a 20% chance of being selected because Player B is an intermediate rank, and (3) Player Z would have a 5% chance of being selected because it has the lowest rank.

These percentages are fixed regardless of the actual ratios of wagered monetary units accumulated in the wager meters of the system gaming machines. It should also be appreciated that in this embodiment, each different number of rankings can have a different table, grid or matrix associated with it. For example, any number of ranked players or gaming machines might be selected by the controller from a plurality of ranked players or gaming machines to be eligible for a bonus award. The following grids, tables or matrixes are contemplated for a gaming system in which a controller may select different numbers of ranked players or gaming machines for an award:

(A) Highest Ranked Player or Gaming Machine Selected $1^{st}$ 100%

(B) Highest Ranked Player or Gaming Machine Selected (Tie)

$1^{st}$ 50%

$1^{st}$ 50%

(C) Highest Two Ranked Players or Gaming Machines Selected $1^{st}$ 75%

$2^{nd}$ 25%

(D) Highest Three Ranked Players or Gaming Machines Selected $1^{st}$ 50%

$2^{nd}$ 30%

$3^{rd}$ 20%

(E) Highest Three Ranked Groups Selected (Each with three players or gaming machines)

$1^{st}$ through $3^{rd}$ 33% (rounded)

$4^{th}$ through $6^{th}$ 33% (rounded)

$7^{th}$ through $9^{th}$ 33% (rounded)

(F) Highest Six Ranked Players or Gaming Machines Selected $1^{st}$ 45%

$2^{nd}$ 29%

$3^{rd}$ 11%

$4^{th}$ 9%

$5^{th}$ 5%

$6^{th}$ 1%

It should be appreciated that the relative percentages in the above examples relate to being selected for a bonus award after the controller has selected a number of ranked players for eligibility of the bonus award. For example, as shown in example (F) above, if the controller selects six ranked players from a plurality of ranked players for eligibility of the bonus award, the $1^{st}$ ranked player has a 45% probability of being selected for the bonus award, the $2^{nd}$ ranked player has a 29% probability of being selected for the bonus award, the $3^{rd}$ ranked player has a 11% probability of being selected for the bonus award, the $4^{th}$ ranked player has a 9% probability of being selected for the bonus award, the $5^{th}$ ranked player has a 5% probability for being provided the bonus award and the $6^{th}$ ranked player has a 1% probability of being selected for the bonus award.

In another alternative embodiment, each ranked player can be placed in a category, group or range. If two or more ranked players are placed in the same category, group or range, than the percentage for that category, group or range is divided between those ranked players as shown in examples (B) and (E) described above. In example (B), for instance, two ranked players tied for the highest ranking and the percentage is divided between the two tied players. The central server may determine, randomly or otherwise, which of the two tied players will be provided the bonus award based on the percentage associated with each player.

It should also be appreciated that the relative percentages in the above examples can relate to the percentage of the primary or secondary bonus award provided to the ranked players. For example, based on example (B) above, each of the two tied players would receive 50% of the bonus award. As described above, example (B) divides the percentage between the two tied players so that each player has a 50% probability to receive 100% of the bonus award. Similarly, in example (F), if the controller selects six ranked players from a plurality of ranked players for eligibility of the bonus award, the $1^{st}$ ranked player receives 45% of the bonus award, the $2^{nd}$ ranked player receives 29% of the bonus award, the $3^{rd}$ ranked player receives 11% of the bonus award, the $4^{th}$ ranked player receives 9% of the bonus award, the $5^{th}$ ranked player receives 5% of the bonus award and the $6^{th}$ ranked player receives 1% of the bonus award.

It should be appreciated that in alternative embodiments based on the above examples, the central server or controller selects one or more system gaming machines based on the determined rankings instead of selecting one or more players.

Alternative Example of Grouping

As described above, the central server or controller selects one, a plurality of or all of the ranked players for an award. In one embodiment, the central server or controller places the selected player or players into one or a plurality of groups or subsets. For example, if the ranked players include players A, B and C and the central server or controller selects player C for an award, the central server or controller places or moves Player C into a group separate from Players A and B.

Continuing with the above example, the ranked players now include Players A and B since the central server or controller placed or moved Player C into the separate group. The central server or controller selects player B for an award as described above and places Player B into a group separate from Player A. In one embodiment, the central server or controller places Player B into the same group as Player C. In another embodiment, the central server or controller places Player B into a group separate from Player C.

In the above example, the ranked players now include only player A since players B and C were placed into a group or groups separate from player A. In this example, the central server or controller selects player A for an award as described above and places Player A into a group. In one embodiment, the central server or controller places Player A into the same group as Players B and C. In another embodiment, the central server or controller places Player A into a group separate from Players B and C. In another embodiment, the central server or controller places Player A into the same group as Player B or Player C. In another embodiment, the central server or controller does not select Player A for an award. In one embodiment, the central server or controller reunites Players A, B and C into the same group after the central server or controller selects or does not select Player A for an award. In this embodiment, the central server or controller sets or resets the acquired ranking components, the determined ranking or both for Players A, B and C to zero or to a seed amount as described above.

In another embodiment, based on the above example, the group including Player C is associated with an additional award or bonus award and Player C competes with any players in the group for the additional award or bonus award. In this embodiment, the central server or controller compares the acquired ranking components for Player C to the acquired ranking components of other player(s) in the group and ranks Player C relative to the other player(s) in the group in the same manner as described above. In another embodiment, the additional award or bonus award associated with the separate group is of different value, e.g., higher or lower, than the award previously provided to Player C. In one embodiment, the central server or controller sets or resets the acquired ranking components, the determined ranking or both for player C to zero or to a seed amount as described above when the central server or controller places or moves Player C into the separate group. In another embodiment, the separate group including Player C is not associated with an additional award or bonus award.

In one embodiment based on the above example, the selected players receive awards of different values. Player C, who the central server or controller selected before players A and B, receives an award having a high value. Player B, who the central server or controller selected after Player C and before Player A, receives an award having an intermediate value. Player A, who the central server or controller selected after Players B and C, receives an award having a low value. In this embodiment, all of the players A, B and C receive an award. In an alternative embodiment, the players receive an award having the same value. In another alternative embodiment, the central server or controller selects only one or some of the players to receive an award.

In alternative embodiments, the central server or controller places the selected player or players into one or a plurality of groups or subsets in different ways. In one alternative embodiment, the central server or controller places players selected in different designated time periods into different groups or subsets. In another alternative embodiment, the central server or controller associates the acquired ranking components with separate groups or subsets. For example, the central server or controller places players selected for playing a high number of games into a separate group from players selected for achieving a high rate of play.

In another alternative embodiment, the central server or controller selects a plurality of players for an award and places or moves the plurality of players into a separate group as described above. In one embodiment, the central server or controller associates the determined rankings with separate groups or subsets. For example, the central server or controller selects players with rankings 1 to 5 for an award and moves those players to a separate group or subset. places the selected player or players based on a particular ranking component into one or a plurality of groups or subsets.

In this one embodiment, the central server or controller moves or places a selected one or a selected plurality of the players into the separate group or groups described above when a predetermined triggering event occurs, such as when a player plays a predetermined number of games or achieves some other trigger value as described above. In another embodiment, the central server or controller moves or places a selected one or a selected plurality of the players into the separate group or groups described above when a random triggering event occurs, such as a random occurrence of a predetermined symbol or a predetermined combination of symbols in a play of the primary or secondary game.

It should be appreciated that in alternative embodiments based on the above examples, the central server or controller selects one or more system gaming machines based on the determined rankings instead of selecting one or more players and moves the selected gaming machine(s) into the separate group(s) described above.

Example of Multiple Triggering Events

As described above, in the example illustrated in FIG. 6B, multiple triggering events can occur during the same designated time period. In this example, the central server or controller tracks and acquires or determines at least one ranking component from the plurality of system gaming machines during the same designated time period for multiple triggering events. For example, a triggering event is scheduled to randomly occur during the month of September (e.g., a designated time period) and is referred to as a monthly triggering event in this example. Additionally, the central server or controller 12 tracks and acquires at least one ranking component from the plurality of system gaming machines during at least one additional or supplemental designated time period (e.g., each day in September). In this example, a triggering event is scheduled to randomly occur during each day of September and is referred to as a daily triggering event in this example.

It should be appreciated that the monthly or daily triggering event can randomly occur at any time during the respective time period. For example, the monthly triggering event can randomly occur on any day in September and the daily triggering event can randomly occur at any time during the respective day. In another embodiment, at least one portion of the designated time period is weighted to have a higher probability of causing the triggering event to occur than other portions. For example, in one embodiment, the monthly triggering event has a higher probability of being triggered on September 5 than on September 20. In another example, in another embodiment, the daily triggering event is weighted to have a higher probability of occurring between 9:00 a.m. and 10:00 a.m. on September 8 than during other hours for that particular day.

In this example, the central server or controller acquires the ranking components from at least one player during each day of September and accumulates the acquired ranking components for the month of September. The central server or controller ranks at least one player based on the ranking components acquired during each day in September and accumulated for the month of September. In other embodiments, the central server ranks at least one gaming machine instead of at least one player.

In one embodiment, the central server or controller 12 provides the highest overall ranked player for the designated time period (e.g., September) with a bonus award (e.g., $100,000 or some other award) upon the occurrence of the monthly triggering event. In another embodiment, the central server or controller 12 provides the highest overall ranked player for each supplemental designated time period (e.g., each day of September) with a bonus award (e.g., $5,000 or some other award) upon the occurrence of the daily triggering event. In this example, a display could be coupled to the central server or controller 12 to display at least an identity of at least one player or gaming machine and information pertaining to the rankings determined for the at least one player or gaming machine in addition to any of the information described below.

TABLE I (Day 1):

| Player | Daily Time Remaining | Daily Ranking | Overall Time Remaining | Overall Ranking (for September) |
|---|---|---|---|---|
| A | 3 hours | 1 | 29 days, 3 hours | 1 |
| B | 3 hours | 2 | 29 days, 3 hours | 2 |
| C | 3 hours | 3 | 29 days, 3 hours | 3 |
| D | 3 hours | 4 | 29 days, 3 hours | 4 |
| E | 3 hours | 5 | 29 days, 3 hours | 5 |

As shown for Day 1, the overall ranking of players A, B, C, and E corresponds to the daily ranking for those players. Three hours remain in the daily designated time period and twenty nine days and three hours remain in the monthly designated time period. If the daily triggering event occurs at this time, the controller selects Player A to be provided with a bonus award of $5,000 based on the daily ranking. If the monthly triggering event occurs at this time, the controller selects Player A to be provided a bonus award of $100,000 based on the overall ranking.

TABLE II (Day 5):

| Player | Daily Time Remaining | Daily Ranking | Overall Time Remaining | Overall Ranking (for September) |
|---|---|---|---|---|
| A | 13 hours | Not Ranked | 25 days, 11 hours | 1 |
| C | 13 hours | 2 | 25 days, 11 hours | 2 |
| D | 13 hours | 1 | 25 days, 11 hours | 3 |
| E | 13 hours | 3 | 25 days, 11 hours | 4 |
| B | 13 hours | Not Ranked | 25 days, 11 hours | 5 |

As shown for Day 5, the overall ranking of players A, B, C, and E have changed from Day 1. Players A and B, who have not played on Day 5, respectively rank first and fifth overall based on previous play. Players C, D and E respectively rank 2, 1 and 3, for Day 5. Players A, C, D, E and B rank first through fifth, respectively, for the month of September. Thirteen hours remain in the daily designated time period and twenty five days and eleven hours remain in the monthly designated time period. If the daily triggering event occurs at this time, the controller selects Player D to be provided with a bonus award of $5,000 based on the daily ranking. If the monthly triggering event occurs at this time, the controller selects Player A to be provided a bonus award of $100,000 based on the overall ranking.

TABLE III (Day 20):

| Player | Daily Time Remaining | Daily Ranking | Overall Time Remaining | Overall Ranking (for September) |
|---|---|---|---|---|
| C | 0 hours | Not Ranked | 10 days, 0 hours | 1 |
| Z | 0 hours | Not Ranked | 10 days, 0 hours | 2 |
| Y | 0 hours | Not Ranked | 10 days, 0 hours | 3 |
| X | 0 hours | 1 | 10 days, 0 hours | 4 |
| A | 0 hours | Not Ranked | 10 days, 0 hours | 5 |

As shown for Day 20, only players C and A are still ranked from Day 1. Players Z, Y and X are newly ranked (since Day 5) although only Player X has played on the system gaming machines on Day 20. Player X ranks first for Day 20 and is provided a bonus award of $5,000 if the daily triggering event occurs at this time. Players C, Z, Y and A, who have not played on Day 20, respectively rank first, second, third and fifth overall based on previous play (during Days 1 through 19, for example). Player X ranks fourth overall for September. Day 20 has ended and ten days remain in the monthly designated time period. If the monthly triggering event occurs at this time, the controller selects Player C to be provided with a bonus award of $100,000 based on the overall ranking. Since the daily triggering event occurs at this time, the controller selects Player X to be provided with a bonus award of $5,000 based on the daily ranking.

In the above examples, it should be appreciated that any number of ranked players or ranked gaming machines may be shown on a display. Additionally, any of the players might win awards for multiple occurrences of the daily triggering event based on the daily rankings. For example, Player A might win a bonus award for multiple days (e.g., days 1, 2 and 3 of September). It should also be appreciated that a player need not earn the highest rank in a supplemental designated time period (e.g., a day of September) to earn the highest rank in the designated time period (e.g., the month of September). Alternatively, the implementer or operator of the gaming system may require players to earn the highest rank in at least one supplemental designated time period to qualify for ranking in the designated time period.

In the above examples, the same or different ranking system can be used in the designated and supplemental time periods until the occurrence of a triggering event. Alternatively, the same or different ranking components can be used in the designated and supplemental time periods until the occurrence of a triggering event. In one embodiment, the same or different ranking systems and the same or different ranking components can be used in different supplemental time periods until the occurrence of a triggering event. For example, in one embodiment, a numerical or quantitative ranking system could be used to rank the players during the designated time period, the supplemental time periods or any combination thereof.

In the above examples, the controller provides the daily and monthly bonus awards to the highest ranked player upon the occurrence of a triggering event. Alternatively, the controller could provide the bonus award to a plurality of ranked players in part (e.g., divided by the number of ranked players) or in its entirety (a bonus award for each ranked player) upon the occurrence of a triggering event. For instance, the controller could provide the daily bonus award of $5,000 to the top five ranked players in part (e.g., wherein each player receives $1,000) or in its entirety (e.g., wherein each player receives $5,000) upon the occurrence of a daily triggering event.

In one embodiment, the ranked players including their associated ranking are displayed on a display common to a plurality of players, such as ranked and/or non-ranked players. Such display of ranked players induces a competitive environment which enables players to determine the likelihood of being provided an award (i.e., how close a player is to being provided an award). For example, if only the top ranked player is provided an award, other players have an opportunity to increase their wager or play activity, such as rate of play, wager amounts or any other ranking component, in an attempt to improve their ranking. Similarly, the top ranked player has the opportunity to maintain or change their wager or play activity, such as rate of play, wager amounts or any other ranking component, in an attempt to maintain the top ranking.

Awards

As described above, the central server selects one or more players or gaming machines based on the determined rankings and provides a bonus award to the one or more selected players or the one or more selected gaming machines upon the occurrence of a triggering event. In one embodiment, the gaming system includes a plurality of awards. These awards are referred to herein as awards or bonus awards and differ from the awards that the gaming machines provide to the players for winning outcomes in the plays of the primary wagering games, such as slot games, card games (e.g., poker, blackjack) or any other suitable game. The awards can be any suitable type of awards, such as monetary awards, fixed-value awards or progressive awards. The system gaming machines can also include other secondary games or secondary awards, such as other progressive jackpot awards. Alternatively, or in addition to the monetary, fixed-value or progressive awards, the award or bonus award may include a non-credit value, such as a multiplier, a number of free spins, a number of free selections, an incrementing value for one or more progressive awards, or a number of free games.

In an alternative embodiment, one or more other or additional awards, such as one or more progressive awards, primary awards or secondary awards, are associated with the gaming system. In one embodiment, the central server or controller selects ranked player(s) or gaming machine(s) to be provided one of these additional award(s). In one embodiment, the ranked player(s) or gaming machine(s) must also be active to be provided one of these additional award(s).

The number of awards and the amount of the awards provided to ranked player(s) or gaming machine(s) selected by the central server or controller can vary and be determined in a variety of different manners. In one embodiment, one award is selected to be provided to one or more ranked players of system gaming machines or to one or more gaming machines in the gaming system. In another embodiment, one award from a plurality of different awards is selected to be provided to one or more ranked players of gaming machines or to one or more gaming machines in the gaming system. In one such embodiment, the plurality of awards are progressive awards. In another embodiment, the central server or controller determines the number of awards based on the number of ranked or active players in the gaming system or the number of ranked or active gaming machines in the gaming system at a designated time, e.g., when a triggering event occurs.

In one embodiment, the controller provides a primary bonus award to one ranked player (e.g., the highest ranking player) and provides a secondary bonus award or a progressive award to the same ranked player or to one or more different ranked player(s). Alternatively, a plurality of ranked players (e.g., a ranked group of players) proportionately or disproportionately shares one or more bonus or progressive awards. In alternative embodiments, the controller provides a primary bonus award to one ranked gaming machine (e.g., the highest ranking gaming machine) and provides a secondary bonus award or a progressive award to the same ranked gaming machine or to one or more different ranked gaming machine(s). Alternatively, a plurality of ranked gaming machines (e.g., a ranked group of gaming machines) proportionately or disproportionately shares one or more bonus awards including any progressive awards associated with the bonus awards.

In one embodiment, the system gaming machines are operable to provide multiple bonus awards to multiple players at multiple gaming machines at the same time or substantially the same time. For example, if a first player triggers a triggering event by achieving a predetermined symbol or combination of symbols during at least one play of a system gaming machine, the first player and a ranked player may be provided an award at the same time or substantially the same time. The central server or controller selects the ranked player based on the determined ranking for the player as described above. In one embodiment, the award is based on the rankings determined by the central server or controller and may be provided to the highest ranked player in the system at the time the triggering event occurred. In this embodiment, the first player and the ranked player are provided the same or different awards. Alternatively, the awards are provided to the players at different times. For example, if the highest ranked player is unavailable, not active in the designated time period or not playing at a system gaming machine, then the central server or controller provides an award to the player that triggered the triggering event at a different time than an award provided to the selected ranked player (e.g., the highest ranked player). This could create a competitive gaming environment where players are competing to obtain the different bonus awards. Alternatively, the gaming system could randomly determine which player(s) receive each bonus award or use another tiebreaking method discussed above.

It should be appreciated that the selected one or more players can share one or more bonus awards with other ranked or unranked players. In this example, if the triggering event is provided to another ranked or an unranked player, the one or more bonus awards can be shared between the selected one or more ranked players and the player(s) provided the triggering event. In this example, if a new player who has not yet been ranked is provided a triggering event (e.g., a symbol driven triggering event in a primary or secondary game), both the new player and the selected one or more ranked players are provided at least a share of the bonus award. In one embodiment, the shares are equal (e.g., each receives 50% of the bonus award) and the players proportionately share the award as described above. In another embodiment, the shares are unequal (e.g., the ranked player receives 75% of the bonus award) and the players disproportionately share the award as described above. Accordingly, the possibility of being provided a triggering event or a bonus award increases player incentive to acquire and maintain a high ranking as determined by the central server or controller since ranked players or gaming machines are eligible for an award when any triggering event occurs.

In another embodiment, only the ranked player(s) selected by the central server or controller are provided any award(s) when another player or gaming machine triggers the triggering event. This embodiment increases player incentive for achieving a high ranking as determined by the central server or controller since only ranked players or gaming machines are eligible for an award when any triggering event occurs.

In one embodiment, upon the determination or occurrence of a triggering event, the gaming system determines the number of awards or bonus awards, such as one primary bonus award and zero, one or more secondary bonus awards that the gaming machine(s) will provide to the selected ranked player(s) of the multiple linked gaming machines in the gaming system. In one embodiment, one primary bonus award is always provided to one or more selected ranked players or gaming machines in the gaming system. In another embodiment, the central server or controller provides one primary bonus award to each ranked player or gaming machine selected by the central server as described above. In another embodiment, the central server or controller determines a number of secondary bonus awards based on the number of active ranked players in the gaming system at the time the triggering event occurs. In another embodiment, the central server or controller provides one primary bonus award to the highest ranked player while the central server or controller provides one secondary bonus award to a player who triggered the event, e.g., by achieving a predetermined symbol or combination of symbols during at least one play of a system gaming machine or to another ranked player or gaming machine selected by the central server or controller.

In another embodiment, the award or bonus award includes a plurality of awards. Each award is associated with a probability of being provided to the one or more ranked players or gaming machines based on the rankings determined by the central server. For example, award A is associated with a 40% probability of being provided to the selected ranked player(s) or gaming machine(s), award B is associated with a 30% probability of being provided to the selected ranked player(s) or gaming machine(s), award C is associated with a 20% probability of being provided to the selected ranked player(s) or gaming machine(s) and award D is associated with a 10% probability of being provided to the selected ranked player(s) or gaming machine(s), hi this example, each award corresponds to or is associated with one of a plurality of primary awards, secondary awards or progressive awards. It should be appreciated that in one embodiment, the award with the highest probability of being selected is associated with the lowest award value, while the award with the lowest probability of being selected is associated with the highest award value. It should be also appreciated that in another example, one or more low ranked players or gaming machines is associated with the lowest award value, while one or more high ranked players or gaming machines is associated with the highest award value.

In operation, at least one of the plurality of awards is provided to the selected ranked player(s) or gaming machine(s). The award value corresponding with the provided award is provided to the selected ranked player(s) or gaming machine(s) and the game ends. It should be appreciated that after the award is provided to the selected ranked player(s) or gaming machine(s), the central server resets the provided award to a determined initially funded amount. It should also be appreciated that in this example, the central server resets the ranking components and rankings determined by the central server to a determined initial amount after providing the award as described above.

It should be appreciated that in alternative embodiments, the central server or controller provides ranked gaming machines one of the awards described above instead of providing the award(s) to one or more ranked players.

In some of the above described embodiments, the system gaming machines do not provide any apparent reasons to the one or more ranked players or gaming machines for obtaining the awards including any primary or secondary awards. The one or more ranked players or gaming machines are provided or are eligible to be provided the primary or secondary awards based on the ranking determined by the central server or controller. Generally, since the one or more ranked players do not know when the triggering event will occur, the obtainment of such awards appears random to the ranked players. In other of the above described embodiments, the awards are triggered by an event in or based specifically on a play of a primary or secondary game of the gaming machine(s) selected to provide the primary or secondary bonus award.

In another embodiment, an award or bonus award may be based, at least in part, on the occurrence of one or more events at one gaming machine and also, at least in part, on a determination by a central controller based on a plurality of gaming machines in a gaming system. In certain such embodiments, upon a secondary or bonus game triggering event, a secondary or bonus game is triggered. In this embodiment, the secondary or bonus game proceeds and a secondary game award or bonus game award is determined based on the play of the secondary or bonus game. Additionally, the play of the secondary or bonus game determines which of any of a plurality of bonus awards may be provided to the player, wherein, as described above, the plurality of bonus awards are determined, at least in part, by the amounts wagered at a plurality of gaming machines in the gaming system. Accordingly, the total award provided to the player is based on: (i) any determined secondary game award or bonus game award determined during the play of the secondary or bonus game;

and (ii) one of a plurality of bonus awards which is selected based on the play of the secondary or bonus game, wherein the amounts of the plurality of bonus awards are determined, at least in part, by a central controller.

For example, if the secondary or bonus game is a free game or free activation game, the player may be provided a designated number of free games, such as free spins. During each free game, the gaming device determines any free game awards associated with any generated winning symbol combinations and the gaming device may or may not accumulate any designated symbols. After each of the designated number of free games are provided to the player, the gaming machine determines, based on the accumulated number of designated symbols, which of any of a plurality of bonus awards, such as which of any of a plurality of progressive awards, to provide to the player. That is, designated symbols (or points associated with designated symbols) accumulate during the free games and a progressive award level is determined based on the number of accumulated designated symbols (or accumulated points). The determined bonus award and any determined free game awards are combined to be provided to the player as one overall award. It should be appreciated that as the plurality of bonus awards are determined by the central controller, which of those bonus awards the player may be provided is determined, at least in part, based on one or more events at one of the gaming machines in the gaming system and any determined free game awards are determined based on one or more events at one of the gaming machines in the gaming system, in this embodiment, the overall award is determined, at least partially based on a determination at a central controller (i.e., the progressive award) and at least partially based on a determination during a free game sequence at a gaming machine (i.e., the free game sequence award).

In one embodiment, as described above, the award or bonus award provided to the selected one or more ranked players or gaming machines includes a progressive award. In one embodiment, the bonus award includes a plurality of progressive awards. The progressive awards are associated with the system gaming machines which each contribute portions of the progressive awards. The multiple gaming machines may be in the same bank of machines, in the same casino or gaming establishment such as through LAN or in two or more different casinos or gaming establishments such as through a WAN. It should thus be appreciated that in one or more embodiments, the controller may also function as a progressive controller.

In one embodiment, the amount of coin-in attributed to one or more progressive awards is used as a ranking component to rank players or gaming machines. In such an embodiment, the determined ranking may influence the probability or likelihood of winning an award, such as a monetary or non-credit value. For example, a player with a higher ranking (e.g., a player who contributed a high amount of coin-in) may be provided with a higher probability of winning an award than a player with a lower ranking (e.g., a player who contributed a low amount of coin-in). It should be appreciated that the determined ranking may also influence the value of the award or the number of free games or spins. For example, a player with a higher ranking may be provided with a higher award, a higher relative percentage of obtaining an award, a higher multiplier or a greater number of free games than a player with a lower ranking.

In one embodiment, when a triggering event occurs, the central server determines and selects one or more of the ranked players to be provided one of the progressive awards in the same manner as described above. The central server determines which one or more ranked players or gaming machines to give the progressive award to based on the ranking determined by the central server, which may include the weighted average of the wagers placed by the players on the system gaming machines as in the above embodiment. Alternatively, the gaming system could employ a suitable alternative method for selecting which one or more ranked players or gaming machines will receive the progressive award.

In one embodiment, a triggering event may be pending if no ranked players or gaming machines are in the system or are eligible for a bonus award upon the occurrence of the triggering event. Thus, another ranked player or gaming machine can be selected by the central server based on the determined ranking to achieve the pending bonus award. In one embodiment, the award is provided on a first play of one of the gaming machines in the system.

In one alternative embodiment, the gaming machines require an additional wager to fund the bonus award. For example, the bonus award is funded, at least partially, via a side-bet or side-wager which the player may make (and which is tracked, in one embodiment, via a side-bet meter). In one embodiment, the bonus award is funded with only side-bets or side-wagers placed. In another embodiment, the bonus award is funded based on player's wagers as described above as well as any side-bets or side-wagers placed. In another embodiment, a player can only be ranked if such additional wager is made. In this embodiment, a side-bet or side-wager must be placed (and tracked via a side-bet meter) at a gaming machine of the gaming system for that player to be classified as active and ranked in accordance with the described embodiments.

Information Provided to Player

As indicated above, the bonus awards can be provided to selected players or gaming machines based on rankings determined by the central server with or without explanation or information provided to the player, or alternatively can be displayed to the player, such as with display 26 of FIG. 2. Although the rankings for players and gaming machines A, Z and B are shown in FIG. 2, the display 26 is operable to display any of the following: at least one acquired ranking component, any determined rankings for players or gaming machines in the system (or both) and any awards or bonus awards described above. In one embodiment, such as an embodiment with the award including a progressive award, suitable information about the bonus awards can be provided to the players through one or more displays on the gaming machines or additional information displays positioned near the gaming machines, such as above a bank of system gaming machines.

This information can be used to entertain the players or to inform the players. Examples of such information are:

(1) the time remaining in one or more designated time periods;

(2) the overall rankings of players or the overall rankings of gaming machines;

(3) one or more rankings determined by the central server (e.g., during a competitive mode);

(4) at least one ranking component (e.g., any points or rankings in each ranking component that affect a determined rank or overall rank);

(5) that a triggering event has occurred;

(6) that a triggering event will shortly occur (i.e., foreshadowing the triggering event);

(7) that one or more bonus awards have been provided to one or more players or at one or more gaming machines;

(8) that one or more bonus awards will be shortly provided to one or more players or at one or more gaming machines (i.e., how close one or more players are to being provided an award or bonus award);

(9) which players or gaming machines have won the bonus awards such as any primary awards, secondary awards or progressive awards;

(10) the amount of the bonus awards won; and

(11) the amount of the bonus awards that can be won such as any progressive awards.

It should be appreciated that such information can be provided to the players through any suitable audio, audio-visual or visual devices, and may be displayed on or adjacent to a plurality of system gaming machines. Display 26 is one example of a suitable audio, audio-visual and visual device contemplated. In one embodiment, the determined rankings or ranking scale is displayed in the form of a leader board, standings or other format on a display device, such as display 26. The displayed ranking scale enables ranked players to see or determine the likelihood of obtaining a specific ranking and/or a specific award.

General

Method for Operating a Gaming System

Figure 18:
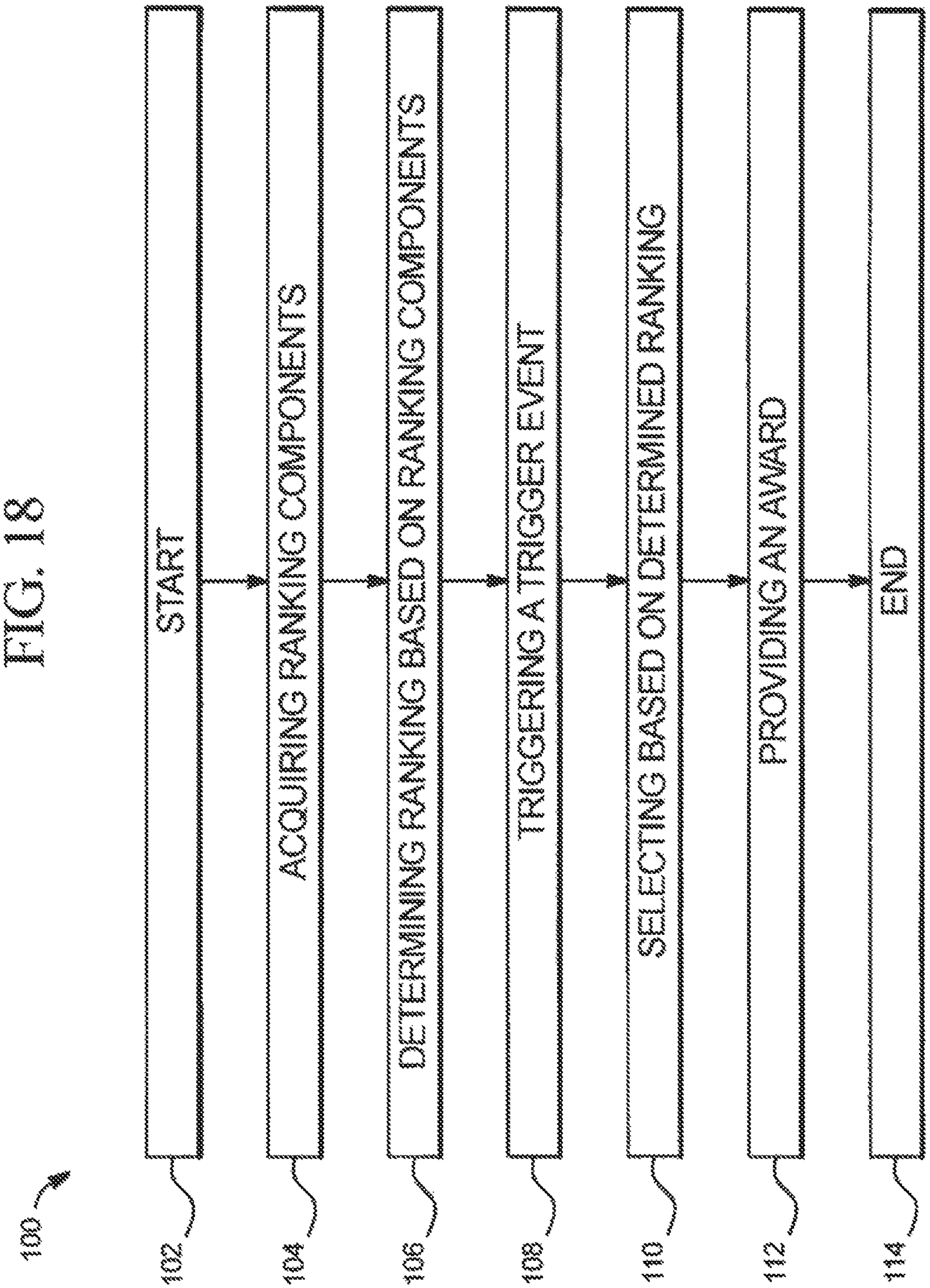
FIG. 18 is a schematic diagram illustrating one embodiment of a method for operating a gaming system including a plurality of gaming devices in communication with a controller.

FIG. 18 illustrates one embodiment of a method for operating a gaming system including a plurality of gaming devices in communication with a controller. In this embodiment, method 100 starts at block 102. At block 104, the central server or controller acquires at least one ranking component from a plurality of gaming devices. In one embodiment, the ranking components are acquired for a plurality of players associated with the plurality of gaming devices. As described above, the ranking components include at least one of the following: (1) a total amount wagered on each gaming machine, (2) a total amount wagered by each player, (3) a number of games played on each gaming machine, wherein the games are primary or secondary games, (4) a number of games played by each player, wherein the games are primary or secondary games, (5) an amount of each wager placed on each play of each gaming machine, wherein the play is of a primary or secondary game, (6) an amount of each wager placed on each play by each player, wherein the play is of a primary or secondary game, (7) an amount of time between each play of each game on the gaming machines, wherein the play is of a primary or secondary game, (8) an amount of time between each play of each game by each player and (9) a quality of play of each player (i.e., a player's skill level or how closely each player plays to optimal play). The central server or controller acquires the ranking components in play of a primary game, a secondary game or both on each of the system gaming machines during a designated period of time.

The central server or controller acquires the ranking components with a wager meter, player tracking system or player input or activation device as described above. Subsequent to acquiring the ranking components, at block 106, the central server or controller determines a ranking for at least one player associated with the plurality of gaming machines based on the acquired ranking components. Alternatively, the central server or controller determines a ranking for at least one gaming machine based on the acquired ranking components. A triggering event is triggered at block 108. In one embodiment, the triggering event is random. In another embodiment, the triggering even is predetermined or otherwise determined in any suitable manner desired by the implementer or operator of the gaming method. Upon the occurrence of the triggering event, at block 108, the central server or controller selects at least one players or alternatively, at least one gaming machine, at block 110. The selected player(s) or gaming machine(s) are selected based on the determined ranking. In one embodiment, the selection is random. In another embodiment, the selection includes a plurality of players or in the alternative, a plurality of gaming machines. At block 112, the central server or controller provides an award to the selected player(s), or alternatively to the selected gaming machine(s). The method ends at block 114.

General and Electronics of Gaming Devices and Gaming System

The present disclosure may be implemented in various configurations for gaming machines or gaming devices, including but not limited to: (1) a dedicated gaming machine or gaming device, wherein the computerized instructions for controlling any games (which are provided by the gaming machine or gaming device) are provided with the gaming machine or gaming device prior to delivery to a gaming establishment; and (2) a changeable gaming machine or gaming device, where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by a central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration. It should be appreciated that the primary game of the gaming device may be referred to as a game of chance, which may be configured as a dedicated game of chance, a changeable game of chance, a game of chance having certain functions operated in a thin client environment or a game of chance having certain functions operated in a thick client environment.

Figure 19A:
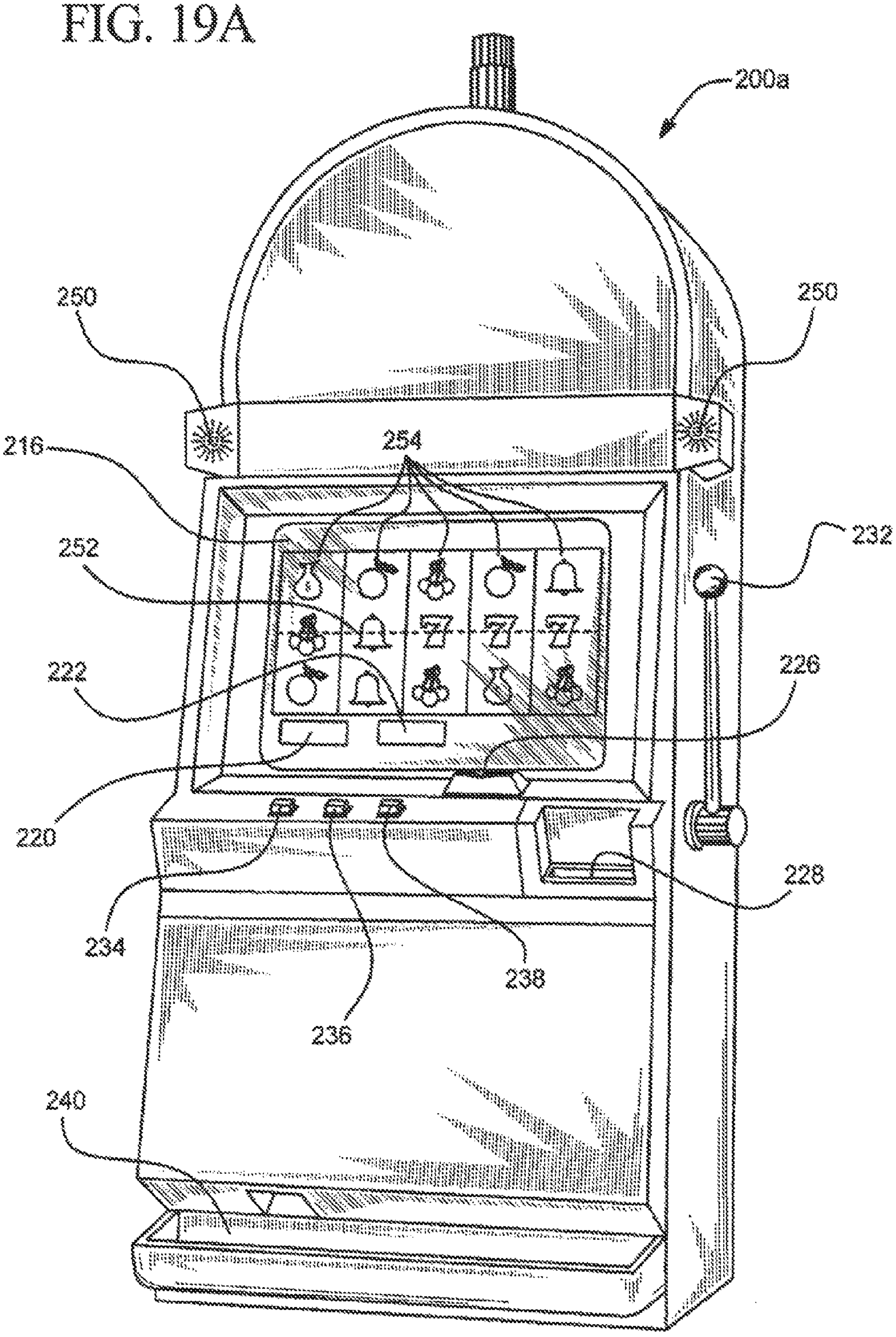
FIGS. 19A and 19B are front perspective views of alternative embodiments of gaming machines of one embodiment of the gaming system.
Figure 19B:
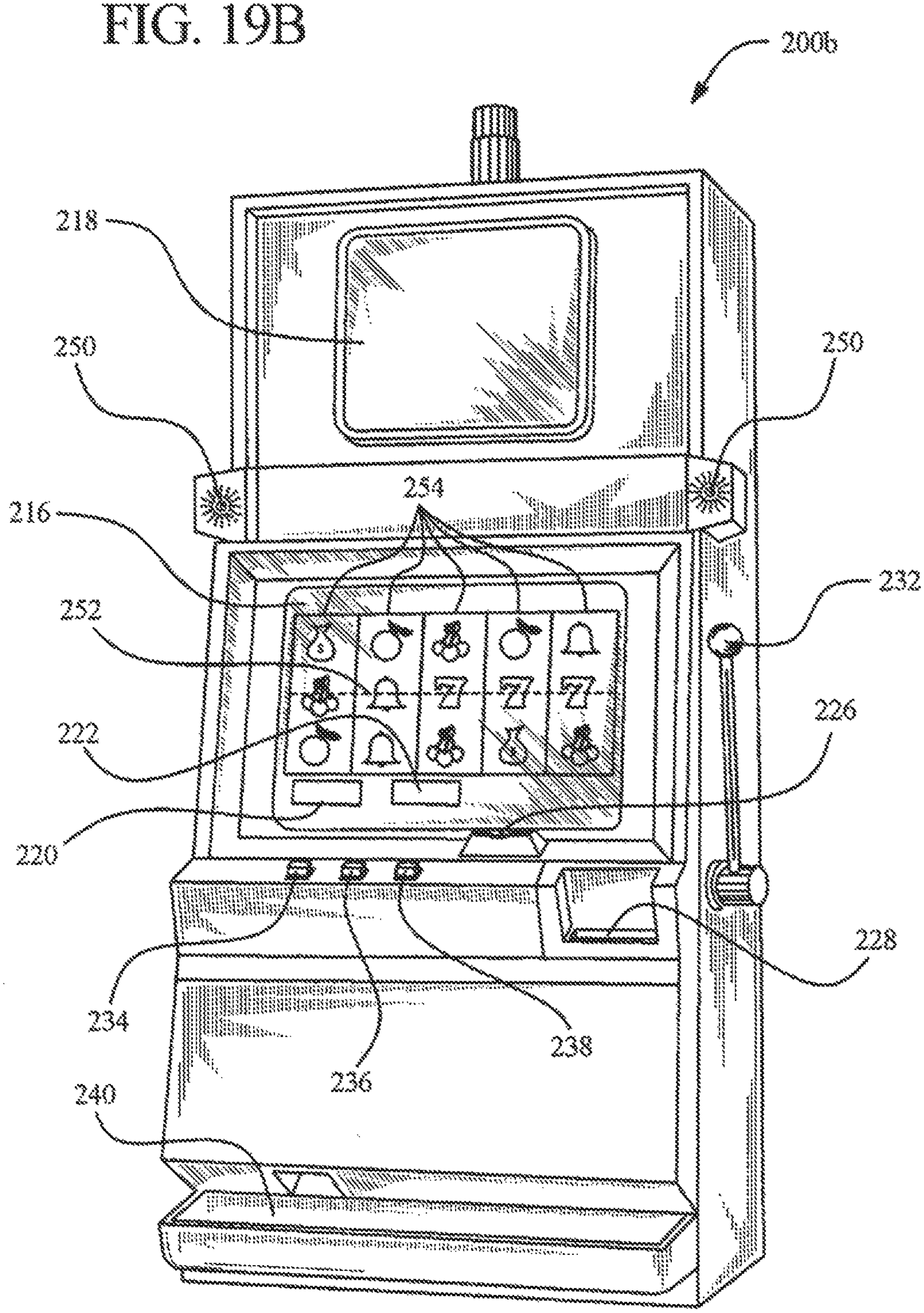

Referring now to the drawings, two example alternative embodiments of the gaming device of the disclosed herein are illustrated in FIGS. 19A and 19B as gaming device 200*a* and gaming device 200*b*, respectively. Gaming device 200*a* and/or gaming device 200*b* are generally referred to herein as gaming device 200. It should be appreciated that gaming devices 14*a*, 14*b* . . . 14*z*, as illustrated in FIG. 1, may be generally referred to herein as gaming device 200.

In the embodiments illustrated in FIGS. 19A and 19B, gaming device 200 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 19A and 19B, the gaming device may have varying cabinet and display configurations.

Figure 20:
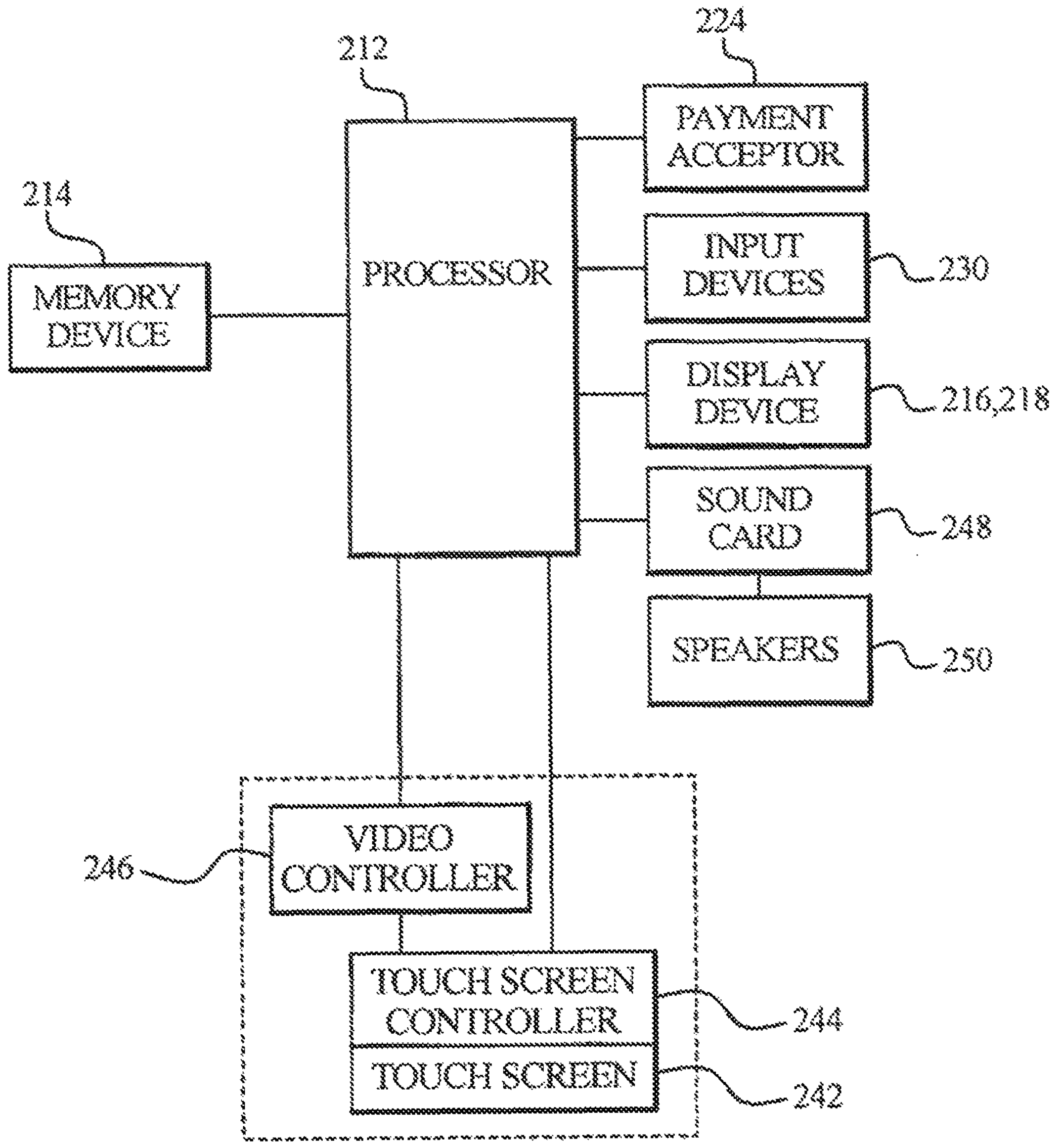
FIG. 20 is a schematic block diagram of the electronic configuration of one embodiment of a gaming machine in one embodiment of the gaming system.

In one embodiment, as illustrated in FIG. 20, the gaming device preferably includes at least one processor 212, such as a microprocessor, a microcontroller-based platform, a suitable integrated circuit or one or more application-specific integrated circuits (ASICs). The processor is in communication with or operable to access or to exchange signals with at least one data storage or memory device 214. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (FDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 20, the gaming device includes one or more display devices controlled by the processor. The display devices are preferably connected to or mounted to the cabinet of the gaming device. The embodiment shown in FIG. 19A includes a central display device 216 which displays a primary game. This display device may also display any suitable secondary game associated with the primary game as well as information relating to the primary or secondary game. The alternative embodiment shown in FIG. 19B includes a central display device 216 and an upper display device 218. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 19A and 19B, in one embodiment, the gaming device includes a credit display 220 which displays a player's current number of credits, cash, account balance or the equivalent. In one embodiment, gaming device includes a bet display 222 which displays a player's amount wagered.

In another embodiment, at least one display device may be a mobile display device, such as a FDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and laces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one or a plurality of game or other suitable images, symbols or indicia.

As illustrated in FIG. 20, in one embodiment, the gaming device includes at least one payment acceptor 224 in communication with the processor. As seen in FIGS. 19A and 19B, the payment acceptor may include a coin slot 226 and a payment, note or bill acceptor 228, where the player inserts money, coins or tokens. The player can place coins in the coin slot or paper money, a ticket or voucher into the payment, note or bill acceptor. In other embodiments, devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 19A, 19B and 20, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a pull arm 232 or a play button 234 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 19A and 19B, one input device is a bet one button 236. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 238. The player may push the cash out button and cash out to receive a cash payment or other suitable form of payment corresponding to the number of remaining credits. In one embodiment, when the player cashes out, the player receives the coins or tokens in a coin payout tray 240. In one embodiment, when the player cashes out, the player may receive other payout mechanisms such as tickets or credit slips redeemable by a cashier for other suitable redemption system) or funding to the player's electronically recordable identification card.

In one embodiment, as mentioned above and seen in FIG. 20, one input device is a touch-screen 242 coupled with a touch-screen controller 244, or some other touch-sensitive display overlay to allow for player interaction with the images on the display. The touch-screen and the touch-screen controller are connected to a video controller 246. A player can make decisions and input signals into the gaming device by touching the touch-screen at the appropriate places. One such input device is a touch-screen button panel. It should be appreciated that the utilization of touch-screens is widespread in the gaming industry.

The gaming device may further include a plurality of communication ports for enabling communication of the processor with external peripherals, such as external video sources, expansion buses, game or other displays, an SCSI port or a key pad.

In one embodiment, as seen in FIG. 20, the gaming device includes a sound generating device controlled by one or more sounds cards 248 which function in conjunction with the processor. In one embodiment, the sound generating device includes at least one and preferably a plurality of speakers 250 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Gaming device 200 can incorporate any suitable wagering primary or base game. The gaming machine or device may include some or all of the features of conventional gaming machines or devices. The primary or base game may comprise any suitable reel-type game, card game, cascading or falling symbol game, number game or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 19A and 19B, a base or primary game may be a slot game with one or more paylines 252. The paylines may be horizontal, vertical, circular, diagonal, angled or any combination thereof. In this embodiment, the gaming device includes at least one and preferably a plurality of reels 254, such as three to five reels 254, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 254 are in video form, one or more of the display devices, as described above, display the plurality of simulated video reels 254. Each reel 254 displays a plurality of indicia or symbols, such as bells, hearts, fruits, numbers, letters, bars or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device with wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one or a plurality of the selectable indicia or numbers via an input device such as the touch screen. The gaming device then displays a series of drawn numbers to determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 19A and 19B. In other embodiments, the triggering event or qualifying condition may be by exceeding a certain amount of game play (such as number of games, number of credits, amount of time), or reaching a specified number of points earned during game play.

In another embodiment, the gaming device processor or central server 12 randomly provides the player one or more plays of one or more secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

In one embodiment, as illustrated in FIG. 1, one or more of the gaming devices 14*a*, 14*b* . . . 14*z* are in communication with each other and/or at least one central server, central controller or remote host 12 through a data network or remote communication link 22. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo or keno game. In this embodiment, each individual gaming device utilizes one or more bingo or keno games to determine the predetermined game outcome value provided to the player for the interactive game played at that gaming device. In one embodiment, the bingo or keno game is displayed to the player. In another embodiment, the bingo or keno game is not displayed to the player, but the results of the bingo or keno game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. In this embodiment, the gaming device and/or player tracking system tracks any players gaming activity at the gaming device. In one such embodiment, the gaming device and/or associated player tracking system timely tracks when a player inserts their playing tracking card to begin a gaming session and also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as playing together as a learn or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

It should be understood that various changes and modifications to the presently preferred embodiments described herein will be apparent to those skilled in the art. Such changes and modifications can be made without departing from the spirit and scope of the present invention and without diminishing its intended aspects. It is therefore intended that such changes and modifications be covered by the appended claims.

The invention is claimed as follows:

1. A gaming system comprising:

a plurality of gaming devices; and a controller configured to operate with the plurality of gaming devices to:

(a) repeatedly acquire a plurality of ranking components from each of the plurality of gaming devices, wherein the ranking components are based, at least in part, on game play activity from the plurality of gaming devices, (b) at a first point in time:

(i) determine, based on the acquired ranking components at the first point in time, a first ranking of each of the plurality of the gaming devices, wherein for each of said gaming devices, the determined first ranking of said gaming device is based on a comparison of the acquired ranking components of said gaming device at the first point in time relative the acquired ranking components of each of the other gaming devices at the first point in time, (ii) for each of the gaming devices, determine a first probability of being selected to win a designated award, the first probability being greater than zero percent and less than one hundred percent and the determination being based, at least in part, on at least one of the determined first rankings, and (iii) if a triggering event occurs:

(A) select at least one of the gaming devices, said selection being based, at least in part, on at least one of the determined first probabilities, and (B) cause the at least one selected gaming device to provide the designated award, and (c) at a second, different point in time:

(i) determine, based on the acquired ranking components at the second point in time, a second ranking of each of the plurality of the gaming devices, wherein for each of said gaming devices, the determined second ranking of said gaming device is based on a comparison of the acquired ranking components of said gaming device at the second point in time relative the acquired ranking components of each of the other gaming devices at the second point in time, (ii) for each of the gaming devices, determine a second probability of being selected to win the designated award, the second probability being greater than zero percent and less than one hundred percent and the determination being based, at least in part, on at least one of the determined second rankings, and (iii) if the triggering event occurs:

(A) select at least one of the gaming devices, said selection being based, at least in part, on at least one of the determined second probabilities, and (B) cause the at least one selected gaming device to provide the designated award.

2. The gaming system of claim 1, wherein for at least one of the gaming devices, the first probability of being selected to win the designated award is the same as the second probability of being selected to win the designated award.

3. The gaming system of claim 2, wherein for said at least one of the gaming devices, the acquired ranking components of said gaming device at the first point in time is different than the acquired ranking components of said gaming device at the second point in time.

4. The gaming system of claim 1, wherein for each of a plurality of the gaming devices, the first probability of said gaming device being selected to win the designated award is different than the second probability of said gaming device being selected to win the designated award.

5. The gaming system of claim 4, wherein for at least one of said gaming devices, the acquired ranking components of said gaming device at the first point in time is the same as the acquired ranking components of said gaming device at the second point in time.

6. The gaming system of claim 1, wherein the game play activity is at least one selected from the group consisting of: a total amount wagered, an amount wagered on at least one play of at least one game, a quantity of primary games played, a quantity of secondary games played, a quantity of primary games played and secondary games played, an amount of time between each play of each game, and a quality of play.

7. The gaming system of claim 1, wherein the ranking components include at least one selected from the group consisting of: a total amount wagered on each gaming device, a total amount wagered at each gaming device, a number of games played on each gaming device, an amount of each wager placed on each play of each gaming device, an amount of each wager placed on each play of a game, an amount of time between each play of each game on the gaming devices, an amount of time between each play of each game at each gaming device and a quality of play.

8. The gaming system of claim 1, wherein the controller is configured to operate with the plurality of gaming devices to periodically acquire ranking components.

9. The gaming system of claim 1, wherein the controller is configured to operate with the plurality of gaming devices to continuously acquire ranking components.

10. The gaming system of claim 1, wherein the controller is configured to operate with the plurality of gaming devices to repeatedly acquire ranking components during a designated period of time.

11. The gaming system of claim 1, wherein the designated award includes at least one of: a progressive award, a quantity of monetary credits, a quantity of non-monetary credits, a quantity of promotional credits, and a quantity of player tracking points.

12. A method for operating a gaming system including a plurality of gaming devices operable with a controller, the method comprising:

(a) causing the controller to repeatedly acquire a plurality of ranking components from each of the plurality of gaming devices, wherein the ranking components are based, at least in part, on game play activity from the plurality of gaming devices, (b) at a first point in time:

(i) causing the controller to determine, based on the acquired ranking components at the first point in time, a first ranking of each of the plurality of the gaming devices, wherein for each of said gaming devices, the determined first ranking of said gaming device is based on a comparison of the acquired ranking components of said gaming device at the first point in time relative the acquired ranking components of each of the other gaming devices at the first point in time, (ii) for each of the gaming devices, causing the controller to determine a first probability of being selected to win a designated award, the first probability being greater than zero percent and less than one hundred percent and the determination being based, at least in part, on at least one of the determined first rankings, and (iii) if a triggering event occurs:

(A) causing the controller to select at least one of the gaming devices, said selection being based, at least in part, on at least one of the determined first probabilities, and (B) causing the at least one selected gaming device to provide the designated award, and (c) at a second, different point in time:

(i) causing the controller to determine, based on the acquired ranking components at the second point in time, a second ranking of each of the plurality of the gaming devices, wherein for each of said gaming devices, the determined second ranking of said gaming device is based on a comparison of the acquired ranking components of said gaming device at the second point in time relative the acquired ranking components of each of the other gaming devices at the second point in time, (ii) for each of the gaming devices, causing the controller to determine a second probability of being selected to win the designated award, the second probability being greater than zero percent and less than one hundred percent and the determination being based, at least in part, on at least one of the determined second rankings, and (iii) if the triggering event occurs:

(A) causing the controller to select at least one of the gaming devices, said selection being based, at least in part, on at least one of the determined second probabilities, and (B) causing the at least one selected gaming device to provide the designated award.

13. The method of claim 12, wherein for at least one of the gaming devices, the first probability of being selected to win the designated award is the same as the second probability of being selected to win the designated award.

14. The method of claim 13, wherein for said at least one of the gaming devices, the acquired ranking components of said gaming device at the first point in time is different than the acquired ranking components of said gaming device at the second point in time.

15. The method of claim 12, wherein for each of a plurality of the gaming devices, the first probability of said gaming device being selected to win the designated award is different than the second probability of said gaming device being selected to win the designated award.

16. The method of claim 15, wherein for at least one of said gaming devices, the acquired ranking components of said gaming device at the first point in time is the same as the acquired ranking components of said gaming device at the second point in time.

17. The method of claim 12, wherein the game play activity is at least one selected from the group consisting of: a total amount wagered, an amount wagered on at least one play of at least one game, a quantity of primary games played, a quantity of secondary games played, a quantity of primary games played and secondary games played, an amount of time between each play of each game, and a quality of play.

18. The method of claim 12, wherein the ranking components include at least one selected from the group consisting of: a total amount wagered on each gaming device, a total amount wagered at each gaming device, a number of games played on each gaming device, an amount of each wager placed on each play of each gaming device, an amount of each wager placed on each play of a game, an amount of time between each play of each game on the gaming devices, an amount of time between each play of each game at each gaming device and a quality of play.

19. The method of claim 12, which includes causing the controller to periodically acquire ranking components.

20. The method of claim 12, which includes causing the controller to continuously acquire ranking components.

21. The method of claim 12, which includes causing the controller to repeatedly acquire ranking components during a designated period of time.

22. The method of claim 12, wherein the designated award includes at least one of: a progressive award, a quantity of monetary credits, a quantity of non-monetary credits, a quantity of promotional credits, and a quantity of player tracking points.

23. The method of claim 12, which is provided through a data network.

24. The method of claim 23, wherein the data network is an internet.

* * * * *

UNITED STATES PATENT AND TRADEMARK OFFICE

CERTIFICATE OF CORRECTION

PATENT NO. : 8,613,649 B2
APPLICATION NO. : 13/725313
DATED : December 24, 2013
INVENTOR(S) : Low et al.

It is certified that error appears in the above-identified patent and that said Letters Patent is hereby corrected as shown below:

IN THE CLAIMS

Claim 1, Column 65, Line 59, delete the second instance of "the".
Claim 1, Column 65, Line 63, between "relative" and the second instance of "the" insert --to--.
Claim 1, Column 66, Line 14, delete the second instance of "the".
Claim 1, Column 66, Line 19, between "relative" and "the" insert --to--.
Claim 3, Column 66, Line 41, replace "is" with --are--.
Claim 5, Column 66, Line 51, replace "is" with --are--.
Claim 12, Column 67, Line 30, delete the second instance of "the".
Claim 12, Column 67, Line 35, between "relative" and "the" insert --to--.
Claim 12, Column 67, Line 54, delete the second instance of "the".
Claim 12, Column 67, Line 59, between "relative" and "the" insert --to--.
Claim 14, Column 68, Line 17, replace "is" with --are--.
Claim 16, Column 68, Line 28, replace "is" with --are--.

Signed and Sealed this
Third Day of February, 2015

Michelle K. Lee
*Deputy Director of the United States Patent and Trademark Office*